US010733427B2

(12) United States Patent
Marcheselli et al.

(10) Patent No.: US 10,733,427 B2
(45) Date of Patent: Aug. 4, 2020

(54) SYSTEM AND METHOD FOR DETECTING, TRACKING, AND COUNTING HUMAN OBJECTS OF INTEREST USING A COUNTING SYSTEM AND A DATA CAPTURE DEVICE

(71) Applicant: SHOPPERTRAK RCT CORPORATION, Chicago, IL (US)

(72) Inventors: Edward A. Marcheselli, Wheaton, IL (US); Gary Dispensa, Naperville, IL (US); Thomas D. Stemen, Naperville, IL (US); William C. Kastilahn, Evanston, IL (US)

(73) Assignee: SENSORMATIC ELECTRONICS, LLC, Boca Raton, FL (US)

(*) Notice: Subject to any disclaimer, the term of this patent is extended or adjusted under 35 U.S.C. 154(b) by 0 days.

(21) Appl. No.: 16/564,540

(22) Filed: Sep. 9, 2019

(65) Prior Publication Data

US 2020/0065570 A1 Feb. 27, 2020

Related U.S. Application Data

(63) Continuation of application No. 15/669,440, filed on Aug. 4, 2017, now Pat. No. 10,410,048, which is a continuation of application No. 15/057,908, filed on Mar. 1, 2016, now Pat. No. 9,734,388, which is a continuation of application No. 14/680,123, filed on Apr. 7, 2015, now Pat. No. 9,305,363, which is a continuation of application No. 13/622,083, filed on Sep. 18, 2012, now Pat. No. 9,177,195.

(60) Provisional application No. 61/538,554, filed on Sep. 23, 2011, provisional application No. 61/549,511, filed on Oct. 20, 2011.

(51) Int. Cl.
| *G06K 9/00* | (2006.01) |
| *G07C 9/00* | (2020.01) |
| *G06F 16/58* | (2019.01) |
| *G06T 7/73* | (2017.01) |
| *G06T 7/20* | (2017.01) |
| *G07C 9/28* | (2020.01) |

(52) U.S. Cl.
CPC ..... *G06K 9/00335* (2013.01); *G06F 16/5866* (2019.01); *G06K 9/00778* (2013.01); *G06T 7/20* (2013.01); *G06T 7/73* (2017.01); *G07C 9/00* (2013.01); *G07C 9/28* (2020.01)

(58) Field of Classification Search
CPC .. G06K 9/00; G06K 9/00335; G06K 9/00362; G06K 9/00369; G06K 9/00771; G06K 9/00778; G06T 7/20; G06T 2207/10016; G06T 2207/30196; G06T 2207/30232; G07C 9/00; G07C 11/00
See application file for complete search history.

(56) References Cited

U.S. PATENT DOCUMENTS

| 4,916,621 | A | 4/1990 | Bean et al. | 364/436 |
|---|---|---|---|---|
| 5,973,732 | A | 10/1999 | Guthrie | 348/169 |
| 6,445,810 | B2 | 9/2002 | Darrell et al. | 382/115 |
| 6,674,877 | B1 | 1/2004 | Jojic et al. | 382/103 |
| 6,697,104 | B1 | 2/2004 | Yakobi et al. | 348/143 |
| 6,771,818 | B1 | 8/2004 | Krumm et al. | 382/225 |
| 6,952,496 | B2 | 10/2005 | Krumm | 382/170 |
| 7,003,136 | B1 | 2/2006 | Harville | 382/103 |
| 7,092,566 | B2 | 8/2006 | Krumm | 382/170 |
| 7,161,482 | B2 | 1/2007 | Rider et al. | 340/522 |
| 7,176,441 | B2 | 2/2007 | Sumitomo et al. | 250/221 |
| 7,227,893 | B1 | 6/2007 | Srinivasa et al. | 375/240.08 |
| 7,400,744 | B2 | 7/2008 | Nichani et al. | 382/103 |
| 7,447,337 | B2 | 11/2008 | Zhang et al. | 382/107 |
| 7,660,438 | B2 | 2/2010 | Camus | 382/104 |
| 7,957,652 | B2 | 6/2011 | Kawanishi et al. | 398/186 |
| 7,965,866 | B2 | 6/2011 | Wang et al. | 382/103 |
| 8,238,607 | B2 | 8/2012 | Wang et al. | 382/103 |
| 9,177,195 | B2 | 11/2015 | Marcheselli et al. | 9/335 |
| 9,305,363 | B2 | 4/2016 | Marcheselli et al. | 9/335 |
| 9,734,388 | B2 | 8/2017 | Marcheselli et al. | 9/335 |
| 2003/0076417 | A1 | 4/2003 | Thomas et al. | 348/169 |
| 2005/0249382 | A1 | 11/2005 | Schwab et al. | 382/115 |
| 2006/0028557 | A1 | 2/2006 | Watanabe | 348/211.99 |
| 2006/0088191 | A1 | 4/2006 | Zhang et al. | 382/107 |

(Continued)

FOREIGN PATENT DOCUMENTS

| GB | 2433856 B | 3/2008 |
|---|---|---|
| GB | 2476869 A | 7/2011 |

(Continued)

OTHER PUBLICATIONS

Eveland et al, Background Modeling for Segmentation of Video-Rate Stereo Sequences, Jun. 23-25, 1998.

(Continued)

*Primary Examiner* — Andrew W Johns
(74) *Attorney, Agent, or Firm* — Arent Fox LLP

(57) ABSTRACT

A method for counting and tracking defined objects includes the step of receiving subset data with a data capturing device, wherein the subset data is associated with defined objects and includes a unique identifier, an entry time, an exit time, and location data for each defined object. The method further includes the steps of receiving subset data at a counting system, counting the defined objects, tracking the defined objects, associating a location of a defined object with a predefined area, and/or generating path data by plotting X and Y coordinates for the defined object within the predefined area at sequential time periods.

20 Claims, 28 Drawing Sheets

(56) References Cited

U.S. PATENT DOCUMENTS

| | | |
|---|---|---|
| 2006/0210117 A1 | 9/2006 | Chang et al. ............... 382/113 |
| 2007/0182818 A1 | 8/2007 | Buehler ...................... 348/143 |
| 2007/0200701 A1 | 8/2007 | English et al. ............ 340/572.1 |
| 2007/0257985 A1 | 11/2007 | Estevez et al. ............. 348/143 |
| 2008/0285802 A1 | 11/2008 | Bramblet et al. ........... 382/103 |
| 2009/0217315 A1* | 8/2009 | Malik et al. ....... G06K 9/00362 725/9 |
| 2009/0326807 A1 | 12/2009 | Ramaswamy et al. ....... 701/207 |
| 2010/0063854 A1 | 3/2010 | Purvis et al. .................... 705/5 |
| 2010/0157062 A1 | 6/2010 | Baba et al. ................... 348/156 |
| 2011/0169917 A1 | 7/2011 | Stephen et al. ................ 348/46 |
| 2011/0175738 A1 | 7/2011 | Baumann et al. ........... 340/584 |
| 2011/0286633 A1 | 11/2011 | Wang et al. .................. 382/103 |
| 2013/0208124 A1* | 8/2013 | Boghossian et al. ....................... G06K 9/3241 348/159 |
| 2013/0294646 A1 | 11/2013 | Shaw ................................ 7/48 |
| 2014/0037141 A1* | 2/2014 | Stefanovic et al. ........................ G06K 9/00771 382/103 |

FOREIGN PATENT DOCUMENTS

| | | |
|---|---|---|
| WO | WO 2008139203 A2 | 11/2008 |
| WO | WO 2009004479 A2 | 1/2009 |
| WO | WO 2009004479 A3 | 1/2009 |

OTHER PUBLICATIONS

Darrell, et al, Integrated Person Tracking Using Stereo, Color, and Pattern Direction, pp. 1-8, Jun. 23-25, 1998.

Haritaoglu et al, W4: Who? When? Where? What? A Real Time System for Detecting and Tracking People, 3. International Conference on Face and Gesture Recognition, Apr. 14, 16, 1998, Nara, Japan; pp. 1-6.

Isard et al, Contour Tracking by Stochastic Propagation of Conditional Density, in Prc. European Conf. Computer Vision, 1996, pp. 343-356, Cambridge, UK.

Paolo Remagnino et al; Correlation Techniques in Adaptive Template Matching With Uncalibrated Cameras, Lifia-Inria Rhones-Alples, Nov. 2, 1994.

United Kingdom Combined Search and Examination Report dated Feb. 3, 2013, with respect to United Kingdom Patent Application No. GB1216792.0.

Wren et al., Pfinder: Real-Time Tracking of the Human Body, IEEE Transactions on Pattern Analysis and Machine Intelligence, vol. 19, No. 7, Jul. 1997; pp. 780-785.

Search Report issued in EP Application No. 17207519.4 (dated 2018).

\* cited by examiner

SYSTEM AND METHOD FOR DETECTING, TRACKING, AND COUNTING HUMAN OBJECTS OF INTEREST USING A COUNTING SYSTEM AND A DATA CAPTURE DEVICE

CROSS-REFERENCE TO RELATED APPLICATIONS

This application is a Continuation of copending U.S. patent application Ser. No. 15/669,440, filed Aug. 4, 2017, which is a Continuation of U.S. patent application Ser. No. 15/057,908, filed Mar. 1, 2016 (now U.S. Pat. No. 9,734,388), which is a Continuation of U.S. patent application Ser. No. 14/680,123, filed Apr. 7, 2015 (now U.S. Pat. No. 9,305,363), which is a Continuation of U.S. patent application Ser. No. 13/622,083, filed Sep. 18, 2012 (now U.S. Pat. No. 9,177,195), which claims the benefit of priority under 35 U.S.C. § 119(e) to U.S. Provisional Patent Application No. 61/538,554, filed on Sep. 23, 2011, and U.S. Provisional Patent Application No. 61/549,511, filed on Oct. 20, 2011. The disclosures set forth in the referenced applications are incorporated herein by reference in their entireties.

BACKGROUND

Field of the Invention

The present invention generally relates to the field of object detection, tracking, and counting. In specific, the present invention is a computer-implemented detection and tracking system and process for detecting and tracking human objects of interest that appear in camera images taken, for example, at an entrance or entrances to a facility, as well as counting the number of human objects of interest entering or exiting the facility for a given time period.

Related Prior Art

Traditionally, various methods for detecting and counting the passing of an object have been proposed. U.S. Pat. No. 7,161,482 describes an integrated electronic article surveillance (EAS) and people counting system. The EAS component establishes an interrogatory zone by an antenna positioned adjacent to the interrogation zone at an exit point of a protected area. The people counting component includes one people detection device to detect the passage of people through an associated passageway and provide a people detection signal, and another people detection device placed at a predefined distance from the first device and configured to detect another people detection signal. The two signals are then processed into an output representative of a direction of travel in response to the signals.

Basically, there are two classes of systems employing video images for locating and tracking human objects of interest. One class uses monocular video streams or image sequences to extract, recognize, and track objects of interest. The other class makes use of two or more video sensors to derive range or height maps from multiple intensity images and uses the range or height maps as a major data source.

In monocular systems, objects of interest are detected and tracked by applying background differencing, or by adaptive template matching, or by contour tracking. The major problem with approaches using background differencing is the presence of background clutters, which negatively affect robustness and reliability of the system performance. Another problem is that the background updating rate is hard to adjust in real applications. The problems with approaches using adaptive template matching are:

1) object detections tend to drift from true locations of the objects, or get fixed to strong features in the background; and 2) the detections are prone to occlusion. Approaches using the contour tracking suffer from difficulty in overcoming degradation by intensity gradients in the background near contours of the objects. In addition, all the previously mentioned methods are susceptible to changes in lighting conditions, shadows, and sunlight.

In stereo or multi-sensor systems, intensity images taken by sensors are converted to range or height maps, and the conversion is not affected by adverse factors such as lighting condition changes, strong shadow, or sunlight.

Therefore, performances of stereo systems are still very robust and reliable in the presence of adverse factors such as hostile lighting conditions. In addition, it is easier to use range or height information for segmenting, detecting, and tracking objects than to use intensity information.

Most state-of-the-art stereo systems use range background differencing to detect objects of interest. Range background differencing suffers from the same problems such as background clutter, as the monocular background differencing approaches, and presents difficulty in differentiating between multiple closely positioned objects.

U.S. Pat. No. 6,771,818 describes a system and process of identifying and locating people and objects of interest in a scene by selectively clustering blobs to generate "candidate blob clusters" within the scene and comparing the blob clusters to a model representing the people or objects of interest. The comparison of candidate blob clusters to the model identifies the blob clusters that is the closest match or matches to the model. Sequential live depth images may be captured and analyzed in real-time to provide for continuous identification and location of people or objects as a function of time.

U.S. Pat. Nos. 6,952,496 and 7,092,566 are directed to a system and process employing color images, color histograms, techniques for compensating variations, and a sum of match qualities approach to best identify each of a group of people and objects in the image of a scene. An image is segmented to extract regions which likely correspond to people and objects of interest and a histogram is computed for each of the extracted regions. The histogram is compared with pre-computed model histograms and is designated as corresponding to a person or object if the degree of similarity exceeds a prescribed threshold. The designated histogram can also be stored as an additional model histogram.

U.S. Pat. No. 7,176,441 describes a counting system for counting the number of persons passing a monitor line set in the width direction of a path. A laser is installed for irradiating the monitor line with a slit ray and an image capturing device is deployed for photographing an area including the monitor line. The number of passing persons is counted on the basis of one dimensional data generated from an image obtained from the photographing when the slit ray is interrupted on the monitor line when a person passes the monitor line.

Despite all the prior art in this field, no invention has developed a technology that enables unobtrusive detection and tracking of moving human objects, requiring low budget and maintenance while providing precise traffic counting results with the ability to distinguish between incoming and outgoing traffic, moving and static objects, and between objects of different heights. Thus, it is a primary objective of this invention to provide an unobtrusive traffic detection, tracking, and counting system that involves low cost, easy and low maintenance, high-speed processing, and capable of providing time-stamped results that can be further analyzed.

In addition, people counting systems typically create anonymous traffic counts. In retail traffic monitoring, however, this may be insufficient. For example, some situations may require store employees to accompany customers through access points that are being monitored by an object tracking and counting system, such as fitting rooms. In these circumstances, existing systems are unable to separately track and count employees and customers. The present invention would solve this deficiency.

SUMMARY OF THE INVENTION

According to one aspect of the present invention, a method for counting and tracking defined objects comprises the step of receiving subset data with a data capturing device, wherein the subset data is associated with defined objects and includes a unique identifier, an entry time, an exit time, and location data for each defined object. The method may further include the steps of receiving subset data at a counting system, counting the defined objects, tracking the defined objects, associating a location of a defined object with a predefined area, and/or generating path data by plotting X and Y coordinates for the defined object within the predefined area at sequential time periods In some embodiments, the method may further include the step of receiving location data at the data capturing device, wherein the location data is received from tracking technology that detects cellular signals emitted from one or more mobile handsets or signals emitted from membership cards, employee badges, rail or air tickets, rental car keys, hotel keys, store-sponsored credit or debit cards, or loyalty reward cards with RFID chips.

In some embodiments, the cellular signals include T-IMSI, CDMA, or Wi-Fi signals.

In some embodiments, the method may further include the step of receiving data from another independent system regarding physical characteristics of the object.

In some embodiments, the other independent system may be selected from the group consisting of point of sale systems, loyalty rewards systems, point of sale trigger information, and mechanical turks.

In some embodiments, the method may further include the steps of converting the subset data into sequence records and creating a sequence array of all of the sequence records, wherein a sequence record may include: (a) a unique ID, which is an unsigned integer associated with a mobile handset, a telephone number associated with the mobile handset or any other unique number, character, or combination thereof, associated with object, (b) a start time, which may consist of information indicative of a time when the object was first detected within a coverage area, (c) an end time, which may consist of information indicative of a time when the object was last detected within the coverage area of the data capturing device, and/or (d) an array of references to all tracks that overlap a particular sequence record.

In some embodiments, the method may further include the step of determining a dwell time for an object within a predefined area by subtracting the end time for that predetermined area from the start time for that predetermined area.

In some embodiments, the method may further include the step of using Z coordinates to further track objects within a predefined area defined by multiple floors.

In some embodiments, the method may further include the step of using the subset data to generate reports showing at least one of the number of objects within a predefined area, a number of objects within the predefined area during a specific time period, a number of predefined areas that were visited by an object, or dwell times for one or more predefined areas.

In some embodiments, the method may further include the step of using at least path data and subset data to aggregate the most common paths taken by objects and correlate path data information with dwell times.

In some embodiments, the method may further include the step of generating a report that shows at least one of the following: (a) the most common paths that objects take in a store, including corresponding dwell times, (b) changes in shopping patterns by time period or season, and/or (c) traffic patterns for use by store security or HVAC systems in increasing or decreasing resources at particular times.

In some embodiments, the method may further include the step of generating a conversion rate by (a) loading transaction data related to transactions performed, (b) loading traffic data including a traffic count and sorting by time periods, and/or (c) dividing the transactions by the traffic counts for the time periods.

In some embodiments, the transaction data may include a sales amount, the number of items purchases, the specific items purchased, the data and time of the transaction, the register used for the transaction, and the sales associate that completed the transaction.

In some embodiments, the method may further include the step of generating a report showing comparisons between purchasers and non-purchasers based on at least one of the dwell times, the predefined areas, or the time periods.

In accordance with these and other objectives that will become apparent hereafter, the present invention will be described with particular references to the accompanying drawings.

DETAILED DESCRIPTION OF THE INVENTION

This detailed description is presented in terms of programs, data structures or procedures executed on a computer or a network of computers. The software programs implemented by the system may be written in languages such as JAVA, C, C++, C#, Assembly language, Python, PHP, or HTML. However, one of skill in the art will appreciate that other languages may be used instead, or in combination with the foregoing.

1. System Components

Figure 1:
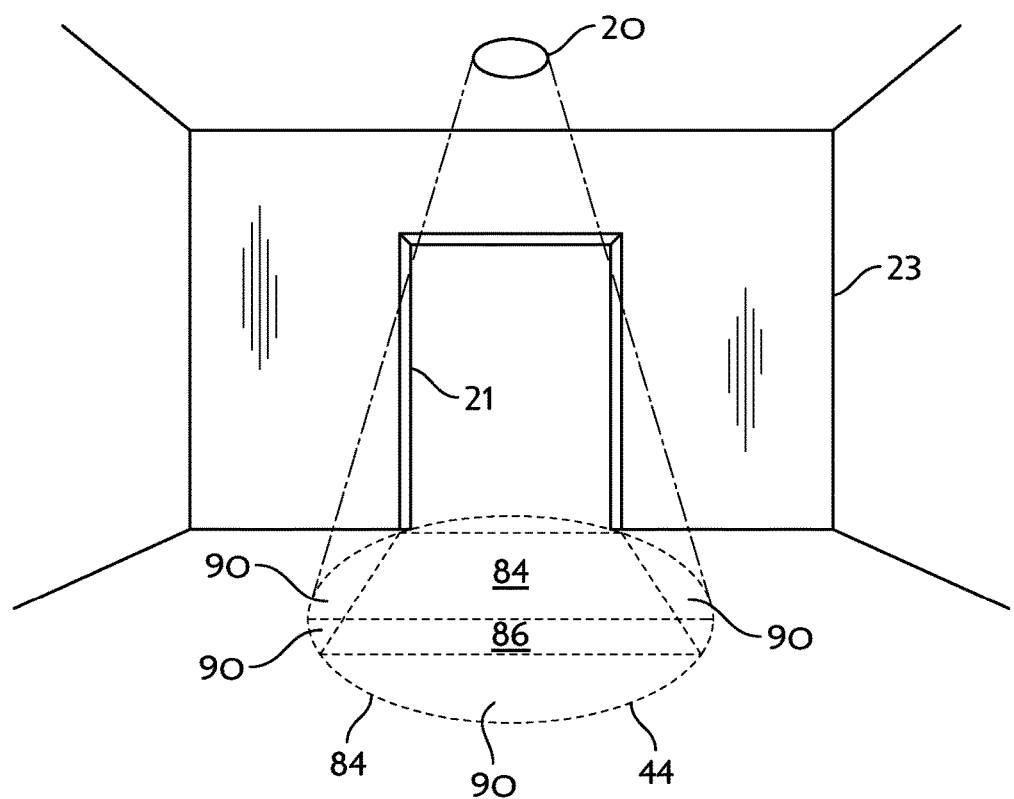
FIG. 1 is a schematic perspective view of a facility in which the system of the present invention is installed.
Figure 2:
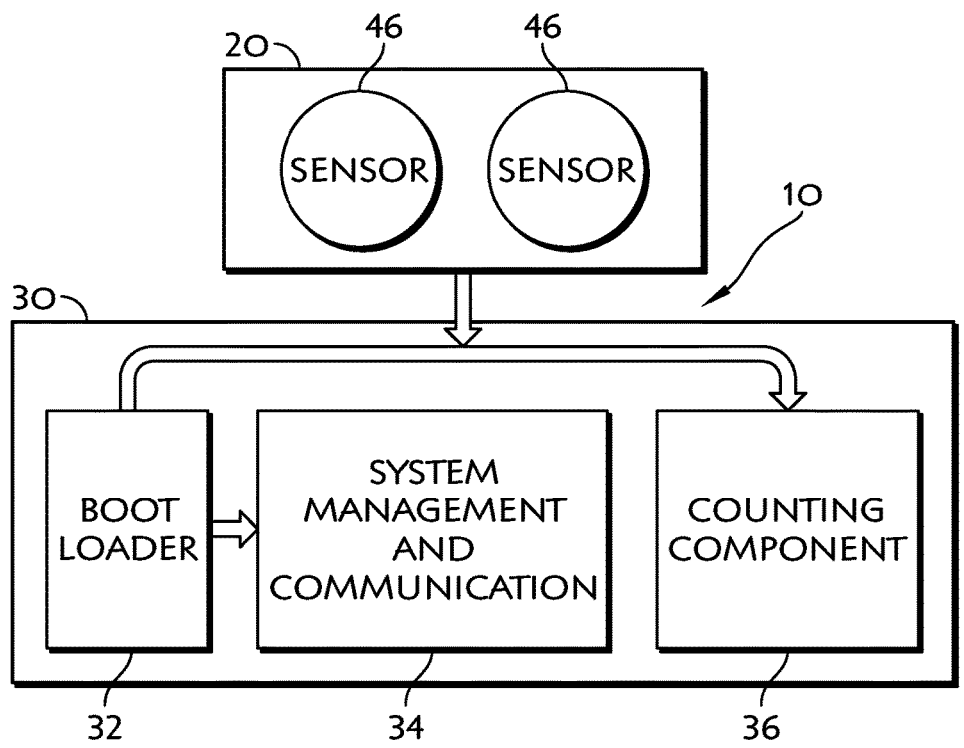
FIG. 2 is a diagram illustrating the image capturing device connected to an exemplary counting system of the present invention.
Figure 3:
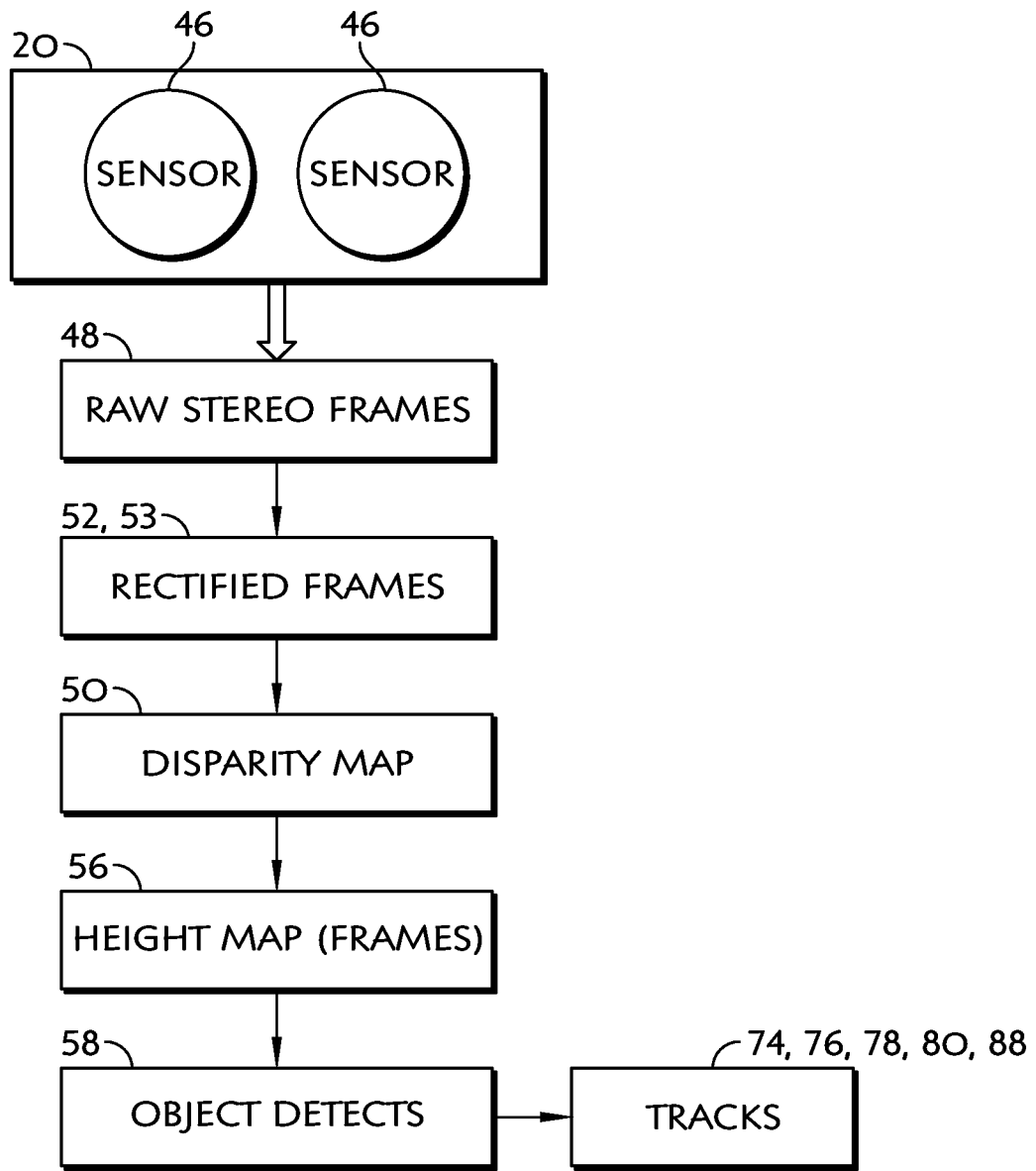
FIG. 3 is a diagram illustrating the sequence of converting one or more stereo image pairs captured by the system of the present invention into the height maps, which are analyzed to track and count human objects.

Referring to FIGS. 1, 2 and 3, the present invention is a system 10 comprising at least one image capturing device 20 electronically or wirelessly connected to a counting system 30. In the illustrated embodiment, the at least one image capturing device 20 is mounted above an entrance or entrances 21 to a facility 23 for capturing images from the entrance or entrances 21. Facilities such as malls or stores with wide entrances often require more than one image capturing device to completely cover the entrances. The area captured by the image capturing device 20 is field of view 44. Each image, along with the time when the image is captured, is a frame 48 (FIG. 3).

Typically, the image capturing device includes at least one stereo camera with two or more video sensors 46 (FIG. 2), which allows the camera to simulate human binocular vision. A pair of stereo images comprises frames 48 taken by each video sensor 46 of the camera. A height map 56 is then constructed from the pair of stereo images through computations involving finding corresponding pixels in rectified frames 52, 53 of the stereo image pair.

Door zone 84 is an area in the height map 56 marking the start position of an incoming track and end position of an outgoing track. Interior zone 86 is an area marking the end position of the incoming track and the start position of the outgoing track. Dead zone 90 is an area in the field of view 44 that is not processed by the counting system 30.

Video sensors 46 (FIG. 2) receive photons through lenses, and photons cause electrons in the image capturing device 20 to react and form light images. The image capturing device 20 then converts the light images to digital signals through which the device 20 obtains digital raw frames 48 (FIG. 3) comprising pixels. A pixel is a single point in a raw frame 48. The raw frame 48 generally comprises several hundred thousands or millions of pixels arranged in rows and columns.

Examples of video sensors 46 used in the present invention include CMOS (Complementary Metal-Oxide Semiconductor) sensors and/or CCD (Charge-Coupled Device) sensors. However, the types of video sensors 46 should not be considered limiting, and any video sensor 46 compatible with the present system may be adopted.

The counting system 30 comprises three main components: (1) boot loader 32; (2) system management and communication component 34; and (3) counting component 36.

The boot loader 32 is executed when the system is powered up and loads the main application program into memory 38 for execution.

The system management and communication component 34 includes task schedulers, database interface, recording functions, and TCP/IP or PPP communication protocols. The database interface includes modules for pushing and storing data generated from the counting component 36 to a database at a remote site. The recording functions provide operations such as writing user defined events to a database, sending emails, and video recording.

The counting component 36 is a key component of the system 10 and is described in further detail as follows.

2. The Counting Component.

In an illustrated embodiment of the present invention, at least one image capturing device 20 and the counting system 30 are integrated in a single image capturing and processing device. The single image capturing and processing device can be installed anywhere above the entrance or entrances to the facility 23. Data output from the single image capturing and processing device can be transmitted through the system management and communication component 34 to the database for storage and further analysis.

Figure 4:
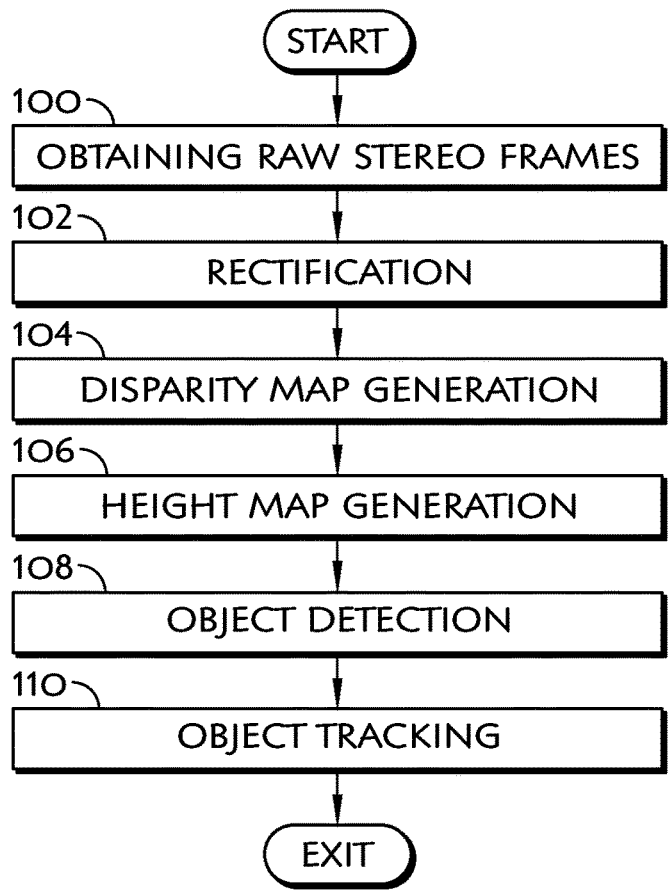
FIG. 4 is a flow diagram describing the flow of processes for a system performing human object detection, tracking, and counting according to the present invention.

FIG. 4 is a diagram showing the flow of processes of the counting component 36. The processes are: (1) obtaining raw frames (block 100); (2) rectification (block 102); (3) disparity map generation (block 104); (4) height map generation (block 106); (5) object detection (block 108); and (6) object tracking (block 110).

Referring to FIGS. 1-4, in block 100, the image capturing device 20 obtains raw image frames 48 (FIG. 3) at a given rate (such as for every 1 As second) of the field of view 44 from the video sensors 46. Each pixel in the raw frame 48 records color and light intensity of a position in the field of view 44. When the image capturing device 20 takes a snapshot, each video sensor 46 of the device 20 produces a different raw frame 48 simultaneously. One or more pairs of raw frames 48 taken simultaneously are then used to generate the height maps 56 for the field of view 44, as will be described.

When multiple image capturing devices 20 are used, tracks 88 generated by each image capturing device 20 are merged before proceeding to block 102.

Block 102 uses calibration data of the stereo cameras (not shown) stored in the image capturing device 20 to rectify raw stereo frames 48. The rectification operation corrects lens distortion effects on the raw frames 48. The calibration data include each sensor's optical center, lens distortion information, focal lengths, and the relative pose of one sensor with respect to the other. After the rectification, straight lines in the real world that have been distorted to curved lines in the raw stereo frames 48 are corrected and restored to straight lines. The resulting frames from rectification are called rectified frames 52, 53 (FIG. 3).

Block 104 creates a disparity map 50 (FIG. 3) from each pair of rectified frames 52, 53. A disparity map 50 is an image map where each pixel comprises a disparity value. The term disparity was originally used to describe a 2-D vector between positions of corresponding features seen by the left and right eyes. Rectified frames 52, 53 in a pair are compared to each other for matching features. The disparity is computed as the difference between positions of the same feature in frame 52 and frame 53.

Block 106 converts the disparity map 50 to the height map 56. Each pixel of the height map 56 comprises a height value and x-y coordinates, where the height value is represented by the greatest ground height of all the points in the same location in the field of view 44. The height map 56 is sometimes referred to as a frame in the rest of the description.

2.1 Object Detection

Object detection (block 108) is a process of locating candidate objects 58 in the height map 56. One objective of the present invention is to detect human objects standing or walking in relatively flat areas. Because human objects of interest are much higher than the ground, local maxima of the height map 56 often represent heads of human objects or occasionally raised hands or other objects carried on the shoulders of human objects walking in counting zone 84, 86 (FIG. 1). Therefore, local maxima of the height map 56 are identified as positions of potential human object 58 detects. Each potential human object 58 detect is represented in the height map 56 by a local maximum with a height greater than a predefined threshold and all distances from other local maxima above a predefined range.

Occasionally, some human objects of interest do not appear as local maxima for reasons such as that the height map 56 is affected by false detection due to snow blindness effect in the process of generating the disparity map 50, or that human objects of interests are standing close to taller objects such as walls or doors. To overcome this problem, the current invention searches in the neighborhood of the most recent local maxima for a suboptimal location as candidate positions for human objects of interest, as will be described later.

A run is a contiguous set of pixels on the same row of the height map 56 with the same non-zero height values. Each run is represented by a four-tuple (row, start-column, end-column, height). In practice, height map 56 is often represented by a set of runs in order to boost processing performance and object detection is also performed on the runs instead of the pixels.

Object detection comprises four stages: 1) background reconstruction; 2) first pass component detection; 3) second pass object detection; and 4) merging of closely located detects.

2.1.1 Component Definition and Properties

Pixel q is an eight-neighbor of pixel p if q and p share an edge or a vertex in the height map 56, and both p and q have non-zero height values. A pixel can have as many as eight-neighbors.

A set of pixels E is an eight-connected component if for every pair of pixels Pi and Pi in E, there exists a sequence of pixels Pi' . . . , Pi such that all pixels in the sequence belong to the set E, and every pair of two adjacent pixels are eight neighbors to each other. Without further noting, an eight connected component is simply referred to as a connected component hereafter.

The connected component is a data structure representing a set of eight-connected pixels in the height map 56. A connected component may represent one or more human objects of interest. Properties of a connected component include height, position, size, etc. Table 1 provides a list of properties associated with a connected component. Each property has an abbreviated name enclosed in a pair of parentheses and a description. Properties will be referenced by their abbreviated names hereafter.

TABLE 1

| Number | Variable Name (abbreviated name) | Description |
| --- | --- | --- |
| 1 | component ID (det_ID) | Identification of a component. In the first pass, componentID represents the component. In the second pass, componentID represents the parent component from which the current component is derived. |
| 2 | peak position (det_maxX, det_maxY) | Mass center of the pixels in the component having the greatest height value. |
| 3 | peak area (det_maxArea) | Number of pixels in the component having the greatest height value. |
| 4 | center (det_X, det_Y) | Mass center of all pixels of the component. |
| 5 | minimum size (det_minSize) | Size of the shortest side of two minimum rectangles that enclose the component at 0 and 45 degrees. |
| 6 | maximum size (det_maxSize) | Size of the longest side of two minimum rectangles that enclose the component at 0 and 45 degrees. |
| 7 | area (det_area) | Number of pixels of the component. |
| 8 | minimum height (det_minHeight) | Minimum height of all pixels of the component. |
| 9 | maximum height (det_maxHeight) | Maximum height of all pixels of the component. |
| 10 | height sum (det_htSum) | Sum of heights of pixels in a small square window centered at the center position of the component, the window having a configurable size. |
| 11 | Grouping flag (de_grouped) | A flag indicating whether the subcomponent still needs grouping. |
| 12 | background (det_inBackground) | A flag indicating whether the mass center of the component is in the background |
| 13 | the closest detection (det_closestDet) | Identifies a second pass component closest to the component but remaining separate after operation of "merging close detections". |

Several predicate operators are applied to a subset of properties of the connected component to check if the subset of properties satisfies a certain condition. Component predicate operators include:

IsNoisy, which checks whether a connected component is too small to be considered a valid object detect 58. A connected component is considered as "noise" if at least two of the following three conditions hold: 1) its det_minSize is less than two thirds of a specified minimum human body size, which is configurable in the range of [9,36] inches; 2) its det_area is less than four ninths of the area of a circle with its diameter equal to a specified minimum body size; and 3) the product of its det_minSize and det area is less than product of the specified minimum human body size and a specified minimum body area.

IsPointAtBoundaries, which checks whether a square window centered at the current point with its side equal to a specified local maximum search window size is intersecting boundaries of the height map 56, or whether the connected component has more than a specific number of pixels in the dead zone 90. If this operation returns true, the point being checked is considered as within the boundaries of the height map 56.

NotSmallSubComponent, which checks if a subcomponent in the second pass component detection is not small. It returns true if its detrninxize is greater than a specified minimum human head size or its det_area is greater than a specified minimum human head area.

BigSubComponentSeed, which checks if a subcomponent seed in the second pass component detection is big enough to stop the grouping operation. It returns true if its detrninxize is greater than the specified maximum human head size or its det_area is greater than the specified maximum human head area.

SmallSubComponent, which checks if a subcomponent in the second pass component detection is small. It returns true if its detrninxize is less than the specified minimum human head size or its der area is less than the specified minimum human head area.

2.1.2 Background Reconstruction

The background represents static scenery in the field view 44 of the image capturing device 20 and is constructed from the height map 56. The background building process monitors every pixel of every height map 56 and updates a background height map. A pixel may be considered as part of the static scenery if the pixel has the same non-zero height value for a specified percentage of time (e.g., 70%).

2.1.3 First-Pass Component Detection

First pass components are computed by applying a variant of an eight-connected image labeling algorithm on the runs of the height map 56. Properties of first pass components are calculated according to the definitions in Table 1. Predicate operators are also applied to the first pass components. Those first pass components whose "IsNoise" predicate operator returns "true" are ignored without being passed on to the second pass component detection phase of the object detection.

2.1.4 Second Pass Object Detection

In this phase, height map local maxima, to be considered as candidate human detects, are derived from the first pass components in the following steps.

First, for each first pass component, find all eight connected subcomponents whose pixels have the same height. The deigrouped property of all subcomponents is cleared to prepare for subcomponent grouping and the deCID property of each subcomponent is set to the ID of the corresponding first pass component.

Second, try to find the highest ungrouped local maximal subcomponent satisfying the following two conditions: (1) the subcomponent has the highest height among all of the ungrouped subcomponents of the given first pass component, or the largest area among all of the ungrouped subcomponents of the given first pass component if several ungrouped subcomponents with the same highest height exist; and (2) the subcomponent is higher than all of its neighboring subcomponents. If such a subcomponent exists, use it as the current seed and proceed to the next step for further subcomponent grouping. Otherwise, return to step 1 to process the next first pass component in line.

Third, ifBigSubComponentSeed test returns true on the current seed, the subcomponent is then considered as a potential human object detect. Set the det grouped flag of the subcomponent to mark it as grouped and proceed to step 2 to look for a new seed. If the test returns false, proceed to the next step.

Fourth, try to find a subcomponent next to the current seed that has the highest height and meets all of the following three conditions: (I) it is eight-connected to the current seed; (2) its height is smaller than that of the current seed; and (3) it is not connected to a third subcomponent that is higher and it passes the NotSmallSubComponent test. If more than one subcomponent meets all of above conditions, choose the one with the largest area. When no subcomponent meets the criteria, set the deigrouped property of the current seed to "grouped" and go to step 2. Otherwise, proceed to the next step.

Fifth, calculate the distance between centers of the current seed and the subcomponent found in the previous step. If the distance is less than the specified detection search range or the current seed passes the SmallSubComponent test, group the current seed and the subcomponent together and update the properties of the current seed accordingly. Otherwise, set the det_grouped property of the current seed as "grouped". Return to step 2 to continue the grouping process until no further grouping can be done.

2.1.5 Merging Closely Located Detections

Because the image capturing device 20 is mounted on the ceiling of the facility entrance (FIG. 1), a human object of interest is identified by a local maximum in the height map. Sometimes more than one local maxima detection is generated from the same human object of interest. For example, when a human object raises both of his hands at the same time, two closely located local maxima may be detected. Therefore, it is necessary to merge closely located local maxima.

The steps of this phase are as follows.

First, search for the closest pair of local maxima detections. If the distance between the two closest detections is greater than the specified detection merging distance, stop and exit the process. Otherwise, proceed to the next step.

Second, check and process the two detections according to the following conditions in the given order. Once one condition is met, ignore the remaining conditions and proceed to the next step:

a) if either but not all detection is in the background, ignore the one in the background since it is most likely a static object (the local maximum in the foreground has higher priority over the one in the background);

b) if either but not all detection is touching edges of the height map 56 or dead zones, delete the one that is touching edges of the height map 56 or dead zones (a complete local maximum has higher priority over an incomplete one);

c) if the difference between det rnaxlleights of detections is smaller than a specified person height variation threshold, delete the detection with significantly less 3-D volume (e.g., the product of det_maxHeight and det_masArea for one connected component is less than two thirds of the product for the other connected component) (a strong local maximum has higher priority over a weak one);

d) if the difference between maximum heights of detections is more than one foot, delete the detection with smaller det_maxHeight if the detection with greater height among the two is less than the specified maximum person height, or delete the detection with greater det_maxHeight if the maximum height of that detection is greater than the specified maximum person height (a local maxima with a reasonable height has higher priority over a local maximum with an unlikely height);

e) delete the detection whose det area is twice as small as the other (a small local maximum close to a large local maximum is more likely a pepper noise);

f) if the distance between the two detections is smaller than the specified detection search range, merge the two detections into one (both local maxima are equally good and close to each other);

g) keep both detections if the distance between the two detections is larger than or equal to the specified detection search range (both local maxima are equally good and not too close to each other). Update the det., closestDet attribute for each detection with the other detection's ID.

Then, return to step 1to look for the next closest pair of detections.

The remaining local maxima detections after the above merging process are defined as candidate object detects 58, which are then matched with a set of existing tracks 74 for track extension, or new track initiation if no match is found.

2.2 Object Tracking

Object tracking (block 110 in FIG. 1) uses objects detected in the object detection process (block 108) to extend existing tracks 74 or create new tracks 80. Some short, broken tracks are also analyzed for possible track repair operations.

To count human objects using object tracks, zones 82 are delineated in the height map 56. Door zones 84 represent door areas around the facility 23 to the entrance. Interior zones 86 represent interior areas of the facility. A track 76 traversing from the door zone 84 to the interior zone 86 has a potential "in" count. A track 76 traversing to the door zone 84 from the interior zone 86 has a potential "out" count. If a track 76 traverses across zones 82 multiple times, there can be only one potential "in" or "out" count depending on the direction of the latest zone crossing.

Figure 5:
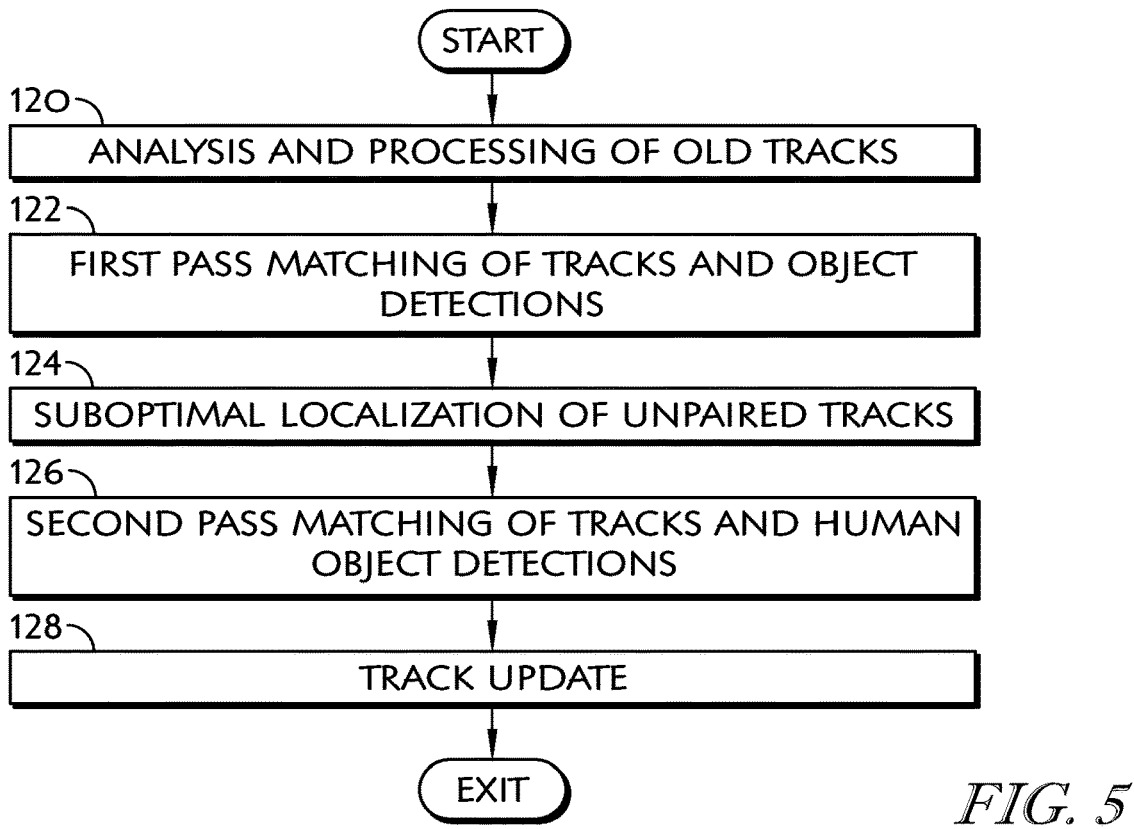
FIG. 5 is a flow diagram describing the flow of processes for object tracking.

As illustrated in FIG. 5, the process of object tracking 110 comprises the following phases: 1) analysis and processing of old tracks (block 120); 2) first pass matching between tracks and object detects (block 122); 3) suboptimal localization of unpaired tracks (block 124); 4) second pass matching between tracks and object detects (block 126); and 5) track updating or creation (block 128).

An object track 76 can be used to determine whether a human object is entering or leaving the facility, or to derive properties such as moving speed and direction for human objects being tracked.

Object tracks 76 can also be used to eliminate false human object detections, such as static signs around the entrance area. If an object detect 58 has not moved and its associated track 76 has been static for a relatively long time, the object detect 58 will be considered as part of the background and its track 76 will be processed differently than normal tracks (e.g., the counts created by the track will be ignored).

Object tracking 110 also makes use of color or gray level intensity information in the frames 52, 53 to search for best match between tracks 76 and object detects 58. Note that the color or the intensity information is not carried to disparity maps 50 or height maps 56.

The same technique used in the object tracking can also be used to determine how long a person stands in a checkout line.

2.2.1 Properties of Object Track

Each track 76 is a data structure generated from the same object being tracked in both temporal and spatial domains and contains a list of 4-tuples (x, y, t, h) in addition to a set of related properties, where h, x and y present the height and the position of the object in the field of view 44 at time t. (x, y, h) is defined in a world coordinate system with the plane formed by x and y parallel to the ground and the h axis vertical to the ground. Each track can only have one position at any time. In addition to the list of 4-tuples, track 76 also has a set of properties as defined in Table 2 and the properties will be referred to later by their abbreviated names in the parentheses:

TABLE 2

| Number | Variable Name | Description |
| --- | --- | --- |
| 1 | ID number (trk_ID) | A unique number identifying the track. |
| 2 | track state (trk_state) | A track could be in one of three states: active, inactive and deleted. Being active means the track is extended in a previous frame, being inactive means the track is not paired with a detect in a previous frame, and being deleted means the track is marked for deletion. |
| 3 | start point (trk_start) | The initial position of the track (Xs, Ys, Ts, Hs). |
| 4 | end point (trk_end) | The end position of the track (Xe, Ye, Te, He). |
| 5 | positive Step Numbers (trk_posNum) | Number of steps moving in the same direction as the previous step. |
| 6 | positive Distance (trk_posDist) | Total distance by positive steps. |
| 7 | negative Step Numbers (trk_negNum) | Number of steps moving in the opposite direction to the previous step. |
| 8 | negative Distance (trk_negDist) | Total distance by negative steps. |
| 9 | background count (trk_backgroundCount) | The accumulative duration of the track in background. |
| 10 | track range (trk_range) | The length of the diagonal of the minimal rectangle covering all of the track's points. |
| 11 | start zone (trk_startZone) | A zone number representing either door zone or interior zone when the track is created. |
| 12 | last zone (trk_lastZone) | A zone number representing the last zone the track was in. |
| 13 | enters (trk_enters) | Number of times the track goes from a door zone to an interior zone. |

TABLE 2-continued

| Number | Variable Name | Description |
|---|---|---|
| 14 | exits (trk_exits) | Number of times the track goes from an interior zone to a door zone. |
| 15 | total steps (trk_totalSteps) | The total non-stationary steps of the track. |
| 16 | high point steps (trk_higbPtSteps) | The number of non-stationary steps that the track has above a maximum person height (e.g. 85 inches). |
| 17 | low point steps (trk_lowPtSteps) | The number of non-stationary steps below a specified minimumn person height. |
| 18 | maximum track heigbt (trk_maxTrackHt) | The maximum height of the track. |
| 19 | non-local maximum detection point (trk_nonMaxDetNum) | The accumulative duration of the time that the track has from non-local maximum point in the height map and that is closest to any active track. |
| 20 | moving vector (trk_movingVec) | The direction and offset from the closest point in time to the current point with the offset greater than the minimwn body size. |
| 21 | following track (trk_followingTrack) | The ID of the track that is following closely. If there is a track following closely, the distance between these two tracks don't change a lot, and the maximum height of the front track is less than a specified height for shopping carts, then the track in the front may be considered as made by a shopping cart. |
| 22 | minimum following distance (trk_minFollowingDist) | The minimum distance from this track to the following track at a point of time. |
| 23 | maximum following distance (trk_maxFollowingDist) | The maximum distance from this track to the following track at a point of time. |
| 24 | following duration (trk_voteFollowing) | The time in frames that the track is followed by the track specified in trk_followingTrack. |
| 25 | most recent track (trk_lastCollidingTrack) | The id of a track whose detection t was once very close to this track's non-local minimum candidate extending position. |
| 26 | number of merged tracks (trk_mergedTracks) | The number of small tracks that this track is made of through connection of broken tracks. |
| 27 | number of small track searches (trk_smallSearches) | The number of small track search ranges used in merging tracks. |
| 28 | Mirror track (trk_mirrorTrack) | The ID of the track that is very close to this track and that might be the cause of this track. This track itself has to be from a non-local maximum detection created by a blind search, or its height has to be less than or equal to the specified minimum person height in order to be qualified as a candidate for false tracks. |
| 29 | Mirror track duration (trk_voteMirrorTrack) | The time in frames that the track is a candidate for false tracks and is closely accompanied by the track specified in trk_mirrorTrack within a distance of the specified maximum person width. |
| 30 | Maximum mirror track distance (trk_maxMirrorDist) | The maximum distance between the track and the track specified in trk_mirrorTrack. |

2.2.2 Track-Related Predicative Operations

Several predicate operators are defined in order to obtain the current status of the tracks 76. The predicate operators are applied to a subset of properties of a track 76 to check if the subset of properties satisfies a certain condition. The predicate operators include:

IsNoisyNow, which checks if track bouncing back and forth locally at the current time. Specifically, a track 76 is considered noisy if the track points with a fixed number of frames in the past (specified as noisy track duration) satisfies one of the following conditions:

a) the range of track 76 (trkrange) is less than the specified noisy track range, and either the negative distance (trk_negDist) is larger than two thirds of the positive distance (trk_posDist) or the negative steps (trk_negNum) are more than two thirds of the positive steps (trk_posNum);

b) the range of track 76 (trkrange) is less than half of the specified noisy track range, and either the negative distance (trk_negDist) is larger than one third of the positive distance (trk_posDist) or the negative steps (trk_negNum) are more than one third of the positive steps (trk_posNum).

WholeTrackIsNoisy: a track 76 may be noisy at one time and not noisy at another time.

This check is used when the track 76 was created a short time ago, and the whole track 76 is considered noisy if one of the following conditions holds:

a) the range of track 76 (trkrange) is less than the specified noisy track range, and either the negative distance (trk_negDist) is larger than two thirds of the positive distance (trk_posDist) or the negative steps (trk_negNum) are more than two thirds of the positive steps (trk_posNum);

b) the range of track 76 (trkrange) is less than half the specified noisy track range, and either the negative distance trk_negDist) is larger than one third of the positive distance (trk_posDist) or the negative steps (trk_negNum) are more than one third of the positive steps (trk_posNum).

IsSameTrack, which check if two tracks 76, 77 are likely caused by the same human object. All of the following three conditions have to be met for this test to return true: (a) the two tracks 76, 77 overlap in time for a minimum number of frames specified as the maximum track timeout; (b) the ranges of both tracks 76, 77 are above a threshold specified as the valid counting track span; and (c) the distance between the two tracks 76, 77 at any moment must be less than the specified minimum person width.

IsCountIgnored: when the track 76 crosses the counting zones, it may not be created by a human object of interest. The counts of a track are ignored if one of the following conditions is met:

Invalid Tracks: the absolute difference between trk_exits and trk_enters is not equal to one.

Small Tracks: trkrange is less than the specified minimum counting track length.

Unreliable Merged Tracks: trkrange is less than the specified minimum background counting track length as well as one of the following: trk_mergedTracks is equal to trk_smallSearches, or trk_backgroundCount is more than 80% of the life time of the track 76, or the track 76 crosses the zone boundaries more than once.

High Object Test: trk_highPtSteps is larger than half of trk_totalSteps.

Small Child Test: trk_lowPtSteps is greater than ¾ of trk_totalSteps, and trk_maxTrackHt is less than or equal to the specified minimum person height.

Shopping Cart Test: trk_voteFollowing is greater than 3, trk_minFollowingDist is more than or equal to 80% of trk_maxFollowingDist, and trk_maxTrackHt is less than or equal to the specified shopping cart height.

False Track test: trk_voteMirrorTrack is more than 60% of the life time of the track 76, and trk_maxMirrorTrackDist is less than two thirds of the specified maximum person width or trk_totalVoteMirrorTrack is more than 80% of the life time of the track 76.

2.2.3 Track Updating Operation

Figure 12:
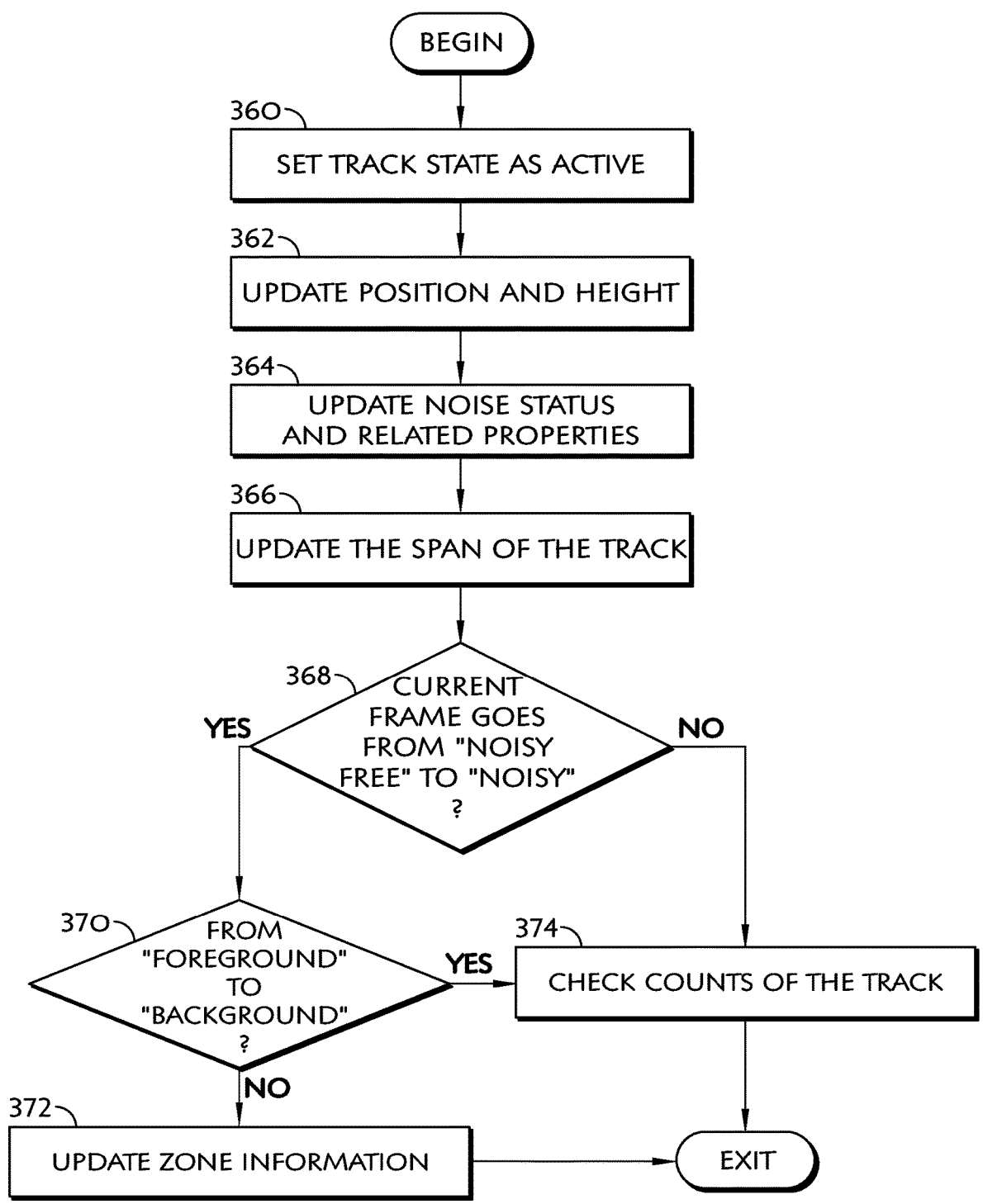
FIG. 12 is a flow diagram describing the flow of processes for track updates.

Referring to FIG. 12, each track 76 is updated with new information on its position, time, and height when there is a best matching human object detect 58 in the current height map 56 for First, set trk_state of the track 76 to 1 (block 360).

Second, for the current frame, obtain the height by using median filter on the most recent three heights of the track 76 and calculate the new position 56 by averaging on the most recent three positions of the track 76 (block 362).

Third, for the current frame, check the noise status using track predicate operator IsNoisyNow. If true, mark a specified number of frames in the past as noisy. In addition, update noise related properties of the track 76 (block 364).

Fourth, update the span of the track 76 (block 366).

Fifth, if one of the following conditions is met, collect the count carried by track 76 (block 374):

a) the track 76 is not noisy at the beginning, but it has been noisy for longer than the specified stationary track timeout (block 368); or b) the track 76 is not in the background at the beginning, but it has been in the background for longer than the specified stationary track timeout (block 370).

Finally, update the current zone information (block 372).

2.2.4 Track Prediction Calculation

It helps to use a predicted position of the track 76 when looking for best matching detect 58. The predicted position is calculated by linear extrapolation on positions of the track 76 in the past three seconds.

2.2.5 Analysis and Processing of Old Track

This is the first phase of object tracking. Active tracks 88 are tracks 76 that are either created or extended with human object detects 58 in the previous frame. When there is no best matching human object detect 58 for the track 76, the track 76 is considered as inactive.

This phase mainly deals with tracks 76 that are inactive for a certain period of time or are marked for deletion in previous frame 56. Track analysis is performed on tracks 76 that have been inactive for a long time to decide whether to group them with existing tracks 74 or to mark them for deletion in the next frame 56. Tracks 76 are deleted if the tracks 76 have been marked for deletion in the previous frame 56, or the tracks 76 are inactive and were created a very short period of time before. If the counts of the soon-to-be deleted tracks 76 shall not be ignored according to the IsCountIgnored predicate operator, collect the counts of the tracks 76.

2.2.6 First Pass Matching Between Tracks and Detects

After all tracks 76 are analyzed for grouping or deletion, this phase searches for optimal matches between the human object detects 58 (i.e. the set of local maxima found in the object detection phase) and tracks 76 that have not been deleted.

First, check every possible pair of track 76 and detect 58 and put the pair into a candidate list if all of the following conditions are met:

1) The track 76 is active, or it must be long enough (e.g. with more than three points), or it just became inactive a short period of time ago (e.g. it has less than three frames);

2) The smaller of the distances from center of the detect 58 to the last two points of the track 76 is less than two thirds of the specified detection search range when the track 76 hasn't moved very far (e.g. the span of the track 76 is less than the specified minimum human head size and the track 76 has more than 3 points);

3) If the detect 58 is in the background, the maximum height of the detect 58 must be greater than or equal to the specified minimum person height;

4) If the detect 58 is neither in the background nor close to dead zones or height map boundaries, and the track 76 is neither in the background nor is noisy in the previous frame, and a first distance from the detect 58 to the predicted position of the track 76 is less than a second distance from the detect 58 to the end position of the track 76, use the first distance as the matching distance. Otherwise, use the second distance as the matching distance. The matching distance has to be less than the specified detection search range;

5) The difference between the maximum height of the detect 58 and the height oblast point of the track 76 must be less than the specified maximum height difference; and 6) If either the last point off-track 76 or the detect 58 is in the background, or the detect 58 is close to dead zones or height map boundaries, the distance from the track 76 to the detect 58 must be less than the specified background detection search range, which is generally smaller than the threshold used in condition (4).

Sort the candidate list in terms of the distance from the detect 58 to the track 76 or the height difference between the detect 58 and the track 76 (if the distance is the same) in ascending order.

The sorted list contains pairs of detects 58 and tracks 76 that are not paired. Run through the whole sorted list from the beginning and check each pair. If either the detect 58 or the track 76 of the pair is marked "paired" already, ignore the pair. Otherwise, mark the detect 58 and the track 76 of the pair as "paired". [0144] 2.2.7 Search of Suboptimal Location For Unpaired Tracks Due to sparseness nature of the disparity map 50 and the height map 56, some human objects may not generate local maxima in the height map 56 and therefore may be missed in the object detection process 108. In addition, the desired local maxima might get suppressed by a neighboring higher local maximum from a taller object. Thus, some human object tracks 76 may not always have a corresponding local maximum in the height map 56. This phase tries to resolve this issue by searching for a suboptimal location for a track 76 that has no corresponding local maximum in the height map 56 at the current time. Tracks 76 that have already been paired with a detect 58 in the previous phase might go through this phase too to adjust their locations if the distance between from end of those tracks to their paired detects is much larger than their steps in the past. In the following description, the track 76 currently undergoing this phase is called Track A. The search is performed in the following steps.

Figure 7A:
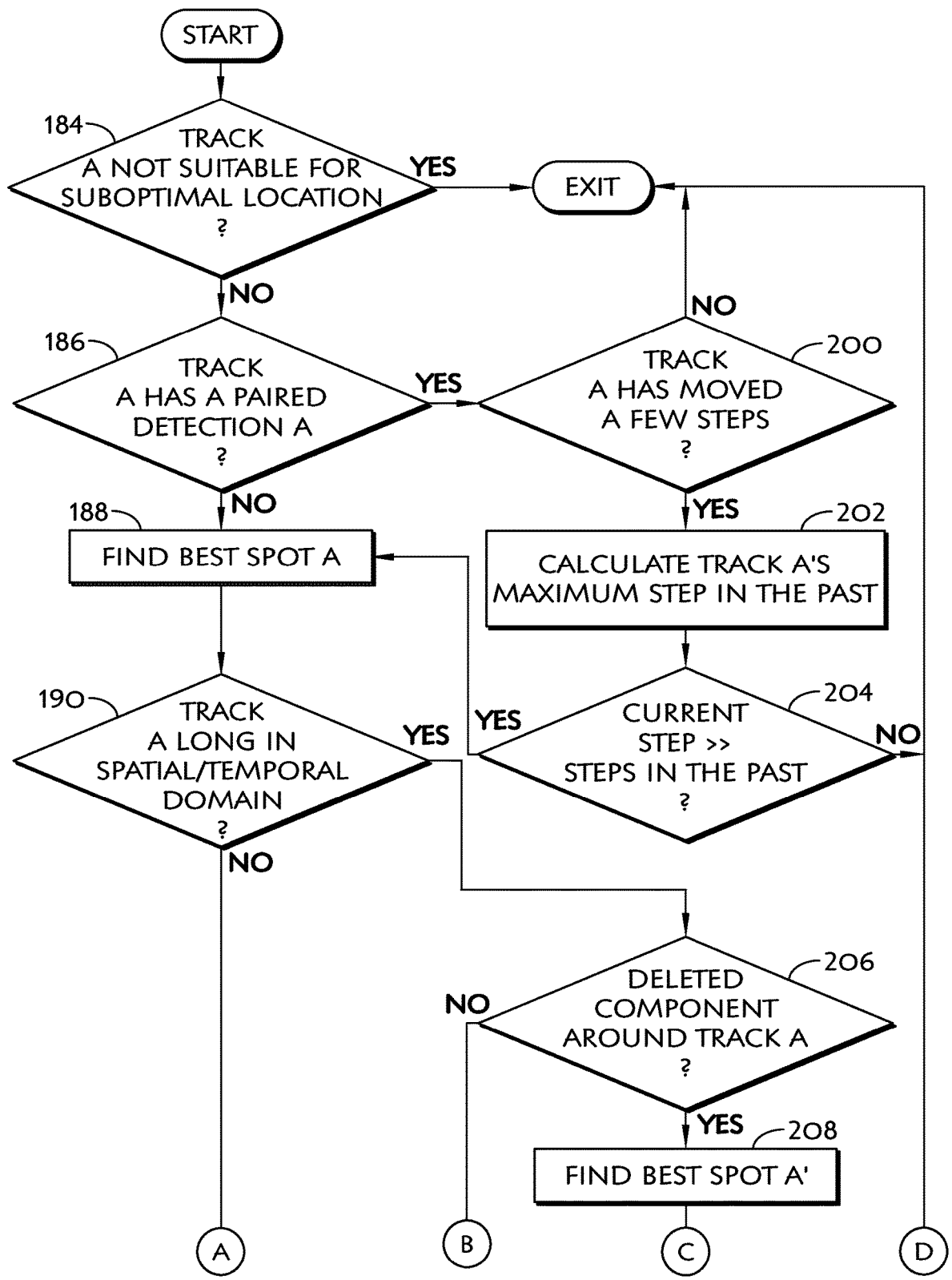
FIGS. 7A-B are a first part of a flow diagram describing the flow of processes for suboptimal localization of unpaired tracks.
Figure 7B:
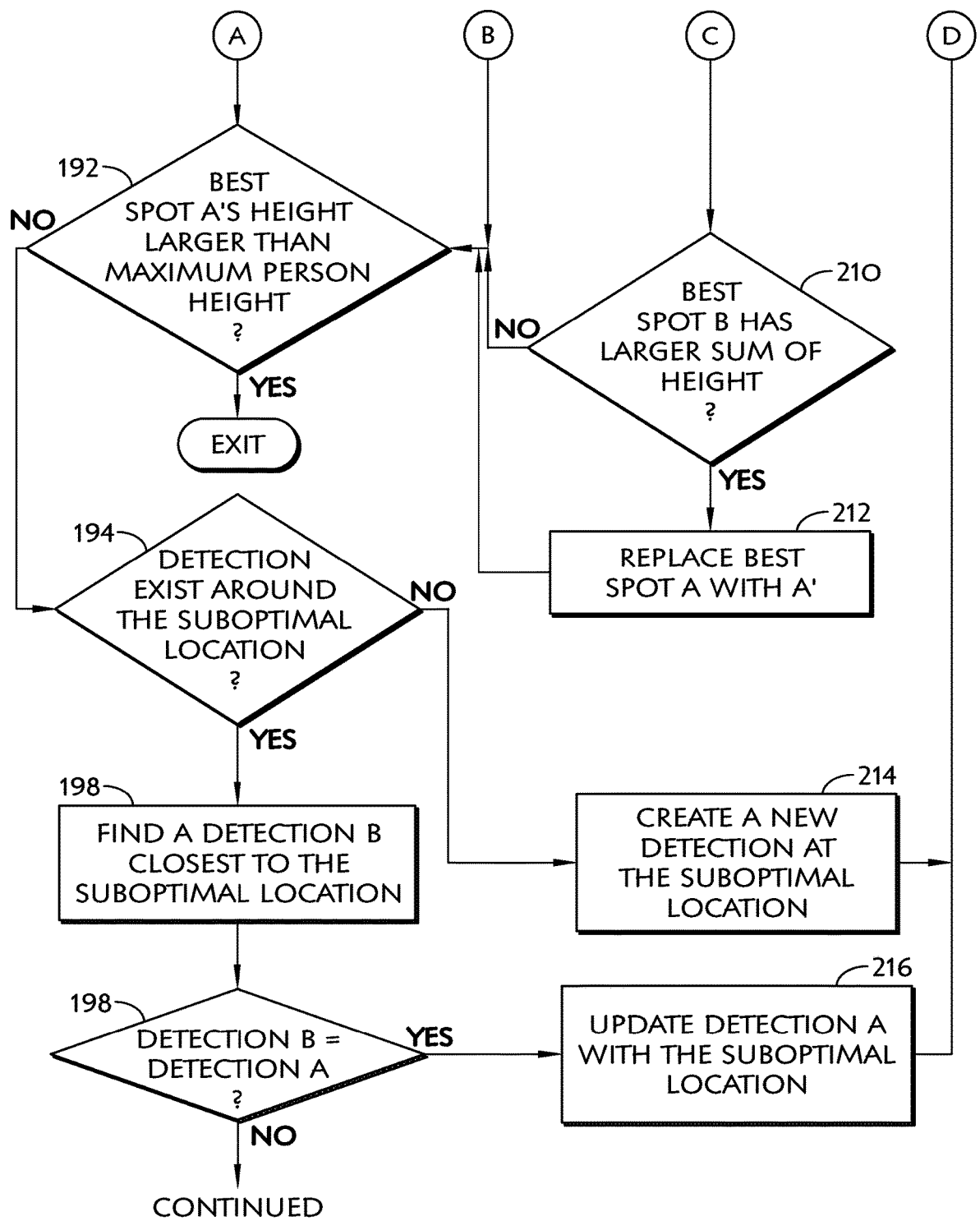

First, referring to FIG. 7, if Track A is deemed not suitable for the suboptimal location search operation (i.e., it is inactive, or it's in the background, or it's close to the boundary of the height map 56 or dead zones, or its height in last frame was less than the minimum person height (block 184)), stop the search process and exit. Otherwise, proceed to the next step.

Second, if Track A has moved a few steps (block 200) (e.g., three steps) and is paired with a detection (called Detection A) (block 186) that is not in the background and whose current step is much larger than its maximum moving step within a period of time in the past specified by a track time out parameter (block 202, 204), proceed to the next step. Otherwise, stop the search process and exit.

Third, search around the end point of Track A in a range defined by its maximum moving steps for a location with the largest height sum in a predefined window and call this location Best Spot A (block 188). If there are some detects 58 deleted in the process of merging of closely located detects in the object detection phase and Track A is long in either the spatial domain or the temporal domain (e.g. the span of Track A is greater than the specified noisy track span threshold, or Track A has more than three frames) (block 190), find the closest one to the end point of Track too. If its distance to the end point of Track A is less than the specified detection search range (block 206), search around the deleted component for the position with the largest height sum and call it Best Spot AI (block 208). If neither Best Spot A nor Best Spot AI exists, stop the search process and exit. If both Best Spot A and Best Spot AI exist, choose the one with larger height sum. The best spot selected is called suboptimal location for Track A. If the maximum height at the suboptimal location is greater than the predefined maximum person height (block 192), stop the search and exit. If there is no current detection around the suboptimal location (block 194), create a new detect 58 (block 214) at the suboptimal location and stop the search. Otherwise, find the closest detect 58 to the suboptimal location and call it Detection B (block 196). If Detection B is the same detection as Detection A in step 2 (block 198), update Detection A's position with the suboptimal location (block 216) and exit the search. Otherwise, proceed to the next step.

Figure 8A:
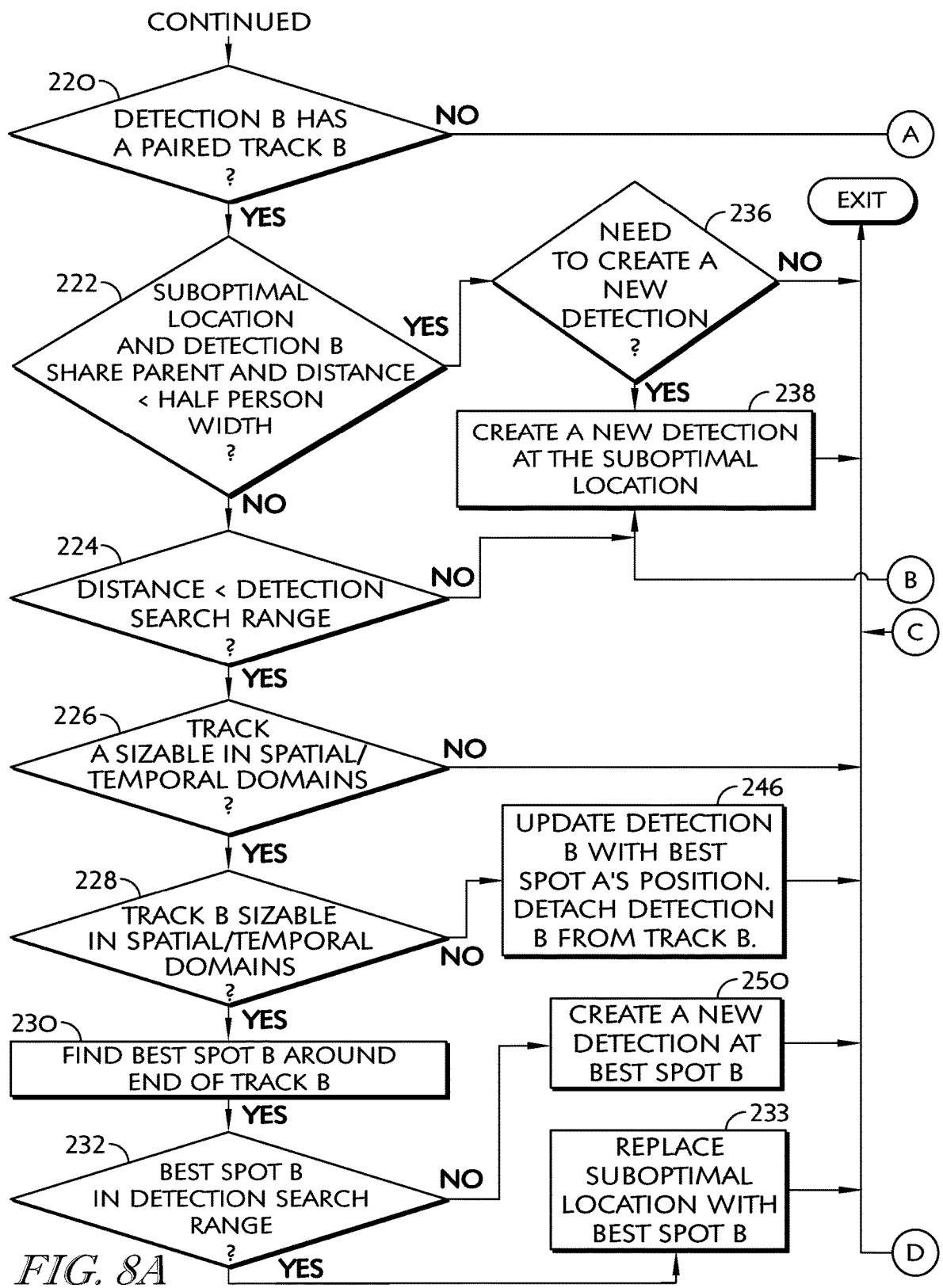
FIGS. 8A-B are a second part of the flow diagram of FIG. 7 describing the flow of processes for suboptimal localization of nnpaired tracks.
Figure 8B:
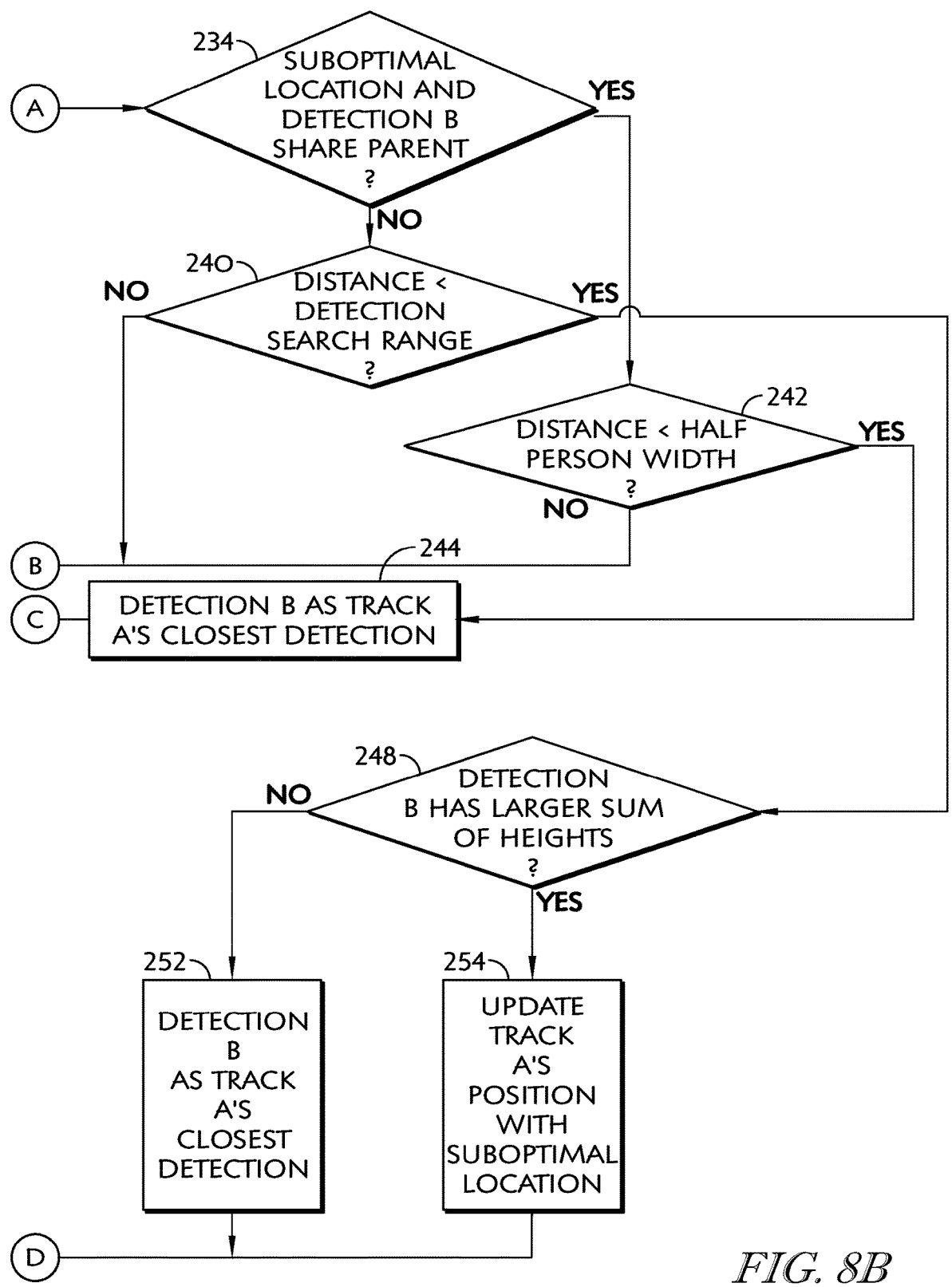

Fourth, referring to FIG. 8, if Detection B is not already paired with a track 76 (block 220), proceed to the next step. Otherwise, call the paired track of the Detection B as Track B and perform one of the following operations in the given order before exiting the search:

1) When the suboptimal location for Track A and Detection B are from the same parent component (e.g. in the support of the same first pass component) and the distance between Track A and Detection B is less than half of the specified maximum person width, create a new detect 58 at the suboptimal location (block 238) if all of the following three conditions are met: (i) the difference between the maximum heights at the suboptimal location and Detection B is less than a specified person height error range; (ii) the difference between the height sums at the two locations is less than half of the greater one; (iii) the distance between them is greater than the specified detection search range and the trk_range values of both Track A and Track B are greater than the specified noisy track offset. Otherwise, ignore the suboptimal location and exit;

2) If the distance between the suboptimal location and Detection B is greater than the specified detection search range, create a new detect 58 at the suboptimal location and exit;

3) If Track A is not sizable in both temporal and spatial domains (block 226), ignore the suboptimal location;

4) If Track B is not sizable in both temporal and spatial domain (block 228), detach Track B from Detection B and update Detection B's position with the suboptimal location (block 246). Mark Detection B as Track A's closest detection;

5) Look for best spot for Track B around its end position (block 230). If the distance between the best spot for Track B and the suboptimal location is less than the specified detection search range (block 232) and the best spot for Track B has a larger height sum, replace the suboptimal location with the best spot for Track B (block 233). If the distance between is larger than the specified detection search range, create a detect 58 at the best spot for Track B (block 250). Update Detection A's location with the suboptimal location if Detection A exists.

Fifth, if the suboptimal location and Detection B are not in the support of the same first pass component, proceed to the next step. Otherwise create a new detection at the suboptimal location if their distance is larger than half of the specified maximum person width, or ignore the suboptimal location and mark Detection B as Track A's closest detection otherwise.

Finally, create a new detect 58 at suboptimal location and mark Detection B as Track A's closest detection (block 252) if their distance is larger than the specified detection search range. Otherwise, update Track A's end position with the suboptimal location (block 254) if the height sum at the suboptimal location is greater than the height sum at Detection B, or mark Detection Bas Track A's closest detection otherwise.

2.2.8 Second Pass Matching Between Tracks and Detects

After the previous phase, a few new detections may be added and some paired detects 72 and tracks 76 become unpaired again. This phase looks for the optimal match between current unpaired detects 72 and tracks 76 as in the following steps.

Figure 9A:
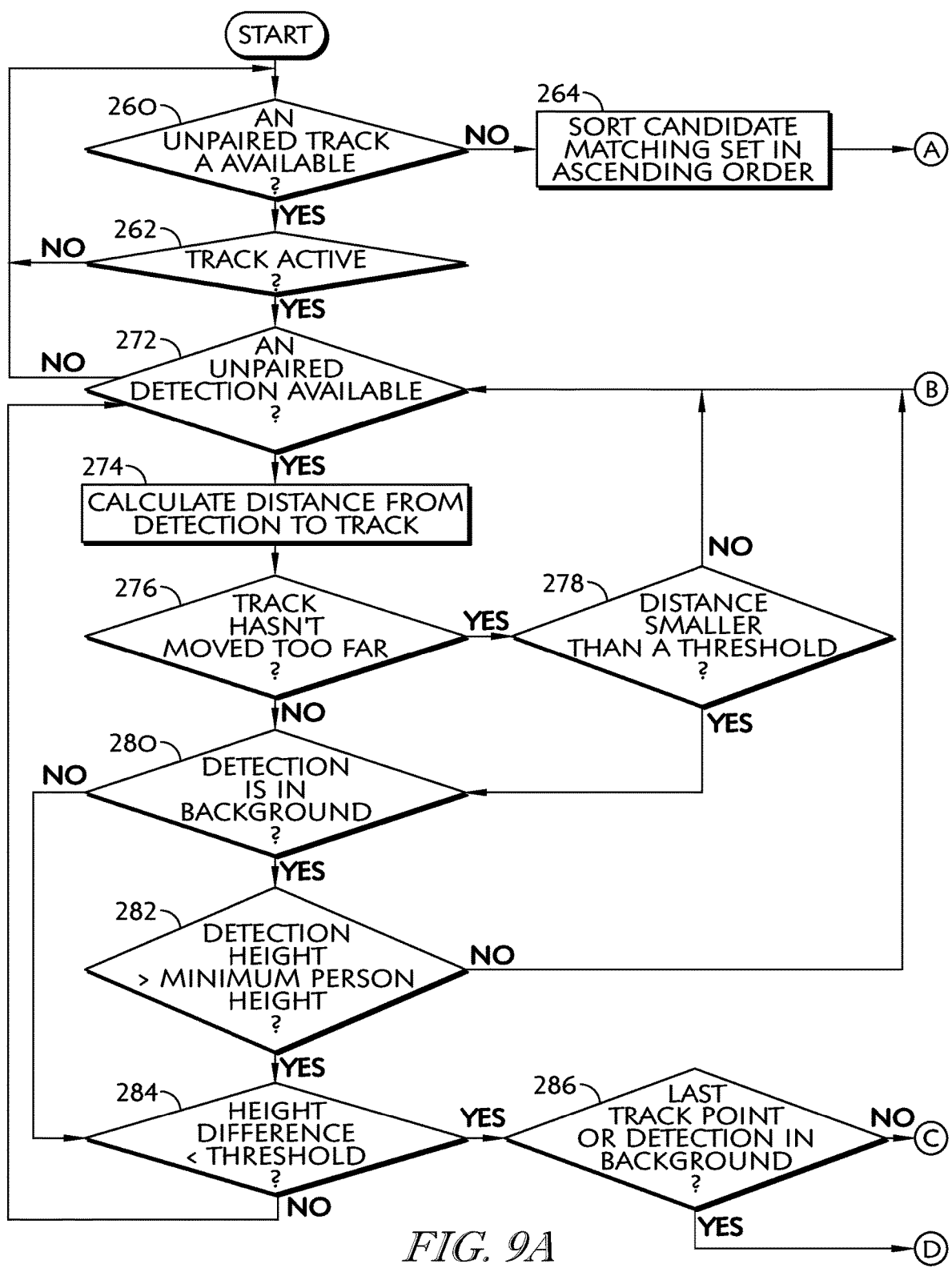
FIGS. 9A-B are is a flow diagram describing the flow of processes for second pass matching of tracks and object detects.
Figure 9B:
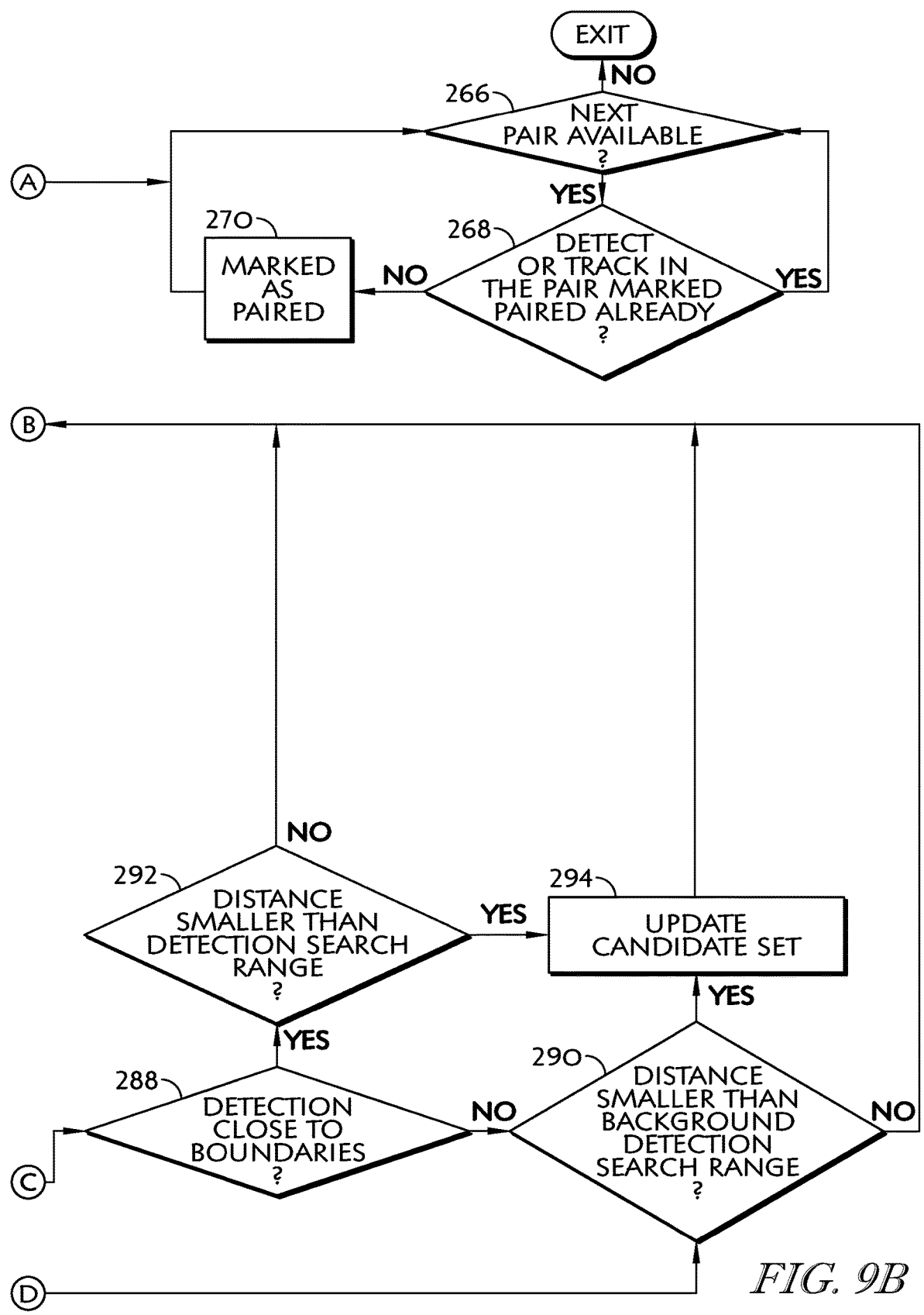

For every pair of track 76 and detect 58 that remain unpaired, put the pair into a candidate list if all of the following five conditions are met:

1) the track 76 is active (block 262 in FIG. 9);

2) the distance from detect 58 to the end point of the track 76 (block 274) is smaller than two thirds of the specified detection search range (block 278) when the track doesn't move too far (e.g. the span of the track 76 is less than the minimal head size and the track 76 has more than three points (block 276));

3) if the detect 58 is in the background (block 280), the maximum height of the detect 58 must be larger than or equal to the specified minimum person height (block 282);

4) the difference between the maximum height and the height of the last point of the track 76 is less than the specified maximum height difference (block 284);

5) the distance from the detect 58 to the track 76 must be smaller than the specified background detection search range, if either the last point of the track 76 or the detect 58 is in background (block 286), or the detect 58 is close to dead zones or height map boundaries (block 288); or if not, the distance from the detect 58 to the track 76 must be smaller than the specified detection search range (block 292).

Sort the candidate list in terms of the distance from the detect 58 to the track 76 or the height difference between the two (if distance is the same) in ascending order (block 264).

The sorted list contains pairs of detects 58 and tracks 76 which are not paired at all at the beginning. Then run through the whole sorted list from the beginning and check each pair. If either the detect 58 or the track 76 of the pair is marked "paired" already, ignore the pair. Otherwise, mark the detect 58 and the track 76 of the pair as "paired" (block 270).

2.2.9 Track Update or Creation

Figure 10:
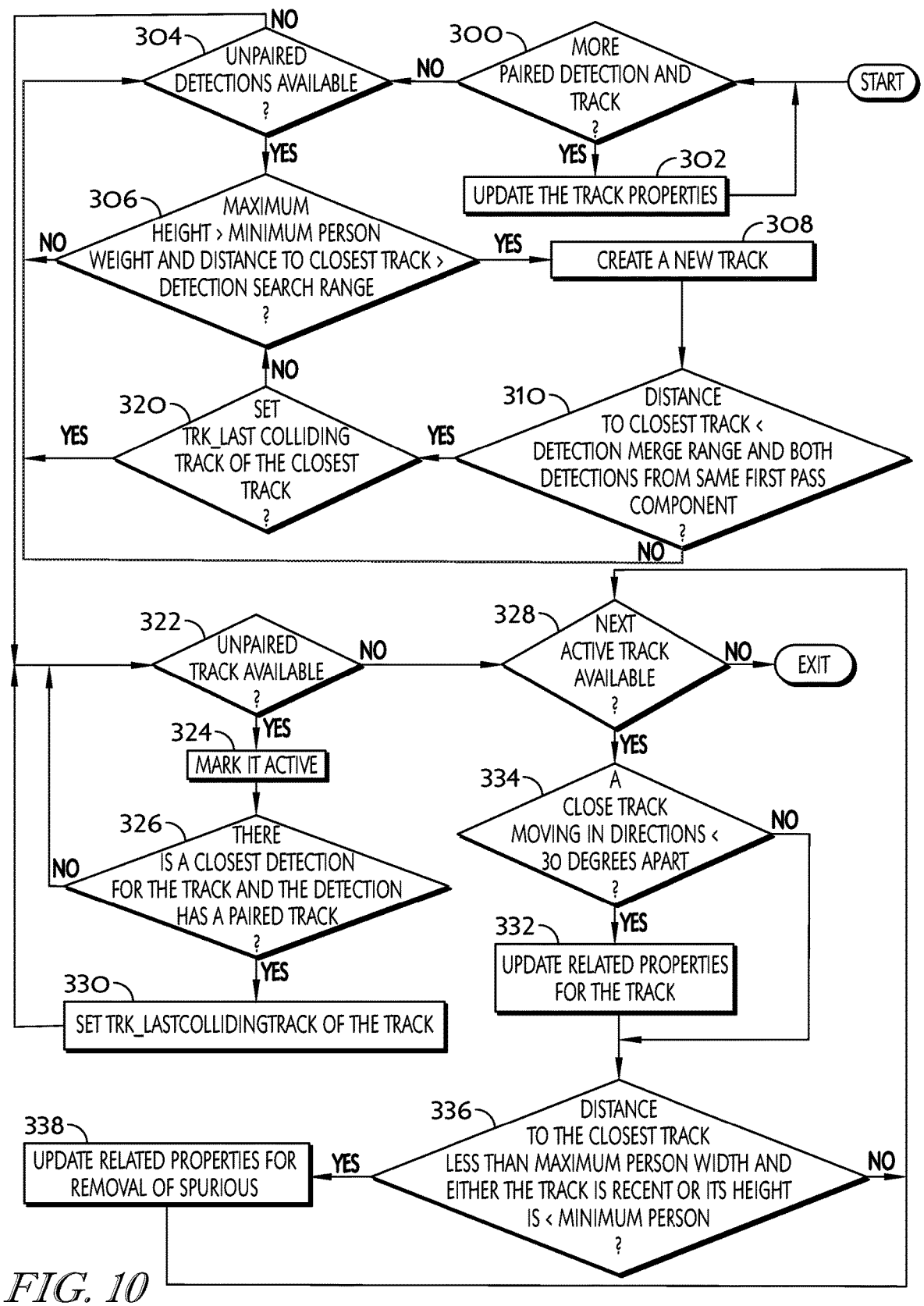
FIG. 10 is a flow diagram describing the flow of processes for track updating or creation.

After the second pass of matching, the following steps are performed to update old tracks or to create new tracks:

First, referring to FIG. 10, for each paired set of track 76 and detect 58 the track 76 is updated with the information of the detect 58 (block 300, 302).

Second, create a new track 80 for every detect 58 that is not matched to the track 76 if the maximum height of the detect 58 is greater than the specified minimum person height, and the distance between the detect 58 and the closest track 76 of the detect 58 is greater than the specified detection search range (block 306, 308). When the distance is less than the specified detection merge range and the detect 58 and the closest track 76 are in the support of the same first pass component (i.e., the detect 58 and the track 76 come from the same first pass component), set the trk_lastCollidingTrack of the closest track 76 to the ID of the newly created track 80 if there is one (block 310, 320).

Third, mark each unpaired track 77 as inactive (block 324). If that track 77 has a marked closest detect and the detect 58 has a paired track 76, set the trk_lastColliding-Track property of the current track 77 to the track ID of the paired track 76 (block 330).

Fourth, for each active track 88, search for the closest track 89 moving in directions that are at most thirty degrees from the direction of the active track 88. If the closest track 89 exists, the track 88 is considered as closely followed by another track, and "Shopping Cart Test" related properties of the track 88 are updated to prepare for "Shopping Cart Test" when the track 88 is going to be deleted later (block 334).

Finally, for each active track 88, search for the closest track 89. If the distance between the two is less than the specified maximum person width and either the track 88 has a marked closest detect or its height is less than the specified minimum person height, the track 88 is considered as a less reliable false track. Update "False Track" related properties to prepare for the "False Track" test later when the track 88 is going to be deleted later (block 338).

As a result, all of the existing tracks 74 are either extended or marked as inactive, and new tracks 80 are created.

2.2.10 Track Analysis

Track analysis is applied whenever the track 76 is going to be deleted. The track 76 will be deleted when it is not paired with any detect for a specified time period. This could happen when a human object moves out of the field view 44, or when the track 76 is disrupted due to poor disparity map reconstruction conditions such as very low contrast between the human object and the background.

Figure 6A:
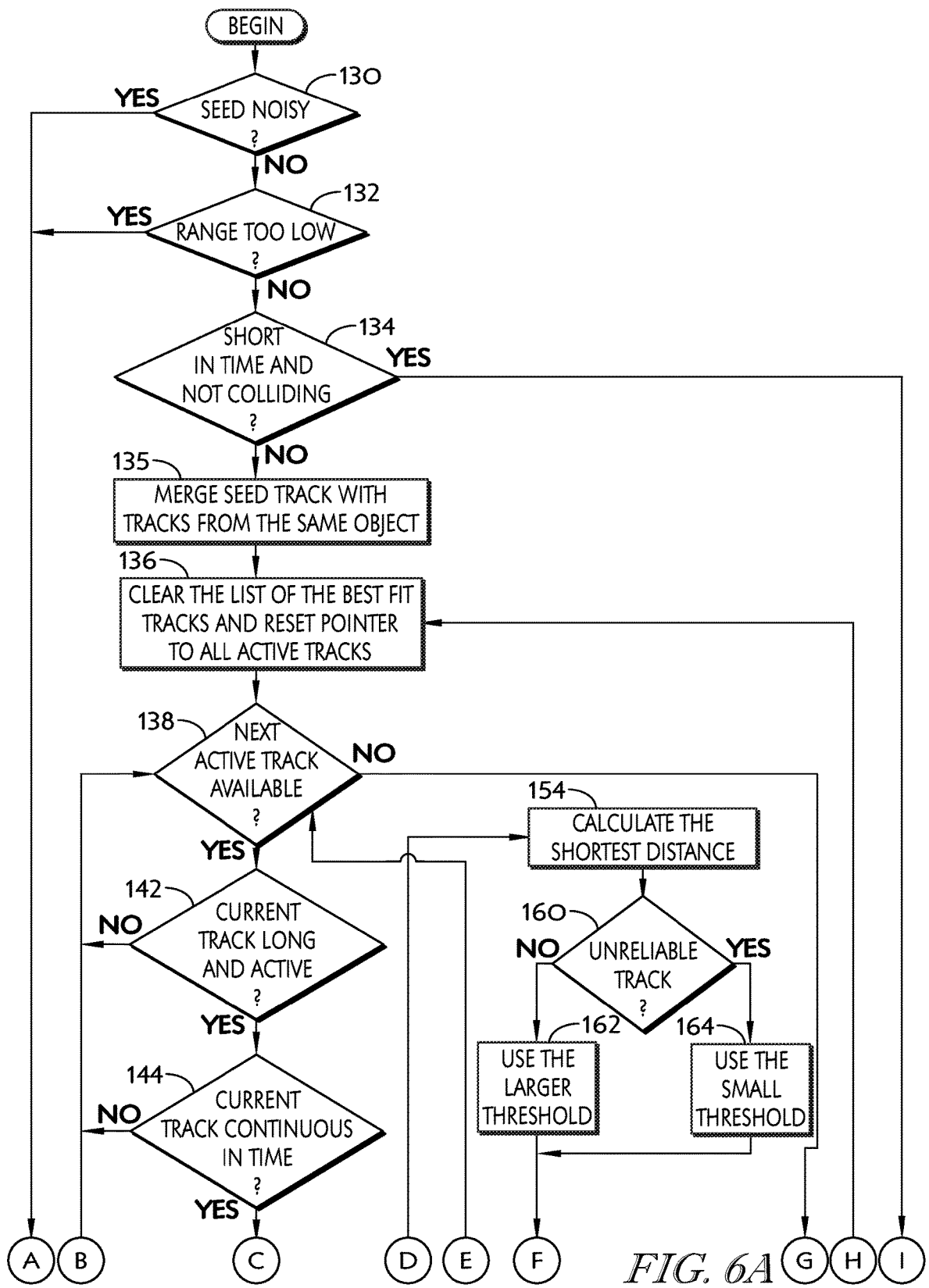
FIGS. 6A-B are a flow diagram describing the flow of processes for track analysis.
Figure 6B:
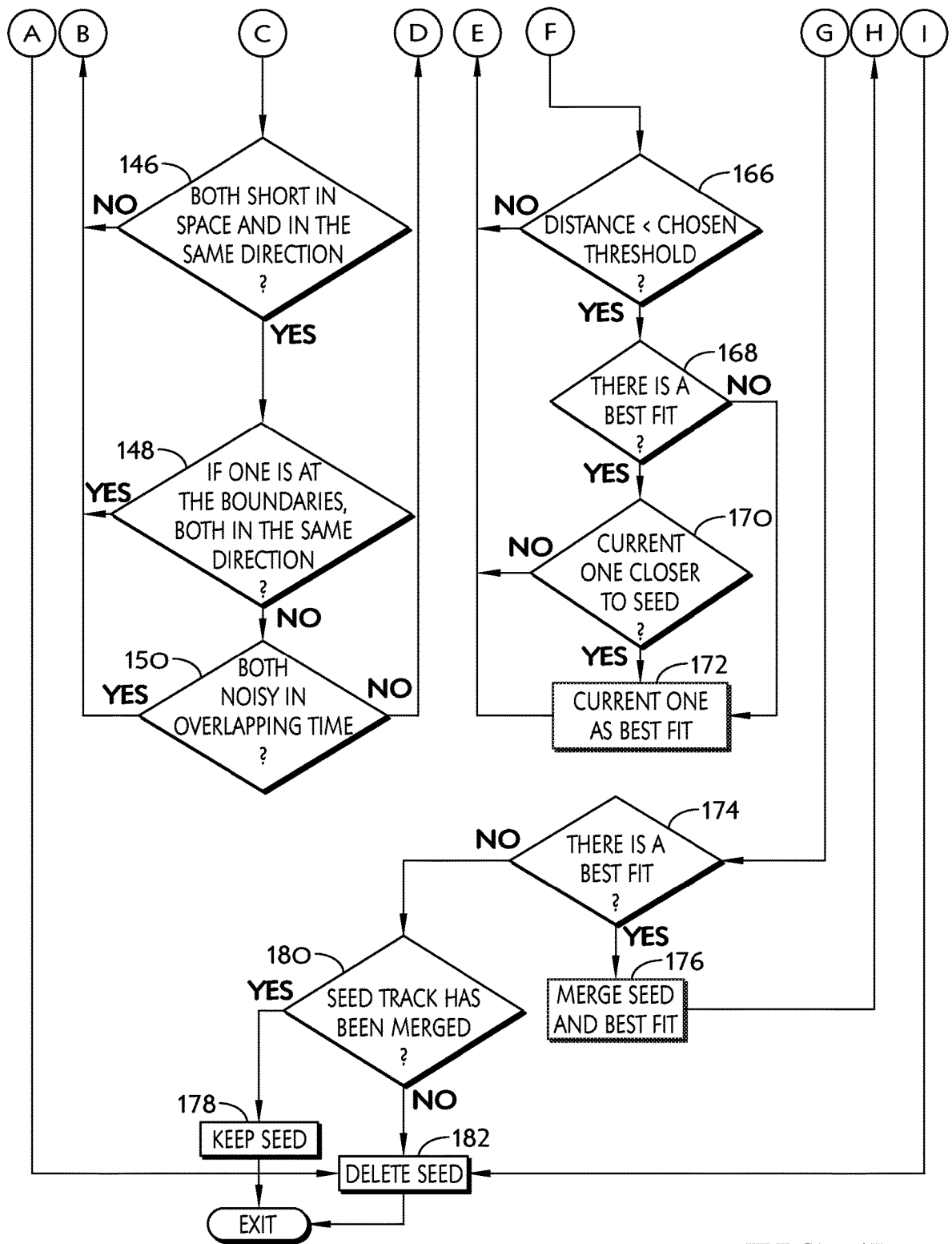

The goal of track analysis is to find those tracks that are likely continuations of some soon-to-be deleted tracks, and merge them. Track analysis starts from the oldest track and may be applied recursively on newly merged tracks until no tracks can be further merged. In the following description, the track that is going to be deleted is called a seed track, while other tracks are referred to as current tracks. The steps of track analysis are as follows:

First, if the seed track was noisy when it was active (block 130 in FIG. 6), or its trkrange is less than a specified merging track span (block 132), or its trk_lastCollidingTrack does not contain a valid track ID and it was created in less than a specified merging track time period before (block 134), stop and exit the track analysis process.

Second, examine each active track that was created before the specified merging track time period and merge an active track with the seed track if the "Is the Same Track" predicate operation on the active track (block 140) returns true.

Third, if the current track satisfies all of the following three initial testing conditions, proceed to the next step. Otherwise, if there exists a best fit track (definition and search criteria for the best fit track will be described in forthcoming steps), merge the best fit track with the seed track (block 172, 176). If there is no best fit track, keep the seed track if the seed track has been merged with at least one track in this operation (block 178), or delete the seed track (block 182) otherwise. Then, exit the track analysis.

The initial testing conditions used in this step are: (1) the current track is not marked for deletion and is active long enough (e.g. more than three frames) (block 142); (2) the current track is continuous with the seed track (e.g. it is created within a specified maximum track timeout of the end point of the seed track) (block 144); (3) if both tracks are short in space (e.g., the trkrange properties of both tracks are less than the noisy track length threshold), then both tracks should move in the same direction according to the relative offset of the trk_start and trk_end properties of each track (block 146).

Fourth, merge the seed track and the current track (block 152). Return to the last step if the current track has collided with the seed track (i.e., the trk_lastCollidingTrack of the current track is the trk_ID of the seed track). Otherwise, proceed to the next step.

Fifth, proceed to the next step if the following two conditions are met at the same time, otherwise return to step 3: (1) if either track is at the boundaries according to the "is at the boundary" checking (block 148), both tracks should move in the same direction; and (2) at least one track is not noisy at the time of merging (block 150). The noisy condition is determined by the "is noisy" predicate operator.

Sixth, one of two thresholds coming up is used in distance checking. A first threshold (block 162) is specified for normal and clean tracks, and a second threshold is specified for noisy tracks or tracks in the background. The second threshold (block 164) is used if either the seed track or the current track is unreliable (e.g. at the boundaries, or either track is noisy, or trkranges of both tracks are less than the specified noisy track length threshold and at least one track is in the background) (block 160), otherwise the first threshold is used. If the shortest distance between the two tracks during their overlapping time is less than the threshold (block 166), mark the current track as the best fit track for the seed track (block 172) and if the seed track does not have best fit track yet or the current track is closer to the seed track than the existing best fit track (block 170). Go to step 3.

2.2.11 Merging of Tracks

Figure 11:
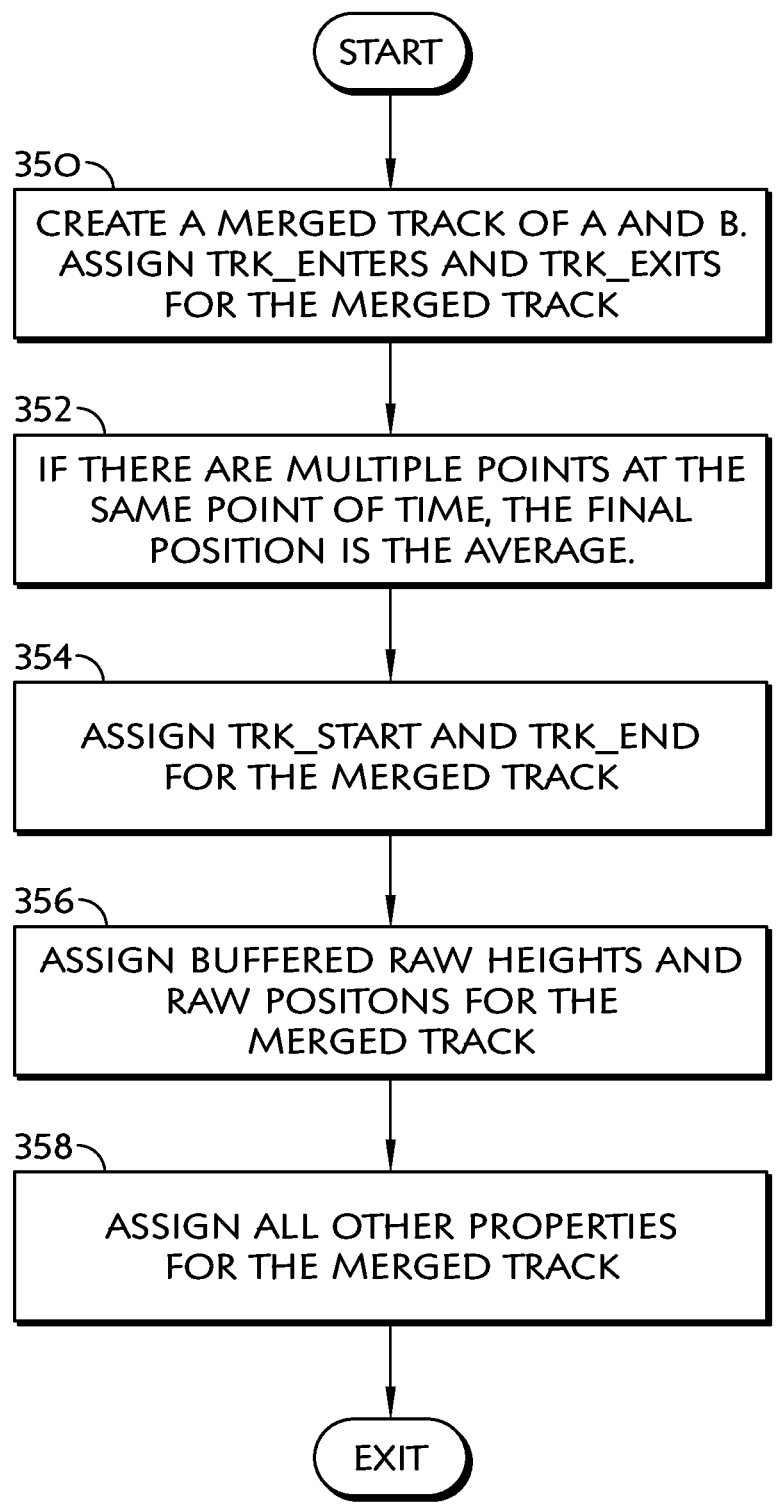
FIG. 11 is a flow diagram describing the flow of processes for track merging.

This operation merges two tracks into one track and assigns the merged track with properties derived from the two tracks. Most properties of the merged track are the sum of the corresponding properties of the two tracks but with the following exceptions:

Referring to FIG. 11, trk_enters and trk_exits properties of the merged track are the sum of the corresponding properties of the tracks plus the counts caused by zone crossing from the end point ozone track to the start point of another track, which compensates the missing zone crossing in the time gap between the two tracks (block 350).

If a point in time has multiple positions after the merge, the final position is the average (block 352).

The trk_start property of the merged track has the same trk_start value as the newer track among the two tracks being merged, and the trk_end property of the merged track has the same trk_end value as the older track among the two (block 354).

The buffered raw heights and raw positions of the merged track are the buffered raw heights and raw positions of the older track among the two tracks being merged (block 356).

Figure 13:
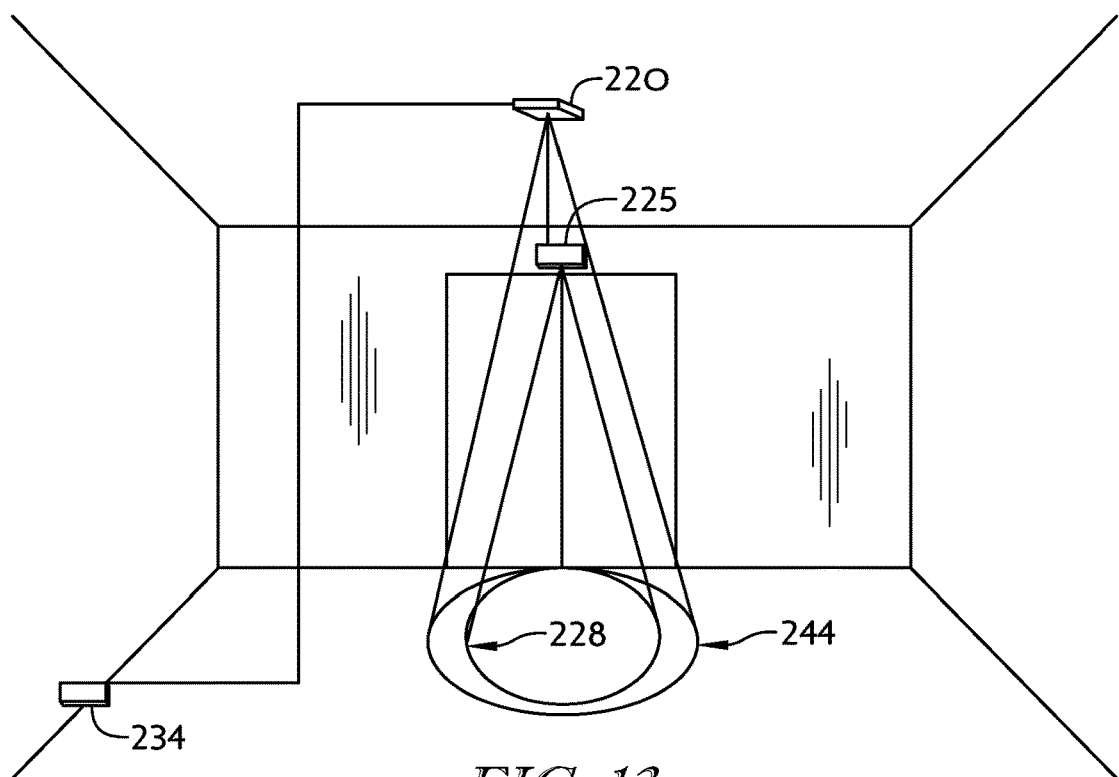
FIG. 13 is a diagram illustrating the image capturing device connected to an exemplary counting system, which includes an RFID reader.
Figure 14:
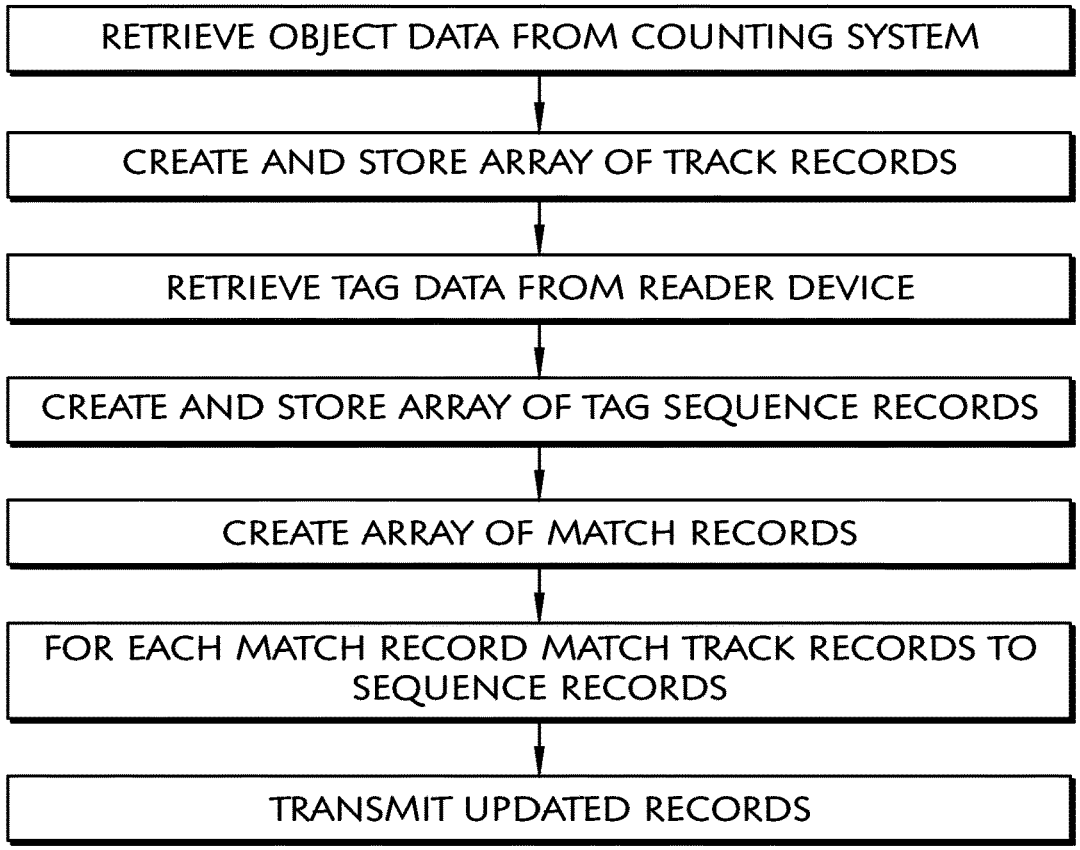
FIG. 14 is a flow diagram depicting the flow of processes for retrieving object data and tag data and generating track arrays and sequence arrays.

As shown in FIG. 13, an alternative embodiment of the present invention may be employed and may comprise a system 210 having an image capturing device 220, a reader device 225 and a counting system 230. In the illustrated embodiment, the at least one image capturing device 220 may be mounted above an entrance or entrances 221 to a facility 223 for capturing images from the entrance or entrances 221. The area captured by the image capturing device 220 is field of view 244. Each image captured by the image capturing device 220, along with the time when the image is captured, is a frame 248. As described above with respect to image capturing device 20 for the previous embodiment of the present invention, the image capturing device 220 may be video based. The manner in which object data is captured is not meant to be limiting so long as the image capturing device 220 has the ability to track objects in time across a field of view 244. The object data 261 may include many different types of information, but for purposes of this embodiment of the present invention, it includes information indicative of a starting frame, an ending frame, and direction.

For exemplary purposes, the image capturing device 220 may include at least one stereo camera with two or more video sensors 246 (similar to the image capturing device shown in FIG. 2), which allows the camera to simulate human binocular vision. A pair of stereo images comprises frames 248 taken by each video sensor 246 of the camera. The image capturing device 220 converts light images to digital signals through which the device 220 obtains digital raw frames 248 comprising pixels. The types of image capturing devices 220 and video sensors 246 should not be considered limiting, and any image capturing device 220 and video sensor 246 compatible with the present system may be adopted.

For capturing tag data 226 associated with RFID tags, such as name tags that may be worn by an employee or product tags that could be attached to pallets of products, the reader device 225 may employ active RFID tags 227 that transmit their tag information at a fixed time interval. The time interval for the present invention will typically be between 1 and 10 times per second, but it should be obvious that other time intervals may be used as well. In addition, the techniques for transmitting and receiving RFID signals are well known by those with skill in the art, and various methods may be employed in the present invention without departing from the teachings herein. An active RFID tag is one that is self-powered, i.e., not powered by the RF energy being transmitted by the reader. To ensure that all RFID tags 227 are captured, the reader device 225 may run continuously and independently of the other devices and systems that form the system 210. It should be evident that the reader device 225 may be replaced by a device that uses other types of RFID tags or similar technology to identify objects, such as passive RFID, ultrasonic, or infrared technology. It is significant, however, that the reader device 225 has the ability to detect RFID tags, or other similar devices, in time across a field of view 228 for the reader device 225. The area captured by the reader device 225 is the field of view 228 and it is preferred that the field of view 228 for the reader device 225 be entirely within the field of view 244 for the image capturing device 220.

The counting system 230 processes digital raw frames 248, detects and follows objects 258, and generates tracks associated with objects 258 in a similar manner as the counting system 30 described above. The counting system 230 may be electronically or wirelessly connected to at least one image capturing device 220 and at least one reader device 225 via a local area or wide area network. Although the counting system 230 in the present invention is located remotely as part of a central server, it should be evident to those with skill in the art that all or part of the counting system 230 may be (i) formed as part of the image capturing device 220 or the reader device 225, (ii) stored on a "cloud computing" network, or (iii) stored remotely from the image capturing device 220 and reader device 225 by employing other distributed processing techniques. In addition, the RFID reader 225, the image capturing device 220, and the counting system 230 may all be integrated in a single device. This unitary device may be installed anywhere above the entrance or entrances to a facility 223. It should be understood, however, that the hardware and methodology that is used for detecting and tracking objects is not limited with respect to this embodiment of the present invention. Rather, it is only important that objects are detected and tracked and the data associated with objects 258 and tracks is used in combination with tag data 226 from the reader device 225 to separately count and track anonymous objects 320 and defined objects 322, which are associated with an RFID tag 227.

To transmit tag data 226 from the reader device 225 to a counting system 230, the reader device 225 may be connected directly to the counting system 230 or the reader device 225 may be connected remotely via a wireless or wired communications network, as are generally known in the industry. It is also possible that the reader device 225 may send tag data to the image capturing device, which in turn transmits the tag data 226 to the counting system 230. The tag data 226 may be comprised of various information, but for purposes of the present invention, the tag data 226 includes identifier information, signal strength information and battery strength information.

To allow the counting system 230 to process traffic data 260, tag data 226 and object data 261 may be pulled from the reader device 225 and the image capturing device 220 and transmitted to the counting system 230. It is also possible for the reader device 225 and the image capturing device 220 to push the tag data 226 and object data 261, respectively, to the counting system 230. It should be obvious that the traffic data 260, which consists of both tag data 226 and object data 261, may also be transmitted to the counting system via other means without departing from the teachings of this invention. The traffic data 260 may be sent as a combination of both tag data 226 and object data 261 and the traffic data 260 may be organized based on time.

The counting system 230 separates the traffic data 260 into tag data 226 and object data 261. To further process the traffic data 260, the counting system 230 includes a listener module 310 that converts the tag data 226 into sequence records 312 and the object data 261 into track records 314. Moreover, the counting system 230 creates a sequence array 352 comprised of all of the sequence records 312 and a track array 354 comprised of all of the track records 314. Each sequence record 312 may consist of (1) a tag ID 312a, which may be an unsigned integer associated with a physical RFID tag 227 located within the field of view 228 of a reader device 220; (2) a startTime 312b, which may consist of information indicative of a time when the RFID tag 227 was first detected within the field of view 228; (3) an endTime, which may consist of information indicative of a time when the RFID tag 227 was last detected within the field of view 228 of the reader device 220; and (4) an array of references to all tracks that overlap a particular sequence record 312. Each track record 314 may include (a) a counter, which may be a unique ID representative of an image capturing device 220 associated with the respective track; (b) a direction, which may consist of information that is representative of the direction of movement for the respective track; (c) startTime, which may consist of information indicative of a time when the object of interest was first detected within the field of view 244 of the image capturing device 220; (d) endTime, which may consist of information indicative of a time when the object of interest left the field of view 244 of the image capturing device 220; and (e) tagID, which (if non-zero) may include an unsigned integer identifying a tag 227 associated with this track record 314.

To separate and track anonymous objects 320, such as shoppers or customers, and defined objects 322, such as employees and products, the counting system 220 for the system must determine which track records 314 and sequence records 312 match one another and then the counting system 220 may subtract the matching track records 312 from consideration, which means that the remaining (unmatched) track records 314 relate to anonymous objects 320 and the track records 312 that match sequence records 314 relate to defined objects 322.

To match track records 314 and sequence records 312, the counting system 220 first determines which track records 314 overlap with particular sequence records 312. Then the counting system 220 creates an array comprised of track records 312 and sequence records 314 that overlap, which is known as a match record 316. In the final step, the counting system 220 iterates over the records 312, 314 in the match record 316 and determines which sequence records 312 and track records 314 best match one another. Based on the best match determination, the respective matching track record 314 and sequence record 312 may be removed from the match record 316 and the counting system will then iteratively move to the next sequence record 312 to find the best match for that sequence record 312 until all of the sequence records 312 and track records 314 in the match record 316 have matches, or it is determined that no match exists.

Figure 15:
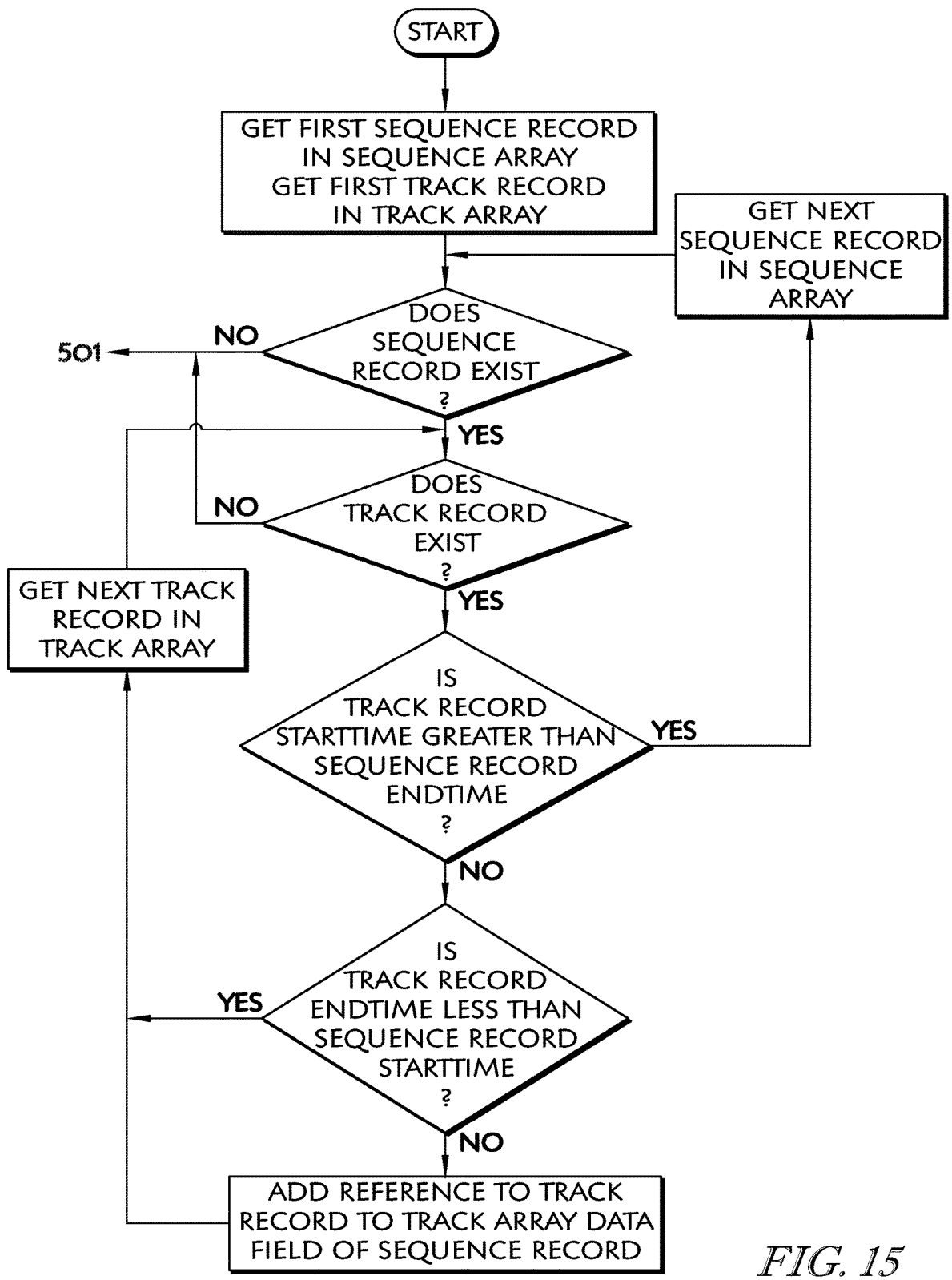
FIG. 15 is a flow diagram depicting the flow of processes for determining whether any overlap exists between any of the track records and any of the sequence records.

The steps for determining which sequence records 312 and track records 314 overlap are shown in FIG. 15. To determine which records 312, 314 overlap, the counting system 220 iterates over each sequence record 312 in the sequence array 352 to find which track records overlap with a particular sequence records 312; the term "overlap" generally refers to track records 314 that have startTimes that are within a window defined by the startTime and endTime of a particular sequence records 312. Therefore, for each sequence record 312, the counting system 230 also iterates over each track record 314 in the track array 354 and adds a reference to the respective sequence record 312 indicative of each track record 314 that overlaps that sequence record 314. Initially, the sequence records have null values for overlapping track records 314 and the track records have tagID fields set to zero, but these values are updated as overlapping records 312, 314 are found. The iteration over the track array 254 stops when a track record 314 is reached that has a startTime for the track record 314 that exceeds the endTime of the sequence record 312 at issue.

Figure 16:
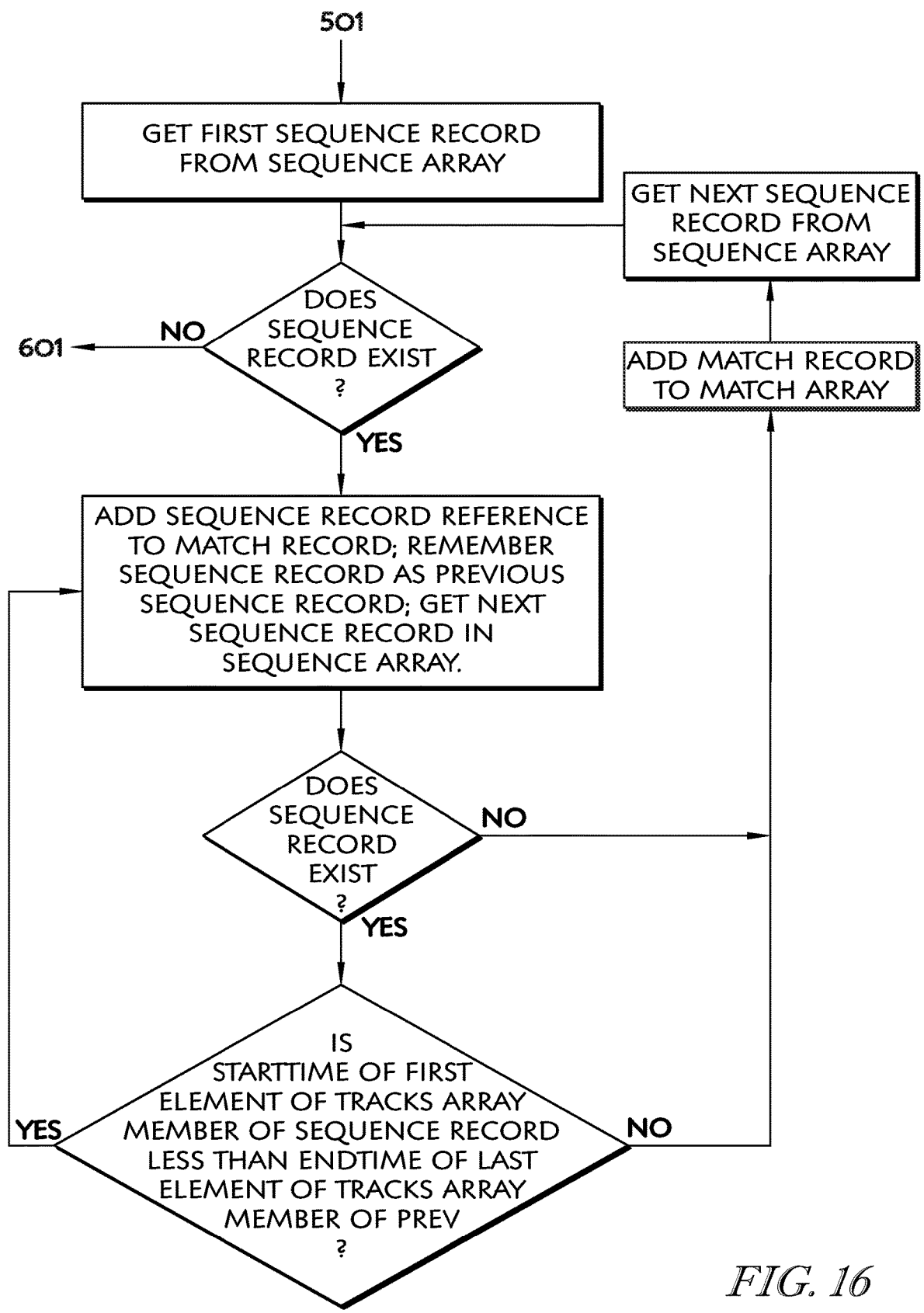
FIG. 16 is a flow diagram depicting the flow of processes for generating a match record 316 for each group of sequence records whose track records overlap.

To create an array of "overlapped" records 312, 314 known as match records 316, the counting system 230 iterates over the sequence array 352 and for each sequence record 312a, the counting system 230 compares the track records 314a that overlap with that sequence record 312a to the track records 314b that overlap with the next sequence record 312b in the sequence array 352. As shown in FIG. 16, a match record 316 is then created for each group of sequence records 312 whose track records 314 overlap. Each match record 316 is an array of references to all sequence records 312 whose associated track records 314 overlap with each other and the sequence records 312 are arranged in earliest-to-latest startTime order.

The final step in matching sequence records 312 and track records 314 includes the step of determining which sequence records 312 and track records 314 are the best match. To optimally match records 312, 314, the counting system 230 must consider direction history on a per tag 227 basis, i.e., by mapping between the tagID and the next expected match direction. The initial history at the start of a day (or work shift) is configurable to either "in" or "out", which corresponds to employees initially putting on their badges or name tags outside or inside the monitored area.

Figure 17:
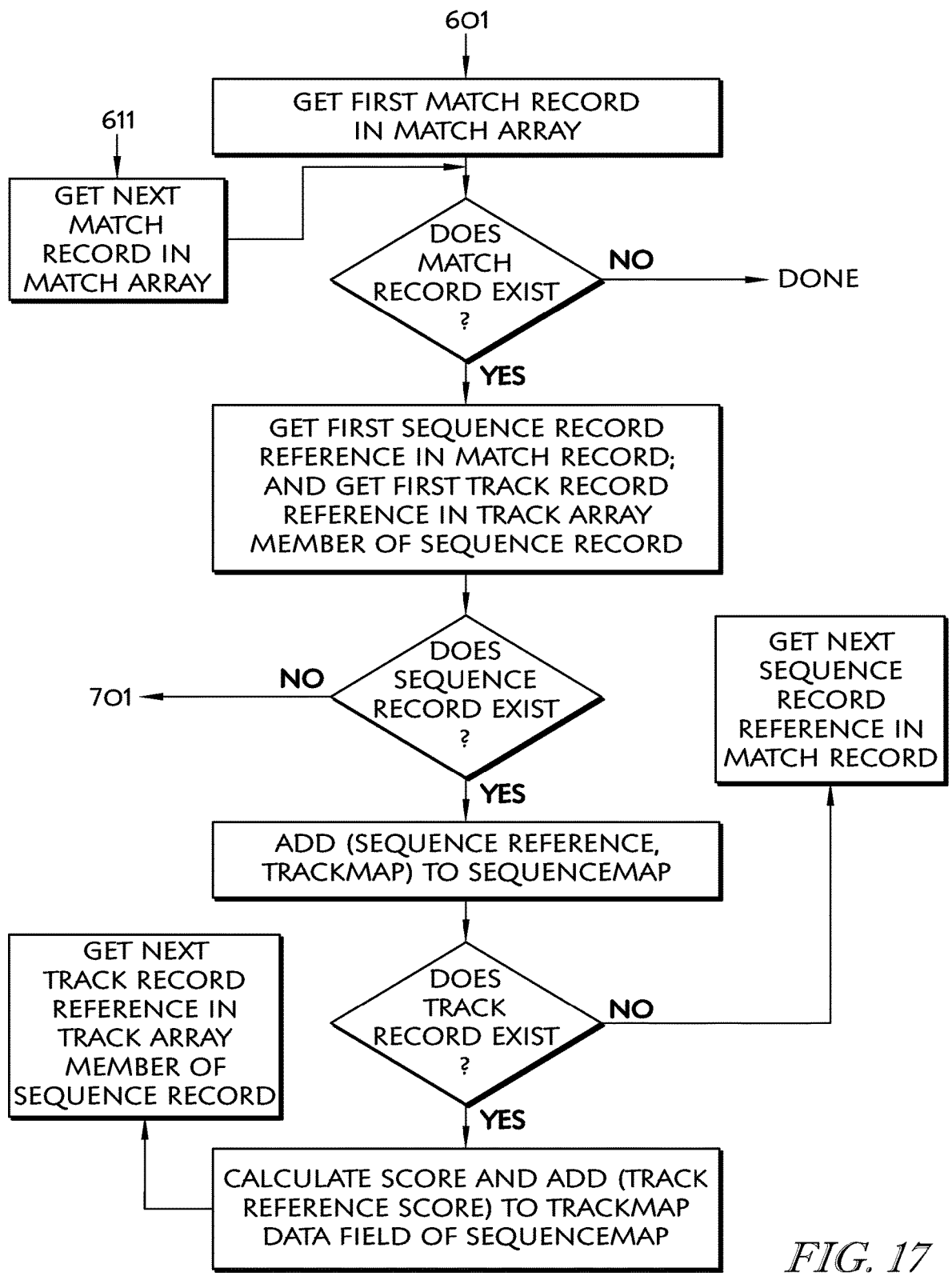
FIG. 17 is a flow diagram depicting the flow of processes for calculating the match quality scores.

To optimally match records 312, 314, a two level map data structure, referred to as a scoreboard 360, may be built. The scoreboard 360 has a top level or sequencemap 362 and a bottom level or trackmap 364. Each level 362, 364 has keys 370, 372 and values 374, 376. The keys 370 for the top level 362 are references to the sequence array 352 and the values 374 are the maps for the bottom level 364. The keys for the bottom level 364 are references to the track array 354 and the values 376 are match quality scores 380. As exemplified in FIG. 17, the match quality scores are determined by using the following algorithm.

1) Determine if the expected direction for the sequence record is the same as the expected direction for the track record. If they are the same, the MULTIPLIER is set to 10. Otherwise, the MULTIPLIER is set to 1.

2) Calculate the percent of overlap between the sequence record 312 and the track record 314 as an integer between 0 and 100 by using the formula:

OVERLAP=(earliest endTime−latest startTime)/(latest endTime−earliest startTime)

If OVERLAP is <0, then set the OVERLAP to 0.

3) Calculate the match quality score by using the following formula:

SCORE=OVERLAP×MULTIPLIER

Figure 18A:
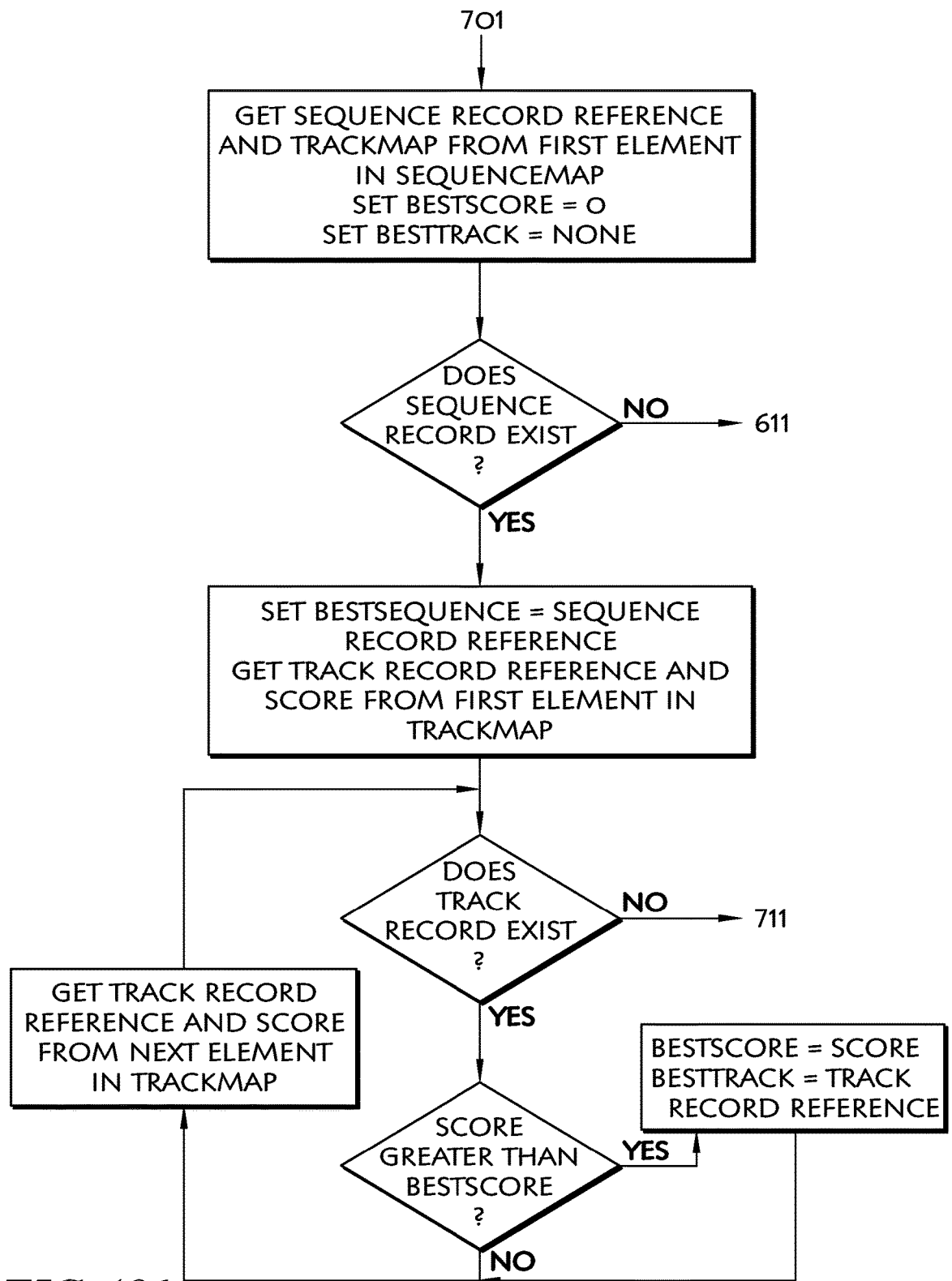
FIG. 18A is a flow diagram depicting the flow of processes for determining which track record is the best match for a particular sequence.

The counting system 230 populates the scoreboard 360 by iterating over the sequence records 312 that populate the sequence array 352 referenced by the top level 372 and for each of the sequence records 312, the counting system 230 also iterates over the track records 314 that populate the track array 354 referenced by the bottom level 374 and generates match quality scores 380 for each of the track records 314. As exemplified in FIG. 18A, once match quality scores 380 are generated and inserted as values 376 in the bottom level 364, each match quality score 380 for each track record 314 is compared to a bestScore value and if the match quality score 380 is greater than the bestScore value, the bestScore value is updated to reflect the higher match quality score 380. The bestTrack reference is also updated to reflect the track record 314 associated with the higher bestScore value.

Figure 18B:
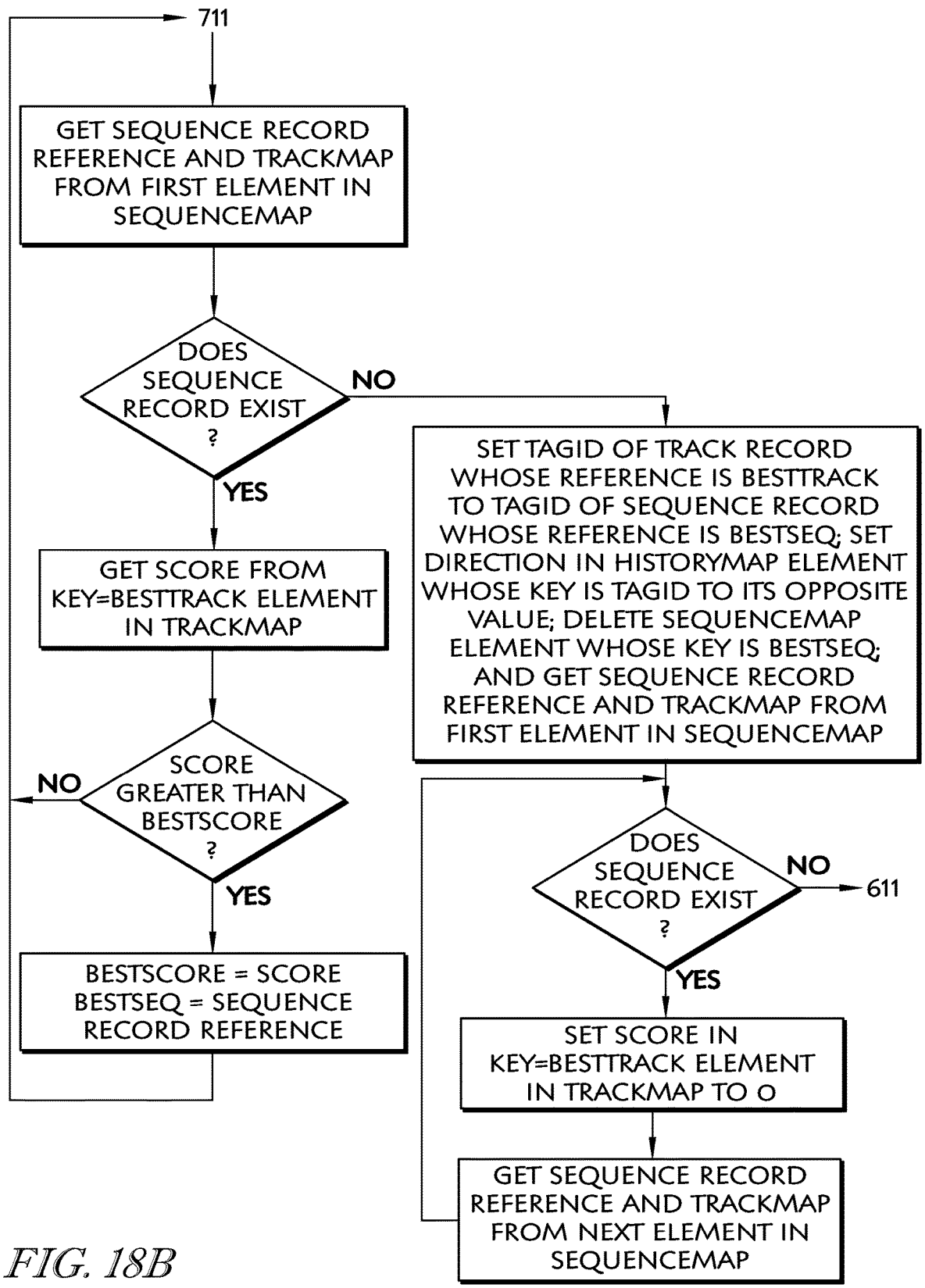
FIG. 18B is a flow diagram depicting the flow of processes for determining the sequence record that holds the sequence record/track record combination with the highest match quality score.

As shown in FIG. 18B, once the bestTrack for the first sequence in the match record is determined, the counting system 230 iterates over the keys 370 for the top level 372 to determine the bestSequence, which reflects the sequence record 312 that holds the best match for the bestTrack, i.e., the sequence record/track record combination with the highest match quality score 380. The bestScore and bestSequence values are updated to reflect this determination. When the bestTrack and bestSequence values have been generated, the sequence record 312 associated with the bestSequence is deleted from the scoreboard 360 and the bestTrack value is set to 0 in all remaining keys 372 for the bottom level 364. The counting system 230 continues to evaluate the remaining sequence records 312 and track records 314 that make up the top and bottom levels 362, 364 of the scoreboard 360 until all sequence records 312 and track records 314 that populate the match record 316 have been matched and removed from the scoreboard 360, or until all remaining sequence records 312 have match quality scores 380 that are less than or equal to 0, i.e., no matches remain to be found. As shown in Table 1, the information related to the matching sequence records 312 and track records 314 may be used to prepare reports that allow employers to track, among other things, (i) how many times an employee enters or exits an access point; (ii) how many times an employee enters or exits an access point with a customer or anonymous object 320; (iii) the length of time that an employee or defined object 322 spends outside; and (iv) how many times a customer enters or exits an access point. This information may also be used to determine conversion rates and other "What If" metrics that relate to the amount of interaction employees have with customers. For example, as shown in Table 2, the system 210 defined herein may allow employers to calculate, among other things: (a) fitting room capture rates; (b) entrance conversion rates; (c) employee to fitting room traffic ratios; and (d) the average dollar spent. These metrics may also be extrapolated to forecast percentage sales changes that may result from increases to the fitting room capture rate, as shown in Table 3.

In some cases, there may be more than one counter 222, which consists of the combination of both the image capturing device 220 and the reader device 225, to cover multiple access points. In this case, separate sequence arrays 352 and track arrays 354 will be generated for each of the counters 222. In addition, a match array 318 may be generated and may comprise each of the match records 316 associated with each of the counters 222. In order to make optimal matches, tag history must be shared between all counters 222. This may be handled by merging, in a time-sorted order, all of the match records in the match array 318 and by using a single history map structure, which is generally understood by those with skill in the art. When matches are made within the match array 318, the match is reflected in the track array 354 associated with a specific counter 222 using the sequence array 352 associated with the same counter 222. This may be achieved in part by using a counter ID field as part of the track records 314 that make up the track array 354 referenced by the bottom level 364 of the scoreboard 360. For example, references to the track arrays 354 may be added to a total track array 356 and indexed by counter ID. The sequence arrays 352 would be handled the same way.

Figure 19:
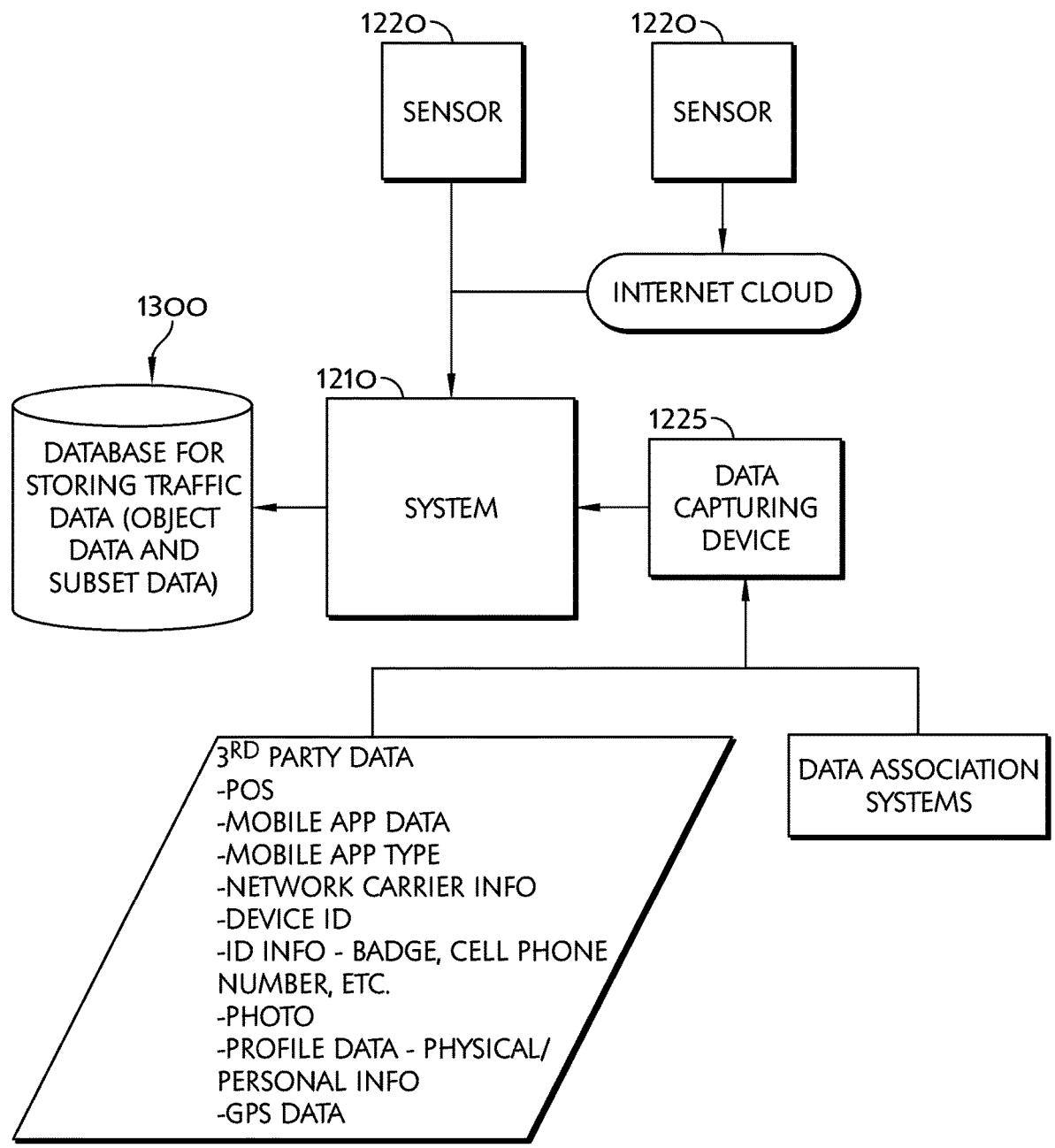
FIG. 19 is a diagram illustrating an image capturing device connected to an exemplary counting system, which also includes a data capturing device.

As shown in FIG. 19, a further embodiment of the present invention may be employed and may comprise a system 1210 having one or more sensors 1220, a data capturing device 1225 and a counting system 1230. In the illustrated embodiment, the sensor(s) 1220 may be image capturing devices and may be mounted above an entrance or entrances 1221 to a facility 1223 for capturing images from the entrance or entrances 1221 and object data 1261. The area captured by the sensor 1220 is a field of view 1244. Each image captured by the sensor 1220, along with the time when the image is captured, is a frame 1248. As described above with respect to image capturing device 20 in connection with a separate embodiment of the present invention, the sensor 1220 may be video based. The object data 1261 may include many different types of information, but for purposes of this embodiment of the present invention, it includes information indicative of a starting frame, an ending frame, and direction. It should be understood that the sensor 1220 may also employ other technology, which is widely known in the industry. Therefore, the manner in which object data 1261 is captured is not meant to be limiting so long as the sensor 1220 has the ability to track objects in time across a field of view 1244.

For exemplary purposes, the sensor 1220 may include at least one stereo camera with two or more video sensors 1246 (similar to the sensor shown in FIG. 2), which allows the camera to simulate human binocular vision. A pair of stereo images comprises frames 1248 taken by each video sensor 1246 of the camera. The sensor 1220 converts light images to digital signals through which the counting system 1330 obtains digital raw frames 1248 comprising pixels. Again, the types of sensors 1220 and video sensors 1246 should not be considered limiting, and it should be obvious that any sensor 1220, including image capturing devices, thermal sensors and infrared video devices, capable of counting the total foot traffic and generating a starting frame, an ending frame, and a direction will be compatible with the present system and may be adopted.

For providing more robust tracking and counting information, the object data 1261 from the sensor 1220 may be combined with subset data 1226 that is captured by the data capturing device 1225. The subset data 1226 may include a unique identifier 1232A, an entry time 1232B, an exit time 1232C and location data 1262 for each object of interest 1258. The subset data 1226 may be generated by data capturing devices 1225 that utilize various methods that employ doorway counting technologies, tracking technologies and data association systems. Doorway counting technologies, such as Bluetooth and acoustic based systems, are similar to the RFID system described above and generate subset data 1226. To generate the subset data 1226, the doorway counting technology may provide a control group with a device capable of emitting a particular signal (i.e., Bluetooth or sound frequency). The system may then monitor a coverage area 1228 and count the signals emitted by the devices associated with each member of the control group to generate subset data 1226. The subset data 1226 from the doorway counting system may be combined with the object data 1261 from the sensor 1220 to generate counts related to anonymous objects and defined objects. The doorway counting system may also be video based and may recognize faces, gender, racial backgrounds or other immutable characteristics that are readily apparent.

The data capturing device 1225 may also use tracking technology that triangulates on a cellular signals emitted from a mobile handsets 1227 to generate location data 1262. The cellular signal may be T-IMSI (associated with GSM systems), CDMA (which is owned by the CDMA Development Group), or Wi-Fi (which is owned by the Wi-Fi Alliance) signals. The data capturing device 1225 may also receive location data 1262, such as GPS coordinates, for objects of interest from a mobile handset 1227. The location data 1262 may be provided by a mobile application on the mobile handset or by the carrier for the mobile handset 1227. User authorization may be required before mobile applications or carriers are allowed to provide location data 1262.

For ease of reference, we will assume that the subset data 1226 discussed below is based on the location data 1262 that is provided by a mobile handset 1227. The data capturing device 1225 receives subset data 1226 associated with a mobile handset 1227, which is transmitted at a fixed time interval. The time interval for the present invention will typically be between 1 and 10 times per second, but it should be obvious that other time intervals may be used as well. In addition, the techniques for transmitting and receiving the signals from mobile handsets are well known by those with skill in the art, and various methods may be employed in the present invention without departing from the teachings herein. To ensure that the subset data 1226 for all mobile handsets 1227 is captured, the data capturing device 1225 may run continuously and independently of the other devices and systems that form the system 1210. As mentioned above, the data capturing device 1225 may employ various types of signals without departing from the scope of this application. It is significant, however, that the data capturing device 1225 has the ability to track mobile handsets 1227, or other similar devices, in time across a coverage area 1228. The area captured by the data capturing device 1225 is the coverage area 1228. In some instances, the field of view 1244 for the sensor may be entirely within the coverage area 1228 for the data capturing device 1225 and vice versa.

The data capturing device 1225 may also use data association systems 1245. Data association systems 1245 take data from other independent systems such as point of sale systems, loyalty rewards programs, point of sale trigger information (i.e., displays that attach cables to merchandise and count the number of pulls for the merchandise), mechanical turks (which utilize manual input of data), or other similar means. Data generated by data association systems 1245 may not include information related to direction, but it may include more detailed information about the physical characteristics of the object of interest.

The counting system 1230 may process digital raw frames 1248, detect and follow objects of interest ("objects") 1258, and may generate tracks associated with objects 1258 in a similar manner as the counting system 30 described above. The counting system 1230 may be electronically or wirelessly connected to at least one sensor 1220 and at least one data capturing device 1225 via a local area or wide area network. Although the counting system 1230 in the present invention is located remotely as part of a central server, it should be evident to those with skill in the art that all or part of the counting system 1230 may be (i) formed as part of the sensor 1220 or the data capturing device 1225, (ii) stored on a "cloud computing" network, or (iii) stored remotely from the sensor 1220 and data capturing device 1225 by employing other distributed processing techniques. In addition, the data capturing device 1225, the sensor 1220, and the counting system 1230 may all be integrated in a single device. This unitary device may be installed anywhere above the entrance or entrances to a facility 1223. It should be understood, however, that the hardware and methodology that is used for detecting and tracking objects is not limited with respect to this embodiment of the present invention. Rather, it is only important that objects are detected and tracked and the data associated with objects 1258 and tracks is used in combination with subset data 1226 from the data capturing device 1225 to separately count and track anonymous objects 1320 and defined objects 1322, which are associated with the mobile handset 1227.

To transmit subset data 1226 from the data capturing device 1225 to a counting system 1230, the data capturing device 1225 may be connected directly to the counting system 1230 or the data capturing device 1225 may be connected remotely via a wireless or wired communications network, as are generally known in the industry. It is also possible that the data capturing device 1225 may send subset data 1226 to the sensor 1220, which in turn transmits the subset data 1226 to the counting system 1230. The subset data 1226 may be comprised of various information, but for purposes of the present invention, the subset data 1226 includes a unique identifier, location based information and one or more timestamps.

To allow the counting system 1230 to process traffic data 1260, subset data 1226 and object data 1261 may be pulled from the data capturing device 1225 and the sensor 1220, respectively, and transmitted to the counting system 1230. It is also possible for the data capturing device 1225 and the sensor 1220 to push the subset data 1226 and object data 1261, respectively, to the counting system 1230. It should be obvious that the traffic data 1260, which consists of both subset data 1226 and object data 1261, may also be transmitted to the counting system via other means without departing from the teachings of this invention. The traffic data 1260 may be sent as a combination of both subset data 1226 and object data 1261 and the traffic data 1260 may be organized based on time.

The counting system 1230 separates the traffic data 1260 into subset data 1226 and object data 1261. To further process the traffic data 1260, the counting system 1230 may include a listener module 1310 that converts the subset data 1226 into sequence records 1312 and the object data 1261 into track records 1314. Moreover, the counting system 1230 may create a sequence array 1352 comprised of all of the sequence records 1312 and a track array 1354 comprised of all of the track records 1314. Each sequence record 1312 may consist of (1) a unique ID 1312a, which may be an unsigned integer associated with a mobile handset 1227, the telephone number associated with the mobile handset 1227 or any other unique number, character, or combination thereof, associated with the mobile handset 1227; (2) a startTime 1312b, which may consist of information indicative of a time when the mobile handset 1227 was first detected within the coverage area 1228; (3) an endTime, which may consist of information indicative of a time when the mobile handset 1227 was last detected within the coverage area 1228 of the data capturing device 1225; and (4) an array of references to all tracks that overlap a particular sequence record 1312. Each track record 1314 may include (a) a counter, which may be a unique ID representative of a sensor 1220 associated with the respective track; (b) a direction, which may consist of information that is representative of the direction of movement for the respective track; (c) startTime, which may consist of information indicative of a time when the object of interest was first detected within the field of view 1244 of the sensor 1220; (d) endTime, which may consist of information indicative of a time when the object of interest left the field of view 1244 of the sensor 1220; and (e) handsetID, which (if non-zero) may include an unsigned integer identifying a mobile handset 1227 associated with this track record 1314.

To separate and track anonymous objects 1320 (i.e., shoppers or random customers) and defined objects 1322 (such as shoppers with identified mobile handsets 1227 or shoppers with membership cards, employee badges, rail/air tickets, rental car or hotel keys, store-sponsored credit/debit cards, or loyalty reward cards, all of which may include RFID chips), the counting system 1230 for the system must determine which track records 1314 and sequence records 1312 match one another and then the counting system 1230 may subtract the matching track records 1314 from consideration, which means that the remaining (unmatched) track records 1314 relate to anonymous objects 1320 and the track records 1314 that match sequence records 1312 relate to defined objects 1322. The steps related to matching track records 1314 and sequence records 1312 are described in detail above. A similar method for matching track records 1314 and sequence records 1312 may be employed in connection with the present embodiment of the counting system 1230. The match algorithm or quality score algorithm that is employed should not be viewed as limiting, as various methods for matching tracks and sequence records 1314, 1312 may be used.

In some cases, there may be more than one counting system 1230, which consists of the combination of both the sensor 1220 and the data capturing device 1225, to cover multiple access points. In this case, separate sequence arrays 1352 and track arrays 1354 will be generated for each of the counters 1222. In addition, a match array 1318 may be generated and may comprise each of the match records 1316 associated with each of the counting systems 1230. In order to make optimal matches, tag history must be shared between all counting systems 1230. This may be handled by merging, in a time-sorted order, all of the match records in the match array 1318 and by using a single history map structure, which is generally understood by those with skill in the art.

By identifying, tracking and counting objects 1258 simultaneously with one or more sensors 1220 and one or more data capturing devices 1225, the system 1210 can generate data sets based on time, geography, demographic characteristics, and behavior. For example, the system 1210 may be capable of determining or calculating the following:

a. The actual length of time the overall population or subsets of the population dwell at specified locations;
b. The actual time of entry and exit for the overall population and subsets of the population;
c. The overall density of the overall population and subsets of the population at specified points in time;
d. How time of day impacts the behaviors of the overall population and subsets of the population;
e. The actual location and paths for subsets of the population;
f. The actual entry and exit points for subsets of the population;
g. The density of subsets of the population;
h. Whether the geography or location of departments or products impacts the behaviors of subsets of the population;
i. The actual demographic and personal qualities associated with the subset of the population;
j. How demographic groups behave in particular geographic locations, at specified times or in response to trigger events, such as marketing campaigns, discount offers, video, audio or sensory stimulation, etc.;
k. The overall density of various demographic groups based on time, geography or in response to trigger events;
l. How the behavior of demographic groups changes based on time, geography or in response to trigger events;
m. Any data that may be generated in relation to subsets of the population may also be used to estimate similar data for the overall population;
n. Data captured for specific areas, zones or departments may be dependent upon one another or correlated; and
o. Combinations of the foregoing data or reports.

Although there are a multitude of different data types and reports that may be calculated or generated, the data generally falls into the following four dimensions 1380: time 1380A, geographic 1380B, demographic 1380C and behavioral 1380D. These various dimensions 1380 or categories should not, however, be viewed as limiting as it should be obvious to those with skill in the art that other dimensions 1380 or data types may also exist.

Figure 20A:
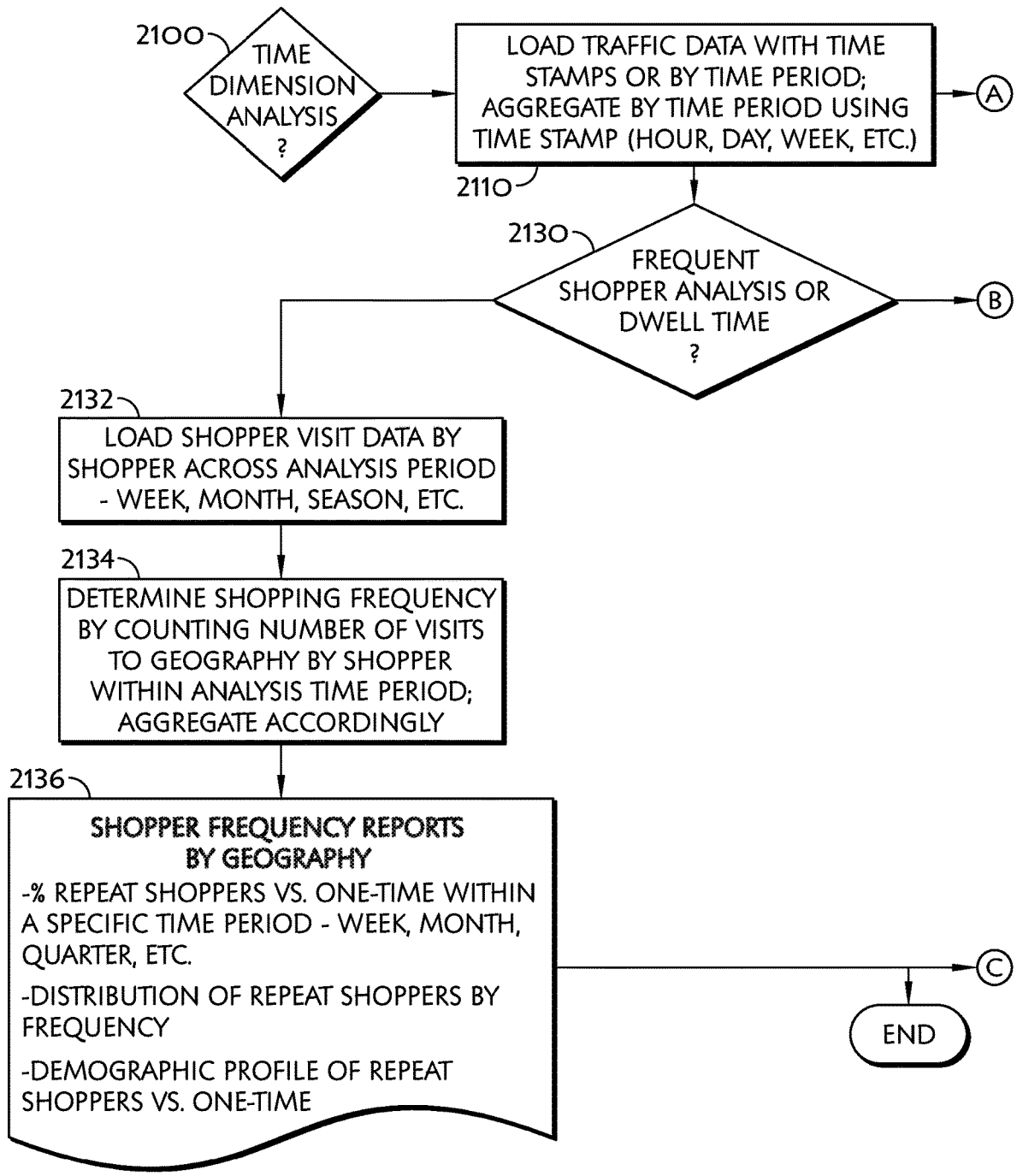
FIGS. 20A-B are a flow diagram depicting the steps for generating reports based on a time dimension.
Figure 20B:
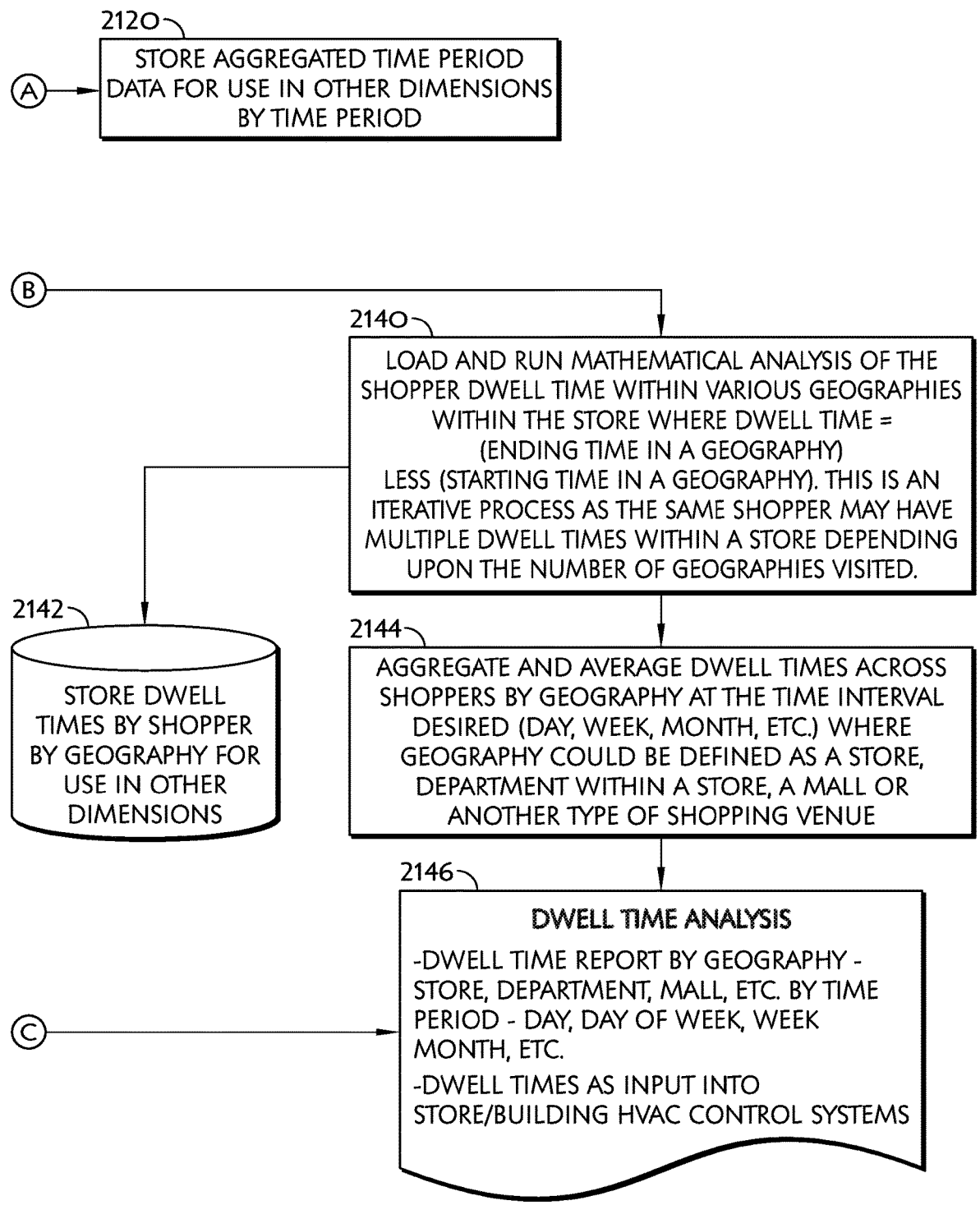

To generate data related to the time dimension 1380A, various algorithms may be applied. For example, the algorithm in FIG. 20 shows a series of steps that may be used to calculate dwell time 1400 for one or more shoppers or to count the frequent shopper data or number of visits 1422 by one or more shoppers. As shown at step 2110, to calculate dwell time 1400 or frequent shopper data 1420, the system 1210 must first upload the traffic data 1260, including the object data 1261 and the subset data 1226. The traffic data 1260 may also include a unique ID 1312A, a start time 1312B and an end time 1312C for each shopper included as part of the traffic data 1260. The start times 1312B and end times 1312C may be associated with specific predefined areas 1402. To generate reports for specific time periods 1313, the system 1210 may also sort the traffic data 1260 based on a selected time range. For example, at step 2120 the system 1210 may aggregate the traffic data 1260 based on the start time 1312B, the end time 1312C or the time period 1313. Aggregating traffic data 1260 based on start time 1312B, end time 1312C or time period 1313 is generally understood in the industry and the order or specific steps that are used for aggregating the traffic data 1260 should not be viewed as limiting. Once the traffic data 1260 is aggregated or sorted, it may be used to calculate dwell times 1400 or frequent shopper data 1420. It should be understood that the time periods 1313 may be based on user-defined periods, such as minutes, hours, days, weeks, etc.

To allow a user to generate either dwell time 1400 or frequent shopper data 1420, the system 1210 may ask the user to select either dwell time 1400 or frequent shopper data 1420 (see step 1230). This selection and other selections that are discussed throughout this description may be effectuated by allowing a user to select a button, a hyperlink or an option listed on a pull-down or pop-up menu, or to type in the desired option in a standard text box. Other means for selecting reporting options may also be employed without departing from the present invention. To calculate the dwell time 1400 for a shopper, the following equation may be used:

Dwell time=(Time at which a shopper leaves a predefined area)−(Time at which a shopper enters a predefined area)

For example, assume a shopper enters a predefined area 1402, such as a store, at 1:00 pm and leaves at 1:43 pm. The dwell time 1400 would be calculated as follows:

Dwell time=1:43−1:00=43 minutes

In this instance, the dwell time 1400 would be the total amount of time (43 minutes) that was spent in the predefined area 1402. The predefined area 1402 may be defined as a specific department, i.e., the men's clothing department, the women's clothing department, a general area, a particular display area, a point of purchase, a dressing room, etc. Thus, if a shopper visits multiple predefined areas 1402 or departments, the system 1210 may calculate dwell times for each predefined area 1402 or department that is visited.

Predefined areas 1402 may be determined by entering a set of boundaries 1404 obtained from a diagram 1406 of the desired space or store. The set of boundaries 1404 may define particular departments, display areas within particular departments or other smaller areas as desired. More specifically, the predefined areas 1402 may be determined by copying the diagram 1406 into a Cartesian plane, which uses a coordinate system to assign X and Y coordinates 1408 to each point that forms a set of boundaries 1404 associated with the predefined areas 1402. Track records 1314 may be generated for each shopper and may include an enter time 1410 and exit time 1412 for each predefined area 1402. In order to calculate dwell times 1400, the following information may be necessary: (i) unique IDs 1312A for each shopper; (ii) a set of boundaries 1404 for each predefined area 1402; (iii) coordinates 1408 for set of boundaries 1404 within a predefined areas 1402; (iv) enter times 1410 and exit times 1412 for each predefined area 1402 and shopper. In addition to aggregating the traffic data 1260 and prior to calculating the dwell times 1400, the system 1210 may also sort the traffic data 1260 by time periods 1313, unique IDs 1312A, and/or the predefined areas 1402 visited within the time periods 1313. The process of calculating dwell times 1400 is an iterative and ongoing process, therefore, the system 1210 may store dwell times 1400 by shopper or predefined area 1402 for later use or use in connection with other dimensions 1380. Dwell times 1400 may be used to generate reports that list aggregate or average dwell times 1400 for selected shoppers, geographies, time periods or demographic groups and these reports may also be feed into other systems that may use the dwell time 1400 to function, such as HVAC systems that may raise or lower temperatures based on the average dwell times 1400 for various time periods and geographic locations. It should be obvious to those with skill in the art that the dwell times 1400 and the dwell time reports 1400A may be used in many different ways. Therefore, the prior disclosure should be viewed as describing exemplary uses only and should not limit the scope potential uses or formats for the dwell times 1400 or dwell time reports 1400A.

To generate frequent shopper data 1420, the system 1210 may first upload shopper visit data 1450 for a particular time period 1313. Shopper visit data 1450 may be generated from the dwell times 1400 for a predefined area 1402 without regard to the length of the time associated with the dwell times 1400. In other words, step 2134 may increment a counter 1454 for each shopper that enters a predefined area 1402. Then the system 1210 may populate the shopper visit data 1450 with the data from the counter 1454 and store the shopper visit data 1450 in a database 1452. The database 1452 may sort the shopper visit data 1450 based on a unique ID 1312A for a particular shopper, a predefined area 1402, or a desired time period 1313. To avoid including walk-through traffic as part of the shopper visit data 1450, the system 1210 may require a minimum dwell time 1400 in order to register as a visit and thereby increment the counter 1454. The minimum dwell time 1400 may be on the order of seconds, minutes, or even longer periods of time. Similar to dwell times 1400, the shopper visit data 1450 may be sorted based on time periods 1313, unique IDs 1312A, and/or the predefined areas 1402. For example, as shown in step 2136, the shopper visit data 1450 may be used to generate a shopper frequency report 1450A by geography or based on a predefined area 1402. More specifically, the shopper frequency report 1450A may show information such as the percentage of repeat shoppers versus one-time shoppers for a given time period 1313 or the distribution of repeat shoppers by predefined areas 1402. The shopper frequency report 1450A may also disclose this information based on specified demographic groups. It should be obvious to those with skill in the art that the shopper visit data 1450 and the shopper frequency reports 1450A may be used in many different ways. Therefore, the prior disclosure should be viewed as describing exemplary uses only and should not limit the scope potential uses or formats for the shopper visit data 1450 or shopper frequency reports 1450A.

Figure 21:
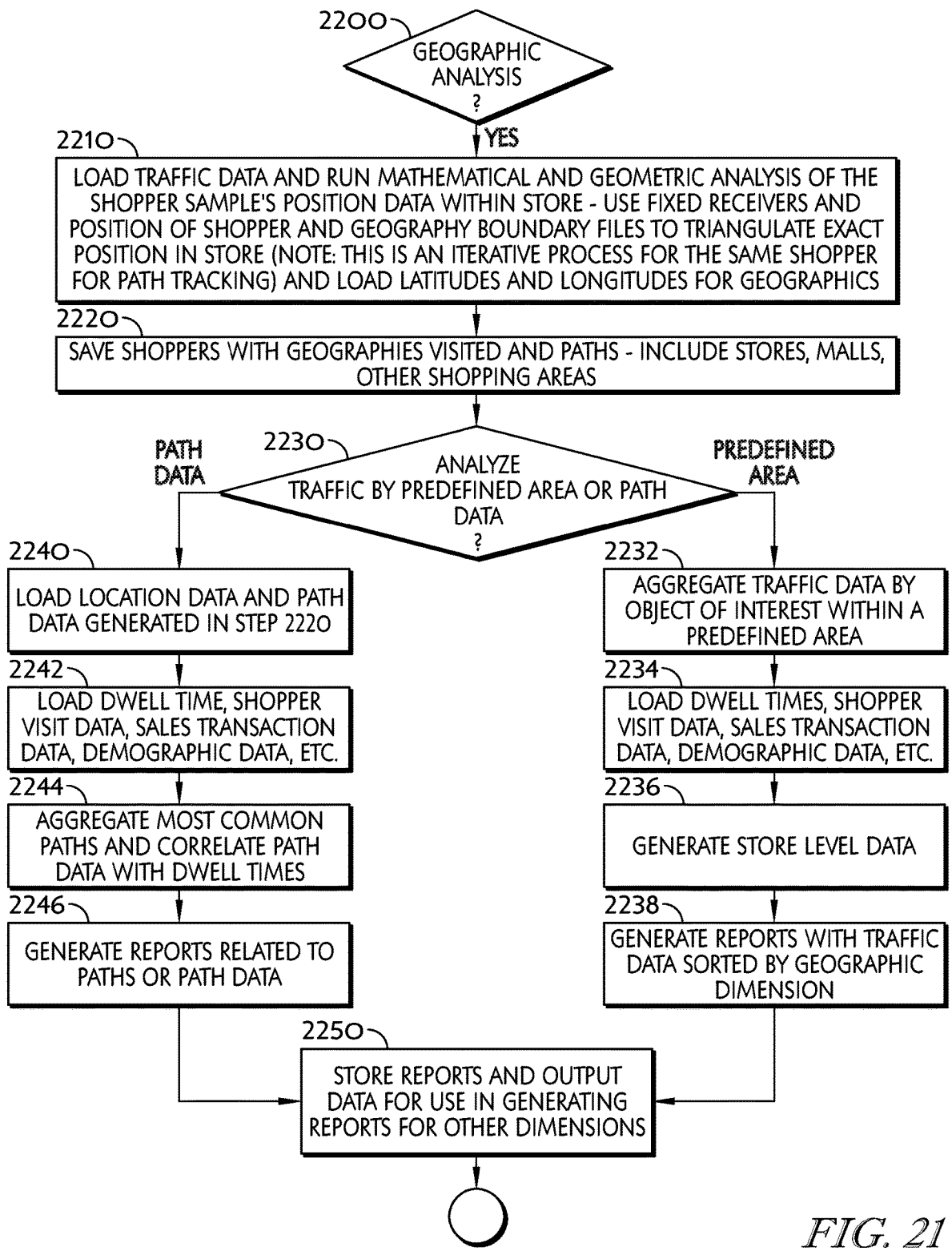
FIG. 21 is a flow diagram depicting the steps for generating reports based on a geographic dimension.

To generate data related to the geographic dimension 1380B, several different methods may be employed. The algorithm shown in FIG. 21 shows one example of a series of steps that may be used to analyze foot traffic by geography. After it is determined in step 2200 that the geographic analysis should be conducted, the system 1210 must first upload the traffic data 1260, including the object data 1261, and the subset data 1226. The subset data 1226 includes a unique identifier 1232A, an entry time 1232B, an exit time 1232C and location data 1262 for each object of interest 1258. The location data 1262 for object of interests 1258 is particularly important for generating data related to the geographic dimension 1380B. As mentioned above, the location data 1262 may be generated by using information from fixed receivers and a relative position for a shopper to triangulate the exact position of a shopper within a predefined area 1402 or by receiving GPS coordinates from a mobile handset. The exact position of a shopper within a predefined area 1402 is determined on an iterative basis throughout the shopper's visit. Other methods for calculating exact position of a shopper may also be used without departing from the teachings provided herein.

To determine the position of an object of interest 1258 within a predefined area 1402, the location data 1262 may be associated with the predefined area 1402. As mentioned above, the predefined area 1402 may be defined by entering a set of boundaries 1404 within a diagram 1406 of the desired space or store. The diagram 1406 of the desired space or store may be generated by the system 1210 from an existing map of the desired space or store. Again, as referenced above, boundaries 1404 may be generated by copying the diagram 1406 into a Cartesian plane and assigning X and Y coordinates 1408 to each point that forms an external point on one or more polygons associated with the predefined area 1402. By iteratively tracking the position of an object of interest 1258 over time, the system 1210 may also generate the direction 1274 in which the object of interest 1258 is traveling and path data 1272 associated with the path 1271 traveled by the object of interest 1258. The position of an object of interest 1258 within a predefined area 1402 may also be generated by: (1) using fixed proximity sensors that detect nearby objects of interest 1258, (2) triangulation of multiple reference signals to produce the position of an object of interest 1258, or (3) using cameras that track video, infrared or thermal images produced by an object of interest 1258. Other means for generating the position of an object of interest 1258 may also be used without departing from the teachings herein.

Figure 22:
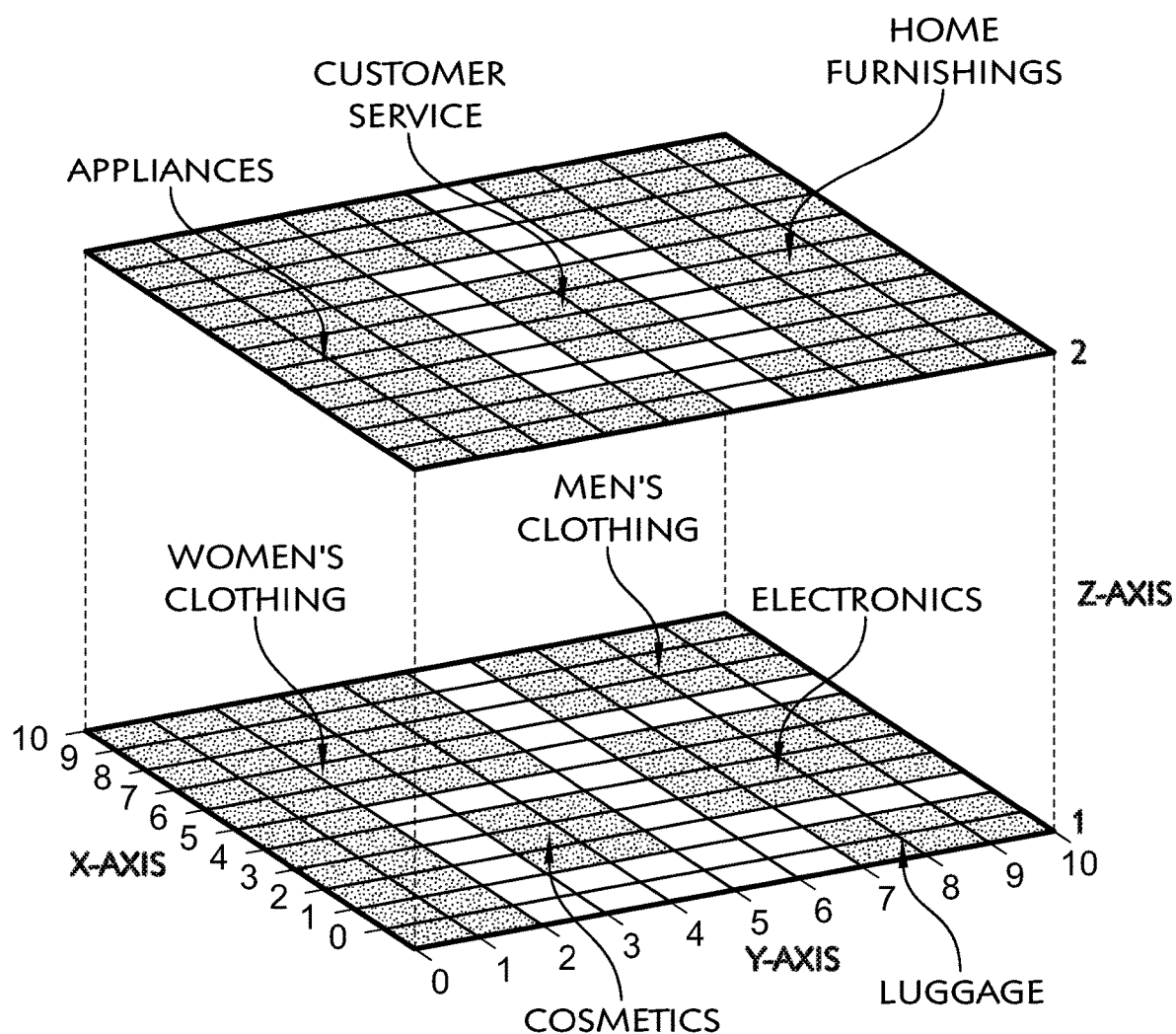
FIG. 22 is a diagram illustrating a multi-floor area.

To generate path data 1272 for an object of interest 1258, the system 1210 may use subset data 1226, including location data 1262, associated with an object of interest 1258 to iteratively plot X and Y coordinates 1408 for an object of interest 1258 within a predefined area 1402 of a diagram 1406 at sequential time periods. Therefore, the X and Y coordinates 1408 associated with an object of interest 1258 are also linked to the time at which the X and Y coordinates 1408 were generated. To count and track objects of interest 1258 in predefined areas 1402 that are comprised of multiple floors, subset data 1226 and/or location data 1262 may also include a Z coordinate 1408 associated with the floor on which the object of interest 1258 is located. A multi-floor diagram is shown in FIG. 22.

As shown in step 2220, after location data 1262 and path data 1272 are generated for objects of interest 1258, that information should be stored and associated with the respective objects of interest 1258. As shown in step 2230, the system 1210 allows a user to analyze traffic data 1260 based on a predefined area 1402 or by path data 1272 for objects of interest 1258. The predefined area 1402 may be a particular geographic area, a mall, a store, a department within a store, or other smaller areas as desired. To analyze the traffic, the system 1210 may first aggregate the traffic data 1260 for the objects of interest 1258 within the predefined area 1402 (see step 2232). As shown in step 2234, the system 1210 may subsequently load dwell times 1400, shopper visit data 1450, sales transaction data 1460 or demographic data 1470 for the objects of interest 1258. Step 2236 generates store level traffic data 1480 for predefined areas 1402 by extrapolating the subset data 1226 for particular predefined areas 1402 based on the corresponding object data 1261, which may include the total number of objects of interest 1258 within a predefined area 1402. By using the traffic data 1260, which includes object data 1261 and subset data 1226, and as shown in Step 2238, the system 1210 may generate reports that show the number of objects of interest 1258 for a predefined area 1402, the number of objects of interest for a predefined area 1402 during a specific time period 1313, the number of predefined areas 1402 that were visited (such as shopper visit data 1420), or the dwell times 1400 for predefined areas 1402. These reports may include information for specific subsets of objects of interest 1258 or shoppers, or the reports may include store level traffic data 1480, which extrapolates subset data 1226 to a store level basis. It should be obvious that the reports may also include other information related to time, geography, demographics or behavior of the objects of interest 1258 and therefore, the foregoing list of reports should not be viewed as limiting the scope of system 1210.

Figure 23A:
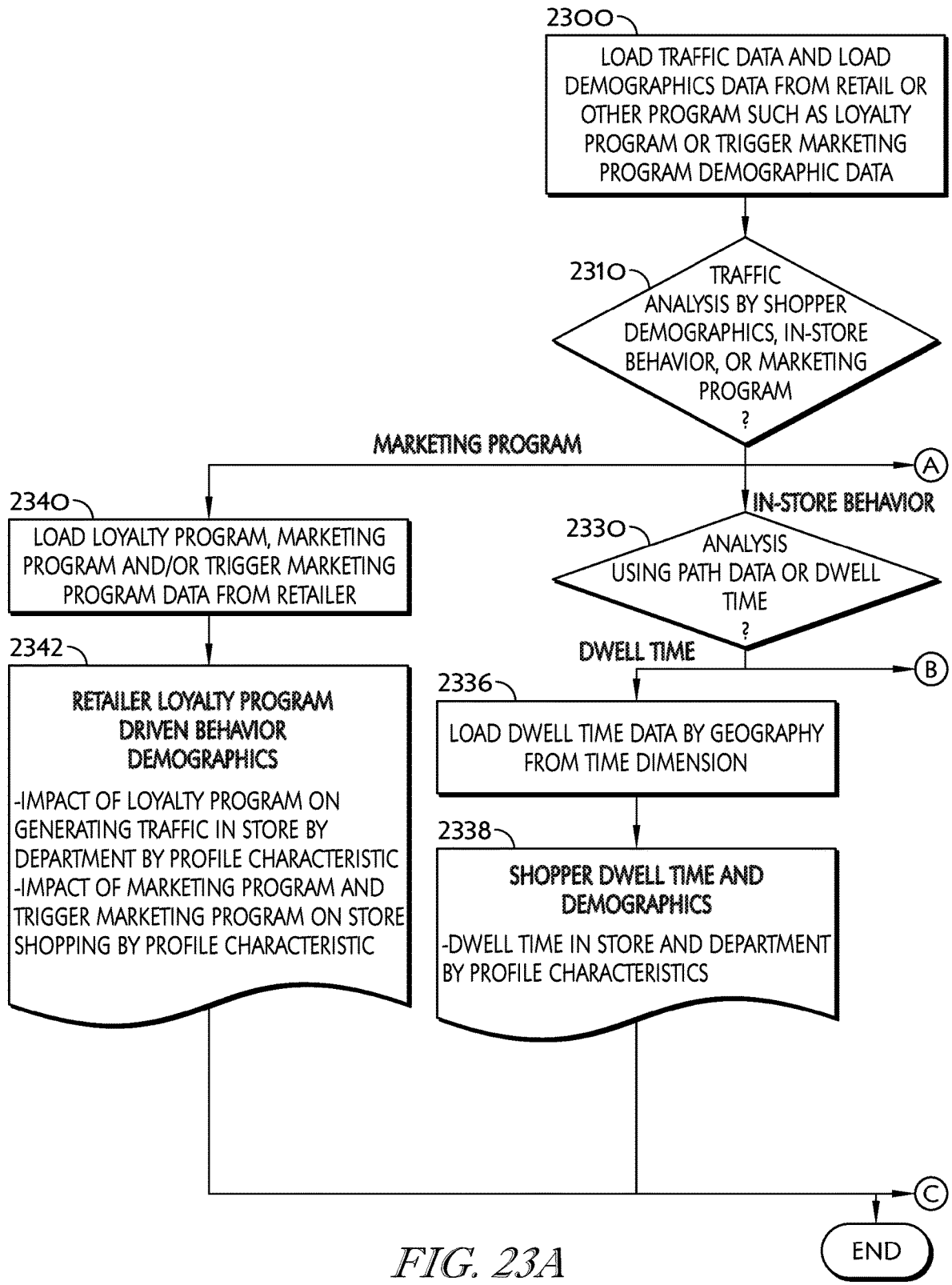
FIGS. 23A-B are is a flow diagram depicting the steps for generating reports based on a behavioral dimension.
Figure 23B:
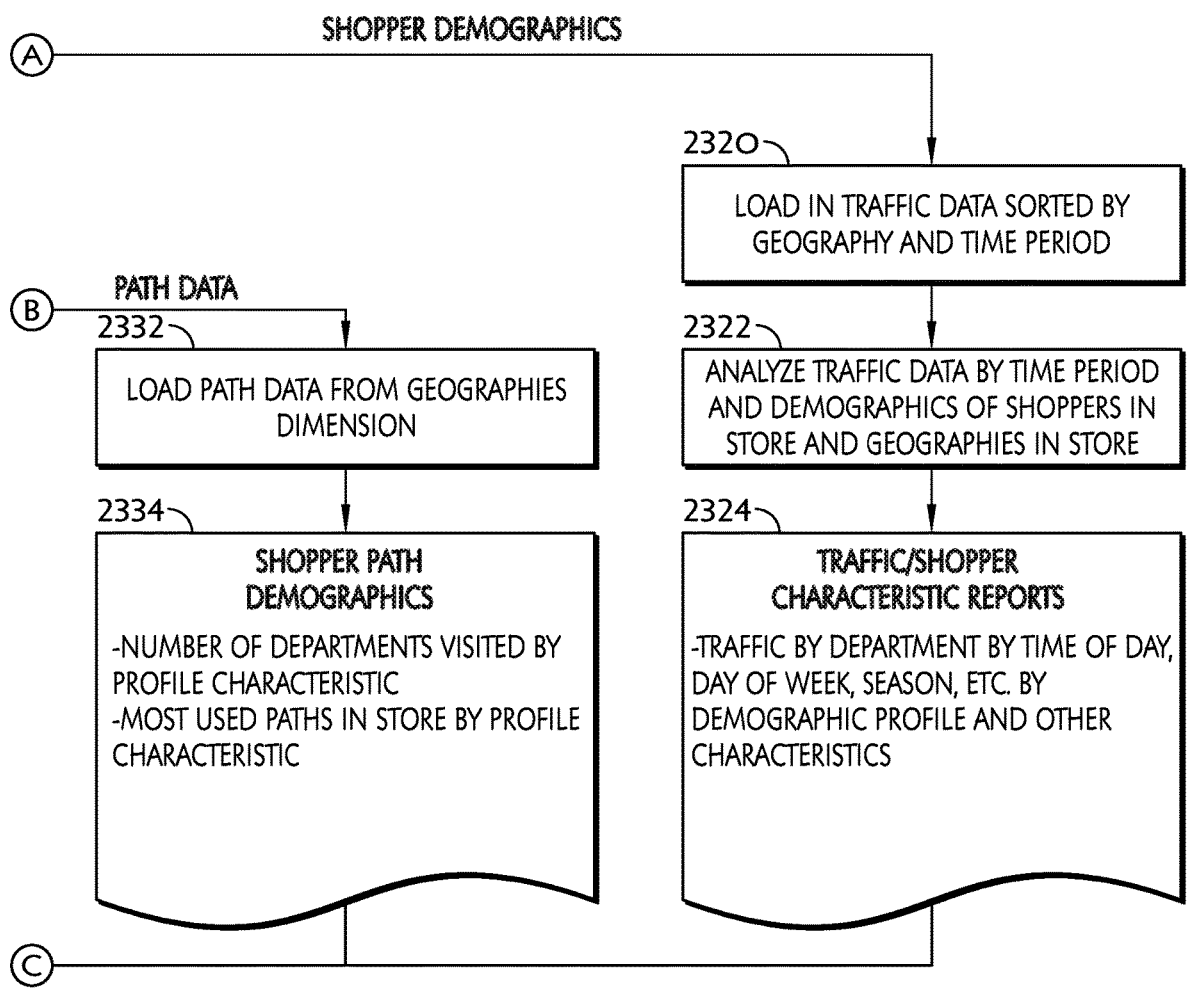
Figure 24:
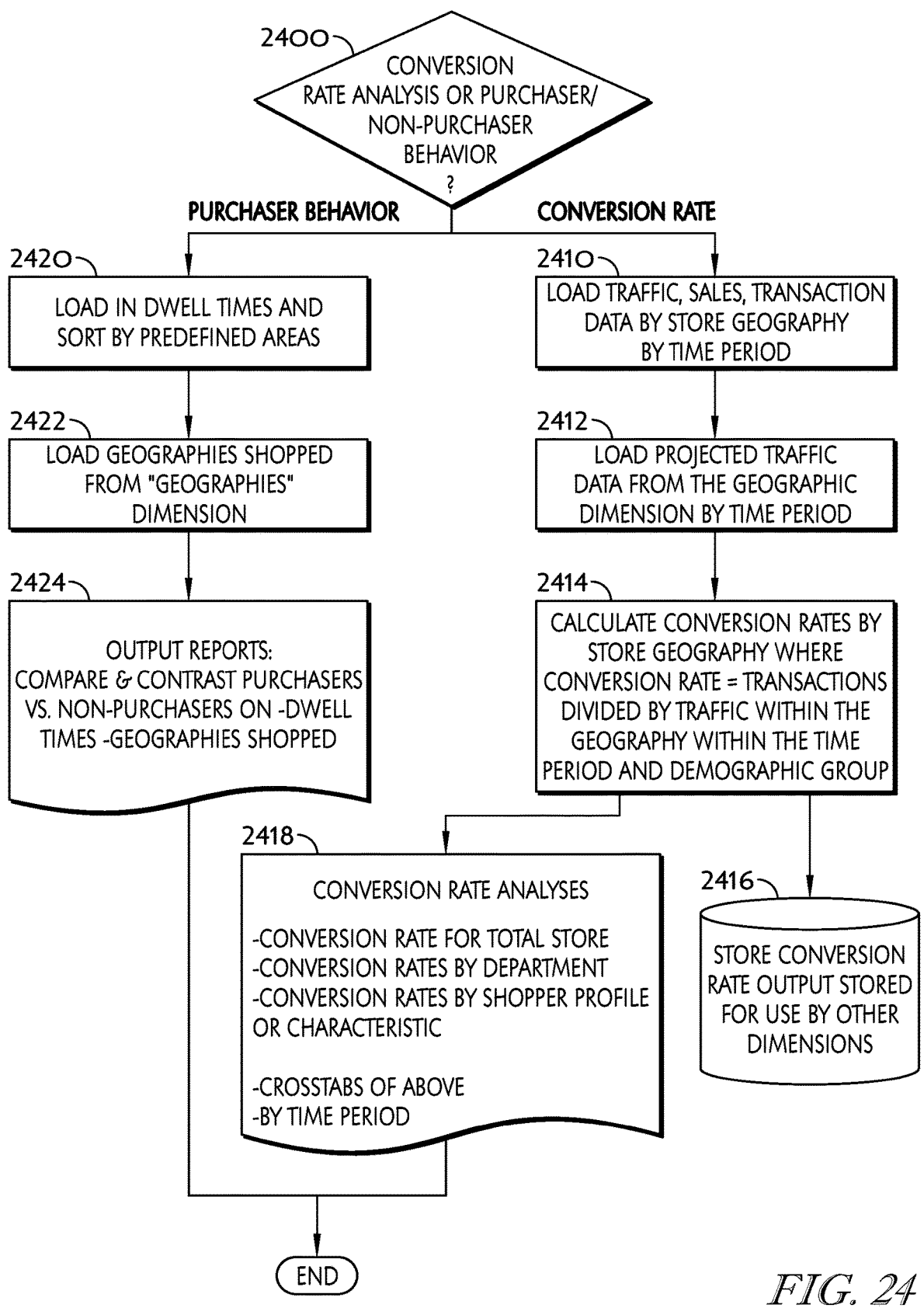
FIG. 24 is a flow diagram depicting the steps for generating reports based on a demographic dimension.

At step 2230, the user may also choose to analyze traffic data 1260 based on path data 1272 for objects of interest 1258 or the path 1271 taken by objects of interest 1258. To analyze the traffic data 1260 based on path data 1272 or the path 1271 taken, the system 1210 may first load the location data 1262 and path data 1272 that was generated for objects of interest 1258 in step 2210. The system 1210 may also load information, such as dwell times 1400, shopper visit data 1450, sales transaction data 1460 or demographic data 1470 for the objects of interest 1258. Once this information is loaded into system 1210, the system 1210 may aggregate the most common paths 1271 taken by objects of interest 1258 and correlate path data 1272 information with dwell times 1400 (see step 2244). After the information is aggregated and correlated, various reports may be generated at step 2246, including reports that show (i) the most common paths that objects of interest take in a store by planogram, including corresponding dwell times if desired, (ii) changes in shopping patterns by time period or season, and (iii) traffic patterns for use by store security or HVAC systems in increasing or decreasing resources at particular times. These reports may be stored and used in connection with generating data and reports for other dimensions 1380. As shown in FIGS. 23 and 24, reports may also be generated based on the behavioral and demographic dimensions 1380C, 1380D.

To generate data related to the demographic dimension 1380C, the algorithm shown in FIG. 23 may be employed. As shown at step 2300 in FIG. 23, the system 1210 should first load traffic data 1260 and demographic data 1500. The demographic data 1500 may be received from a retail program, including loyalty programs, trigger marketing programs or similar marketing programs, and may include information related to a shopper, including age, ethnicity, sex, physical characteristics, size, etc. The traffic data 1260 may be sorted in accordance with the demographic data 1500 and other data, such as start time 1312B, end time 1312C, time period 1313 and location data 1262. Once the traffic data 1262 and demographic data 1500 is loaded and sorted, the system 1210 may analyze the traffic data 1260, including the object data 1261 and subset data 1226 based on various demographic factors, including, but not limited to, shopper demographics, in-store behavior and marketing programs.

To analyze the traffic data 1260 based on the shopper demographics (step 2320), the system 1210 may sort the traffic data 1260 by geography and time period. It should be obvious, however, that the traffic data 1260 may also be sorted according to other constraints. In step 2322, the system 1210 analyzes the traffic data 1260, including object data 1261 and subset data 1226) based on time periods 1313 and predefined areas 1402. The analysis may include counts for objects of interest 1258 that enter predefined areas 1402 or counts for objects of interest 1258 that enter predefined areas 1402 during specified time periods 1313. To assist in analyzing the traffic data 1260 based on time periods 1313 and predefined areas 1402, the information that was generated in connection with the time dimension 1380A, including dwell times 1400, shopper data 1420 and shopper visit data 1450, and the geographic dimension 1380B, i.e., predefined areas 1402, boundaries 1404 and x and y coordinates, may be used. As shown in step 2324, the system 1210 may generate reports that show traffic by demographic data 1500 and store, department, time of day, day of week, or season, etc.

To analyze traffic data 1260 based on in-store behavior, the system 1210 must determine whether to look at in-store behavior based on dwell time 1400 or path data 1272. If dwell time is selected (step 2336), the system 1210 may load dwell times 1400 generated in relation to the time dimension 1380A and sort the dwell times 1400 based on the geographic dimension 1380B. After the dwell times 1400 and path data 1272 are combined with the demographic data 1500, the system 1210 may generate reports that show the dwell times 1400 by profile characteristics or demographic data 1500, i.e., age, ethnicity, sex, physical characteristics, size, etc. For analyzing traffic data 1260 based on a combination of demographic data 1500 and path data 1272, the system 1210 may first load path data 1272 generated in relation to the geographic dimension 1380B. After the path data 1272 is sorted according to selected demographic data

1500, the system 1210 may then generate reports that show the number of departments visited by objects of interest 1258 associated with particular demographic groups, the most common paths used by the objects of interest 1258 associated with those demographic groups. It should be obvious that other reports associated with demographic groups and path data 1272 may also be generated by the system 1210.

To analyze the traffic data based on a particular marketing program, the system 1210 may first load demographic data 1500 associated with a particular marketing program 1510. The marketing program 1510 may be aimed at a specific product or it may be a trigger marketing program being offered by a retailer. Examples of such programs are: "percent-off" price promotion for items in a specific department; e-mail "blasts" sent to customers promoting certain products; time-based discounted upsell offerings made available to any female entering the store; a "flash loyalty" discount for any customer making a return trip to the store within a 10-day period; upon entering the store sending a shopper a message informing her of a trunk show event taking place later that day; and provide shoppers with the option to download an unreleased song from a popular band made available as part of national ad campaign. Other types of marketing programs 1510 may also be the source of the demographic data without departing from the teaching and tenets of this detailed description. To analyze the traffic data based on the marketing program 1510, the system 1210 may first sort the traffic data 1260 based on the demographic data 1500 provided by the marketing programs. As shown in step 2342, the system 1210 may then generate reports that show retailer loyalty program driven behavior demographics, such as the impact of loyalty programs on particular demographic groups, the traffic of those demographic groups or shopping habits of those demographic groups. These reports may include: information related to how specific demographic groups (teens, young adults, seniors, males, females, etc.) shop in specific departments or areas of a store; traffic reports with information related to before and after a targeted promotion is offered to "loyal" customers; benchmark information regarding the effects of marketing programs on traffic and sales within the store; and comparisons of traffic by department for a targeted demographic promotion.

To generate data related to the behavioral dimension 1380D, the system 1210 may combine data and reports generated in connection with the other dimensions 1380, namely, the time dimension 1380A, geographic dimension 1380B and demographic dimension 1380C. In addition, conversion rate analysis or purchaser/non-purchaser analysis may also be added to the data and reports generated in connection with the other dimensions 1380. To generate conversion rates 1600, purchase data 1610, which includes purchaser 1610A and non-purchaser data 1610B, the algorithm shown in FIG. 24 may be employed. As shown at step 2400 in FIG. 24, the first step is to determine whether to generate conversion rates 1600 or purchase data 1610.

For generating conversion rates 1600, the system may first load traffic data 1260 and transaction data 1620 from the geographic dimension 1380B and sort the traffic data 1260 by time periods 1313. The transaction data 1620 may include information related to the sales amount, the number of items that were purchased, the specific items that were purchased, the date and time of the transaction, the register used to complete the transaction, the location where the sale was completed (department ID and sub-department ID), and the sales associate that completed the sale. Other information may also be gathered as part of the transaction data 1620 without departing from the teaching herein. Next, the system 1210 may load projected traffic data from the geographic dimension 1380B, which is also sorted by time periods 1313. In step 2414, the system 1210 may calculate conversion rates 1600. The conversion rates may be calculated by dividing the transactions by the traffic counts within a predefined area 1402 by a time period 1313. For instance, for one hour of a day a department in a store generated twenty sales (transactions). During the same hour, one hundred people visited the department. The department's conversion rate was twenty percent (20%) (20 transactions/100 shoppers). The conversion rates 1600 may also be associated with a demographic factor 1630. For instance, given the type of store, males or females (gender demographic) may convert at different rates. The conversion rates 1600 that are calculated may be stored by the system 1210 for later use in step 2416. Once the conversion rates 1600 are calculated, they may be used to generate reports such as the conversion rate 1600 for an entire store or a specific department, the conversion rate 1600 for shoppers with specific profiles or characteristics, cross-sections of the above-referenced conversion rates 1600 based on a time period 1313, or other reports based on combinations of the conversion rate 1600 with information from the time dimension 1380A, geographic dimension 1380B or demographic dimension 1380C.

For generating reports based on purchaser behavior, the system 1210 may first load dwell times 1400 and then sort the dwell times 1400 by predefined areas 1402 (see step 2420). The dwell times 1400 may be further sorted by time periods 1313. As shown in step 2422, the system 1210 may then load transaction data 1620 (such as sales transactions) for the same predefined areas 1402 and corresponding time periods 1313. The system 1210 may then produce reports that show comparisons between purchasers and non-purchasers based on dwell times 1400, predefined areas 1402 and/or time periods 1313. These reports may also be sorted based on demographic data 1470, as mentioned above.

The invention is not limited by the embodiments disclosed herein and it will be appreciated that numerous modifications and embodiments may be devised by those skilled in the art. Therefore, it is intended that the following claims cover all such embodiments and modifications that fall within the true spirit and scope of the present invention.

REFERENCES

[1] C. Wren, A. Azarbayejani, T. Darrel and A. Pentland. Pfinder: Real-time tracking of the human body. *In IEEE Transactions on Pattern Analysis and Machine Intelligence*, July 1997, Vol 19, No. 7, Page 780-785.

[2] 1. Haritaoglu, D. Harwood and L. Davis. W4: Who? When? Where? What? A real time system for detecting and tracking people. *Proceedings of the Third IEEE International Conference on Automatic Face and Gesture Recognition*, Nara, Japan, April 1998.

[3] M. Isard and A. Blake, Contour tracking by stochastic propagation of conditional density. *Proc ECCV* 1996.

[4] P. Remagnino, P. Brand and R. Mohr, Correlation techniques in adaptive template matching with uncalibrated cameras. *In Vision Geometry III, SPIE Proceedings* vol. 2356, Boston, Mass., 2-3 Nov. 1994

[5] C. Eveland, K. Konolige, R. C. Bolles, Background modeling for segmentation of video-rate stereo sequence. *In Proceedings of the IEEE Conference on Computer Vision and Pattern Recognition*, page 226, 1998.

[6] J. Krumm and S. Harris, System and process for identifying and locating people or objects in scene by selectively slustering three-dimensional region. U.S. Pat. No. 6,771,818 BI, August 2004.

[7] T. Darrel, G. Gordon, M. Harville and J. Woodfill, Integrated person tracking using stereo, color, and pattern detection. In *Proceedings of the IEEE Conference on Computer Vision and Pattern Recognition,* page 601609, Santa Barbara, June 1998.

What is claimed is:

1. A method for tracking objects, comprising the steps of:
   receiving a first data set at a data capturing device, wherein the first data set is associated with objects and for each of the objects the first data set includes a unique identifier, time data, and location data derived from video based information of the objects; and
   generating path data for one or more of the objects by plotting X and Y coordinates from the location data for each of the respective objects wherein the path data also includes an entry time representative of the time the object enters the predefined area and an exit time representative of the time the object exits the predefined areas.

2. A method of claim 1, wherein the video based information includes an immutable physical characteristic of the object.

3. The method of claim 2, wherein the immutable physical characteristic of the object is facial information.

4. The method of claim 1, further including the step of receiving a second data set from an independent system regarding characteristics of the objects.

5. The method of claim 4, wherein the independent system is a point of sale system.

6. The method of claim 4, wherein the independent system is a loyalty rewards system.

7. The method of claim 1, further including the step of using Z coordinates to further track objects within multiple floors.

8. The method of claim 3, further including the step of using the first data set to generate reports showing at least one of a number of objects within one of the predefined area, a number of objects within the predefined area during a specific time period, a number of predefined areas that were visited by one or more objects, a number of visits by one or more objects to one or more predefined areas, or average dwell times within one or more predefined areas by one or more objects.

9. The method of claim 8, further including the step of using path data to aggregate most common paths taken by objects and to correlate the path data with the dwell times.

10. The method of claim 9, further including the step of generating a report that shows at least one of the following:
    (a) the most common paths that objects take in a store, including corresponding dwell times;
    (b) changes in shopping patterns by time period;
    (c) changes in shopping patterns by season;
    (d) traffic patterns for use by store security systems in determining a level of resource allocation to provide at a particular time; and
    (e) traffic patterns for use by HVAC systems in determining a level of resource allocation to provide at a particular time.

11. A method for tracking objects, comprising the steps of:
    receiving a first data set at a data capturing device, wherein the first data set is associated with objects and for each of the objects the first data set includes a unique identifier, time data, and location data derived from video based information of the objects; and
    generating path data for one or more of the objects by plotting X and Y coordinates from the location data for each of the respective objects.

12. The method of claim 11, wherein the video based information includes an immutable physical characteristic of the object.

13. The method of claim 12, wherin the immutable physical characteristic of the object is facial information.

14. The method of claim 11, further including the step of receiving a second data set from an independent system regarding characteristics of the objects, where the independent system is a point of sale system or a loyalty rewards system.

15. The method of claim 13, further including the step of using the first data set to generate reports showing at least one of a number of objects within one of the predefined area, a number of objects within the predefined area during a specific time period, a number of predefined areas that were visited by one or more objects, a number of visits by one or more objects to one or more predefined areas, or average dwell times within one or more predefined areas by one or more objects.

16. The method of claim 15, further including the step of generating a report that shows at least one of the following:
    (a) changes in shopping patterns by time period;
    (b) changes in shopping patterns by season;
    (c) traffic patterns for use by store security systems in determining a level of resource allocation to provide at a particular time; and
    (d) traffic patterns for use by HVAC systems in determining a level of resource allocation to provide at a particular time.

17. A system for tracking objects, including:
    a memory comprising an application program, which, when executed, causes the system to:
    receive a first data set at a data capturing device, wherein the first data set is associated with objects and for each of the objects the first data set includes a unique identifier, time data, and location data derived from video based information of the objects; and
    generate path data for each of the objects by plotting X and Y coordinates from the location data for one or more of the respective objects, wherein the path data also includes an entry time representative of the time the object enters the predefined area and an exit time representative of the time the object exits the predefined areas.

18. The system of claim 17, wherein the video based information is facial information.

19. The system of claim 17, wherein the path data also includes an entry time representative of the time the object enters a predefined area and an exit time representative of the time the object exists the respective predefined area and wherein the system uses the first data set to generate reports showing at least one of a number of objects within one of the predefined area, a number of objects within the predefined area during a specific time period, a number of predefined areas that were visited by one or more objects, a number of visits by one or more objects to one or more predefined areas, or average dwell times within one or more predefined areas by one or more objects.

20. The system of claim 19, wherein the application program, when executed, further causes the system to aggregate path data to determine most common paths taken by objects, correlate the path data with the dwell times, and generate a report that shows at least one of the following:
- (a) the most common paths that objects take in a store, including corresponding dwell times;
- (b) changes in shopping patterns by time period;
- (c) changes in shopping patterns by season;
- (d) traffic patterns for use by store security systems in determining a level of resource allocation to provide at a particular time; and
- (e) traffic patterns for use by HVAC systems in determining a level of resource allocation to provide at a particular time.

* * * * *

UNITED STATES PATENT AND TRADEMARK OFFICE
CERTIFICATE OF CORRECTION

| | |
|---|---|
| PATENT NO. | : 10,733,427 B2 |
| APPLICATION NO. | : 16/564540 |
| DATED | : August 4, 2020 |
| INVENTOR(S) | : Edward A. Marcheselli et al. |

It is certified that error appears in the above-identified patent and that said Letters Patent is hereby corrected as shown below:

In the Specification

In Column 1, Line 10, delete "Continuation of copending U.S." and insert -- Continuation of U.S. --, therefor.

In Column 1, Line 11, delete "2017," and insert -- 2017, now Pat. No. 10,410,048, --, therefor.

In Column 3, Line 28, delete "periods" and insert -- periods. --, therefor.

In Column 4, Line 57, delete "are a" and insert -- are --, therefor.

In Column 4, Line 59, delete "are a" and insert -- are --, therefor.

In Column 4, Line 62, delete "are a" and insert -- are --, therefor.

In Column 4, Line 64, delete "nnpaired" and insert -- unpaired --, therefor.

In Column 4, Line 65, delete "are is a" and insert -- are --, therefor.

In Column 5, Line 31, delete "are a" and insert -- are --, therefor.

In Column 5, Line 36, delete "are is a" and insert -- are --, therefor.

In Column 8, Line 56, in Table 1, Under "Variable Name (abbreviated name)", delete "(de_grouped)" and insert -- (det_grouped) --, therefor.

In Column 8, Line 58, in Table 1, Under "Description", delete "background" and insert -- background. --, therefor.

In Column 9, Line 7, delete "det area" and insert -- det_area --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,733,427 B2

In Column 10, Line 9, delete "det grouped" and insert -- det_grouped --, therefor.

In Column 10, Line 15, delete "(I)" and insert -- (1) --, therefor.

In Column 11, Line 10, delete "det area" and insert -- det_area --, therefor.

In Column 11, Line 20, delete "det., closestDet" and insert -- det_closestDet --, therefor.

In Column 11, Line 22, delete "step Ito" and insert -- step 1 to --, therefor.

In Columns 13 & 14, in Table 2, Under "Description", Line 8, delete "minimumn" and insert -- minimum --, therefor.

In Columns 13 &14, in Table 2, Under "Number Variable Name", Line 5, delete "heigbt" and insert -- height --, therefor.

In Columns 13 &14, in Table 2, Under "Description", Line 16, delete "minimwn" and insert -- minimum --, therefor.

In Column 17, Line 41, delete "Best Spot AI (block 208)." and insert -- Best Spot A' (block 208). --, therefor.

In Column 17, Line 42, delete "Best Spot AI" and insert -- Best Spot A' --, therefor.

In Column 17, Line 43, delete "Best Spot AI" and insert -- Best Spot A' --, therefor.

In Column 31, Line 53, delete "scope potential" and insert -- scope of potential --, therefor.

In Column 32, Line 22, delete "scope potential" and insert -- scope of potential --, therefor.

In Column 34, Line 37, delete "data 1226)" and insert -- data 1226 --, therefor.

In the Claims

In Column 37, Line 25, in Claim 2, delete "A method" and insert -- The method --, therefor.

In Column 38, Line 9, in Claim 13, delete "wherin" and insert -- wherein --, therefor.